United States Patent
Reddel et al.

(10) Patent No.: US 12,286,502 B2
(45) Date of Patent: Apr. 29, 2025

(54) OLEFIN POLYMERIZATION CATALYSTS BEARING A THIAZOLE OR IMIDAZOLE

(71) Applicant: Dow Global Technologies LLC, Midland, MI (US)

(72) Inventors: Jordan C. Reddel, Midland, MI (US); Todd D. Senecal, Midland, MI (US); Brad C. Bailey, Midland, MI (US); Andrew M. Camelio, Auburn, MI (US); Sukrit Mukhopadhyay, Midland, MI (US); John B. Etienne, Mount Pleasant, MI (US)

(73) Assignee: Dow Global Technologies LLC, Midland, MI (US)

( * ) Notice: Subject to any disclaimer, the term of this patent is extended or adjusted under 35 U.S.C. 154(b) by 664 days.

(21) Appl. No.: 17/622,373

(22) PCT Filed: Jun. 23, 2020

(86) PCT No.: PCT/US2020/039076
§ 371 (c)(1),
(2) Date: Dec. 23, 2021

(87) PCT Pub. No.: WO2020/263790
PCT Pub. Date: Dec. 30, 2020

(65) Prior Publication Data
US 2022/0259336 A1    Aug. 18, 2022

Related U.S. Application Data

(60) Provisional application No. 62/867,039, filed on Jun. 26, 2019.

(51) Int. Cl.
*C08F 4/64* (2006.01)
*C08F 4/659* (2006.01)
*C08F 10/02* (2006.01)
*C08F 210/14* (2006.01)
*C08F 210/16* (2006.01)

(52) U.S. Cl.
CPC ...... *C08F 4/64044* (2013.01); *C08F 4/65908* (2013.01); *C08F 210/14* (2013.01); *C08F 210/16* (2013.01); *C08F 10/02* (2013.01)

(58) Field of Classification Search
CPC .................................................. C08F 4/64044
See application file for complete search history.

(56) References Cited

U.S. PATENT DOCUMENTS

| | | | |
|---|---|---|---|
| 7,256,296 B2 * | 8/2007 | Diamond | C07F 7/00 548/101 |
| 7,387,980 B2 * | 6/2008 | Diamond | C07F 7/28 502/103 |

FOREIGN PATENT DOCUMENTS

| | | |
|---|---|---|
| WO | 2004/041796 A1 | 5/2004 |
| WO | 2008/137524 A1 | 11/2008 |
| WO | 2018/022249 A1 | 2/2018 |

OTHER PUBLICATIONS

Ganovskii, A.D.; Panyushkin, V.T.; Kuznetsova, L.I.; Osipov, O.A.; Minkin, V.I.; Martynov, V.I. Zhurnal Obshchei Khimii 1968, 38(8), 1858-1864. English abstract (Year: 1968).*
Ganovskii, A.D.; Panyushkin, V.T.; Kuznetsova, L.I.; Osipov, O.A.; Minkin, V.I.; Martynov, V.I. Zhurnal Obshchei Khimii 1968, 38(8), 1858-1864. Full article. (Year: 1968).*
Thailand Office Action received Dec. 13, 2023, pertaining to TH Patent Application No. 2101008035, 11 pgs.
International Search Report and Written Opinion issued by the European Patent Office acting as International Searching Authority for International Patent Application No. PCT/US2020/039076 dated Sep. 21, 2020 (13 total pages).
Brazil Office Action dated Oct. 10, 2023, pertaining to BR Patent Application No. BR112021025960-0, 3 pgs.
Japanese Office Action dated Oct. 1, 2024, pertaining to JP Patent Application No. 2021-574915, 6 pgs.

* cited by examiner

*Primary Examiner* — Rip A Lee
(74) *Attorney, Agent, or Firm* — Dinsmore & Shohl LLP

(57) ABSTRACT

Processes of polymerizing olefin monomers using catalyst systems comprising a procatalyst having a structure according to Formula (I).

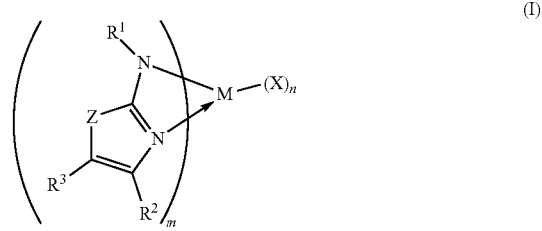

18 Claims, 3 Drawing Sheets

OLEFIN POLYMERIZATION CATALYSTS BEARING A THIAZOLE OR IMIDAZOLE

CROSS-REFERENCE TO RELATED APPLICATIONS

This application is a National Stage Entry under 35 U.S.C. § 371 of International Patent Application No. PCT/US2020/039076, filed Jun. 23, 2020, which claims the benefit of U.S. Provisional Patent Application Ser. No. 62/867,039 filed Jun. 26, 2019, both of which are hereby incorporated by reference in their entireties.

TECHNICAL FIELD

Embodiments of the present disclosure generally relate to olefin polymerization catalyst systems and processes, and, more specifically, to the olefin polymerization catalyst systems including thiazole or imidazole Group IV transition metal catalysts and to olefin polymerization processes incorporating the catalyst systems.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Embodiments of this disclosure include catalysts systems. The catalyst system includes a procatalyst having a structure according to formula (I):

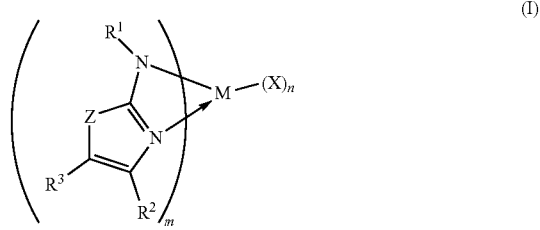

In formula (I), M is a metal chosen from titanium, zirconium, or hafnium, the metal having a formal oxidation state of +2, +3, or +4. m is 1 or 2; n is 2 or 3, provided m+n=4. Each X is a monodentate or bidentate ligand independently chosen from unsaturated $(C_2-C_{20})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, —N(R$^N$)$_2$, and —NCOR$^C$. Formula (I) is overall charge neutral.

In formula (I), each Z is NR$^N$ or S, wherein R$^N$ is $(C_1-C_{20})$hydrocarbyl or $(C_1-C_{20})$heterohydrocarbyl. Each R$^1$ is a $(C_1-C_{40})$hydrocarbyl, $(C_1-C_{40})$heterohydrocarbyl, $(C_1-C_{40})$aryl, or $(C_1-C_{40})$heteroaryl. Each R$^2$ and R$^3$ is independently selected from the group consisting of $(C_1-C_{50})$hydrocarbyl, $(C_1-C_{50})$heterohydrocarbyl, $(C_5-C_{50})$aryl, $(C-C_{50})$heteroaryl, —Si(R$^C$)$_3$, halogen, and —H, wherein R$^C$ is independently selected from the group consisting of $(C_1-C_{20})$hydrocarbyl, $(C_1-C_{20})$heterohydrocarbyl, $(C_1-C_{20})$aryl, or $(C_1-C_{20})$heteroaryl, and —H; and optionally, R$^2$ and R$^3$ are covalently linked to form a ring.

Embodiments of this disclosure include polymerization processes, particularly processes for producing ethylene-based polymers. The polymerization processes include contacting ethylene and optionally one or more $(C_3-C_{12})$α-olefin in the presence of a catalyst system including a metal-ligand complex having a structure according to formula (I).

DETAILED DESCRIPTION

Figure 1:
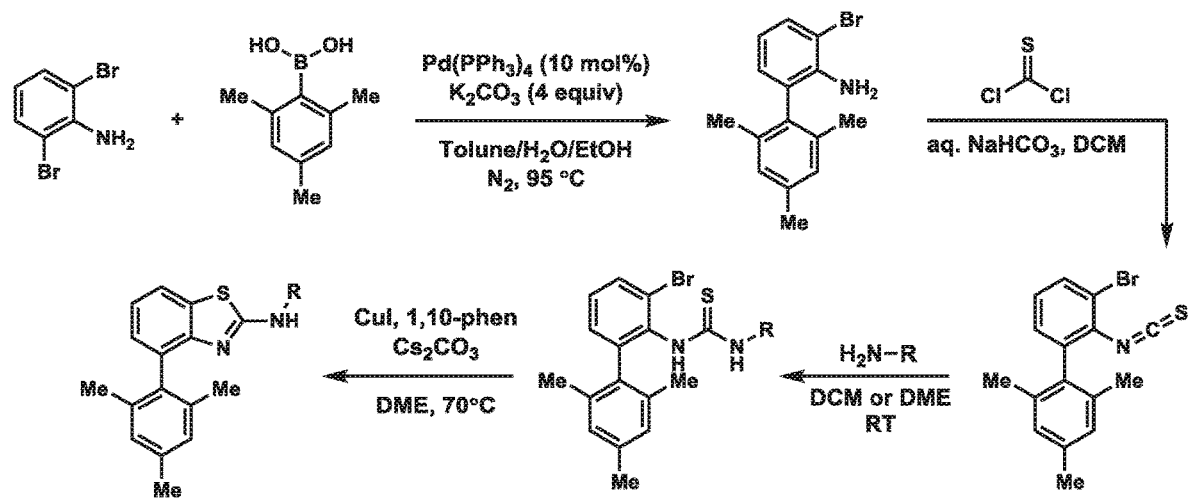
FIG. 1 depicts a four step synthetic scheme to synthesize Ligands 1-4, 6-7, and 9-12.
Figure 2:
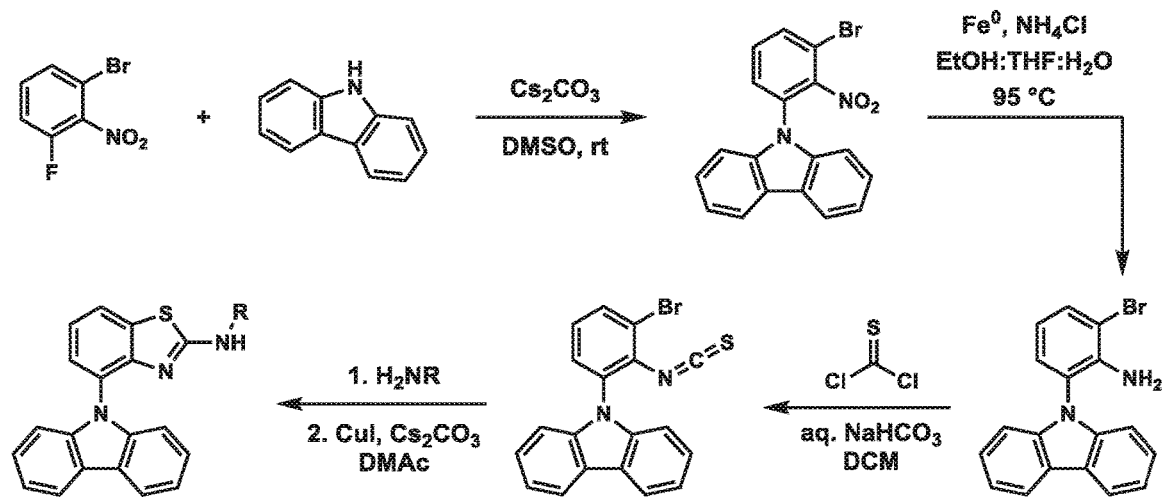
FIG. 2 depicts a four step synthetic scheme to synthesize Ligands 13-20.
Figure 3:
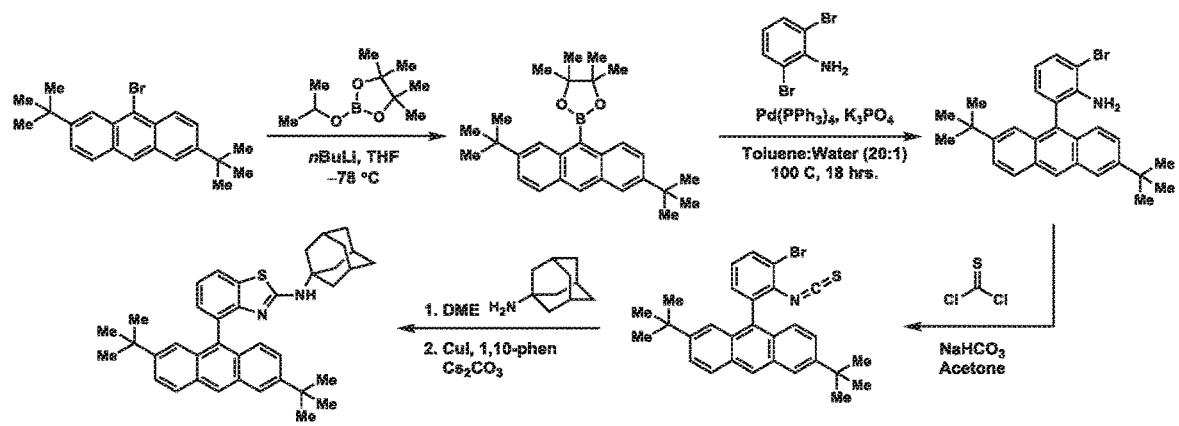
FIG. 3 depicts a four step synthetic scheme to synthesize Ligand 22.
Figure 4:
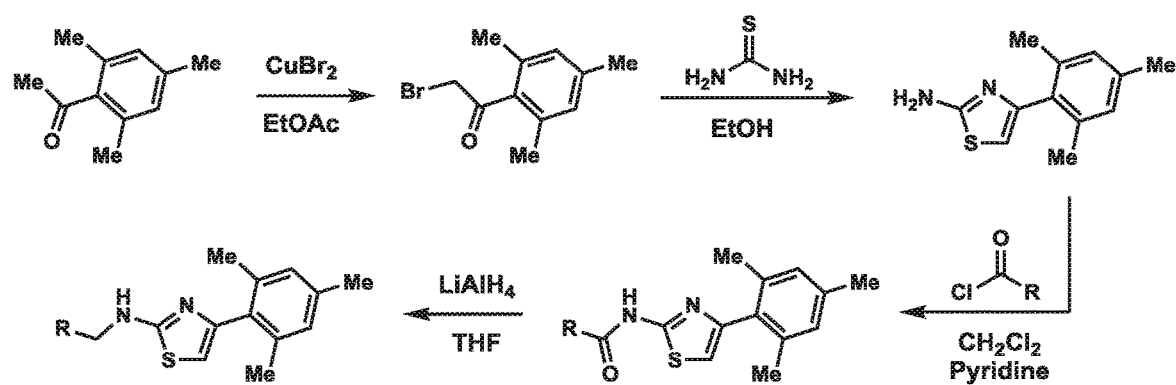
FIG. 4 depicts a four step synthetic scheme to synthesize Ligands and 23-24.
Figure 5:
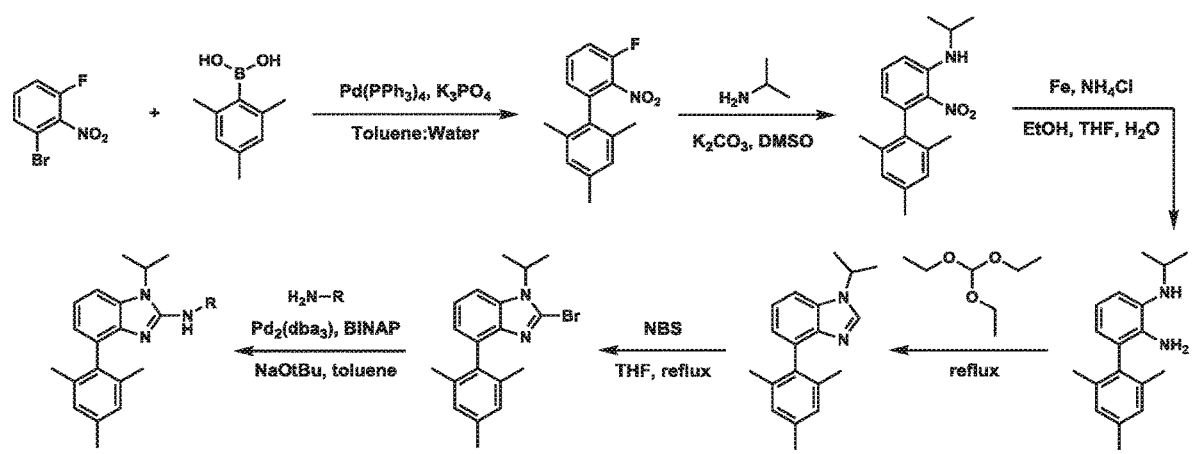
FIG. 5 depicts a six step synthetic scheme to synthesize Ligands 27-29, 31, and 32.

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

R, Z, M, X and n: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); Tf trifluoromethane sulfonate; THF: tetrahydrofuran; Et$_2$O: diethyl ether; CH$_2$Cl$_2$ dichloromethane; CV: column volume (used in column chromatography); EtOAc: ethyl acetate; C$_6$D$_6$: deuterated benzene or benzene-d6: CDCl$_3$: deuterated chloroform; Na$_2$SO$_4$: sodium sulfate; MgSO$_4$: magnesium sulfate; HCl: hydrogen chloride; n-BuLi: butyllithium; t-BuLi: tert-butyllithium; Cu$_2$O: Copper (I) Oxide; N,N'-DMEDA: N,N'-dimethylethylenediamine; K$_3$PO$_4$: Potassium phosphate tribasic; Pd(AmPhos)Cl$_2$: Bis(di-tert-butyl(4-dimethylaminophenyl)phosphine)dichloropalladium(II); Pd(dppf)Cl$_2$: [1,1'-Bis(diphenylphosphino)ferrocene]palladium(II) dichloride; AgNO$_3$: Silver nitrate; K$_2$CO$_3$: potassium carbonate; Cs$_2$CO$_3$: cesium carbonate; i-PrOBPin: 2-isopropoxy-4,4,5,5-tetramethyl-1,3,2-dioxaborolane; BrCl$_2$CCCl$_2$Br: 1,2-dibromotetrachloroethane; HfCl$_4$: hafnium(IV) chloride; HfBn$_4$: hafnium(IV) tetrabenzyl; ZrCl$_4$: zirconium(IV) chloride; ZrBn$_4$: zirconium(IV) tetrabenzyl; ZrBn$_2$Cl$_2$(OEt$_2$): zirconium (IV) dibenzyl dichloride mono-diethyletherate; HfBn$_2$Cl$_2$(OEt$_2$): hafnium (IV) dibenzyl dichloride mono-diethyletherate; TiBn$_4$: titanium (IV) tetrabenzyl; Zr(CH$_2$SiMe$_3$)$_4$: zirconium (IV) tetrakis-trimethylsilylmethyl; Hf(CH$_2$SiMe$_3$)$_4$: hafnium (IV) tetrakis-trimethylmethyl; N$_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; Rr: retention fraction; TLC; thin-layered chromatography; rpm: revolution per minute.

The term "independently selected" followed by multiple options is used herein to indicate that individual R groups appearing before the term, such as R$^1$, R$^2$, R$^3$, R$^4$, and R$^5$, can be identical or different, without dependency on the identity of any other group also appearing before the term.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "(C$_x$-C$_y$)" means that the unsubstituted form of the chemical group has from x carbon atoms to y carbon atoms, inclusive of x and y. For example, a (C$_1$-C$_{50}$)alkyl is an alkyl group having from 1 to 50 carbon atoms in its unsubstituted form. In some embodiments and general structures, certain chemical groups may be substituted by one or more substituents such as R$^S$. An R$^S$ substituted version of a chemical group defined using the "(C$_x$-C$_y$)" parenthetical may contain more than y carbon atoms depending on the identity of any groups R$^S$. For example, a "(C$_1$-C$_{50}$)alkyl substituted with exactly one group R$^S$, where R$^S$ is phenyl (—C$_6$H$_5$)" may contain from 7 to 56 carbon atoms. Thus, in general when a chemical group defined using the "(C$_x$-C$_y$)" parenthetical is substituted by one or more carbon atom-containing substituents R$^S$, the minimum and maximum total number of carbon atoms of the chemical group is determined by adding to both x and y the combined sum of the number of carbon atoms from all of the carbon atom-containing substituents R$^S$.

The term "substitution" means that at least one hydrogen atom (—H) bonded to a carbon atom or heteroatom of a corresponding unsubstituted compound or functional group is replaced by a substituent (e.g. R$^S$). The term "persubstitution" means that every hydrogen atom (H) bonded to a carbon atom or heteroatom of a corresponding unsubstituted compound or functional group is replaced by a substituent (e.g., R$^S$). The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "(C$_1$-C$_{50}$)hydrocarbyl" means a hydrocarbon radical of from 1 to 50 carbon atoms and the term "(C$_1$-C$_{50}$)hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more R$^S$ or unsubstituted.

In this disclosure, a (C$_1$-C$_{50}$)hydrocarbyl may be an unsubstituted or substituted (C$_1$-C$_{50}$)alkyl, (C$_3$-C$_{50}$)cycloalkyl, (C$_3$-C$_{20}$)cycloalkyl-(C$_1$-C$_{20}$)alkylene, (C$_6$-C$_4$)aryl, or (C$_6$-C$_{20}$)aryl-(C$_1$-C$_{50}$)alkylene (such as benzyl (—CH$_2$-C$_6$H$_5$)).

The terms "(C$_1$-C$_{50}$)alkyl" and "(C$_1$-C$_{18}$)alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more R$^S$. Examples of unsubstituted (C$_1$-C$_{50}$)alkyl are unsubstituted (C$_1$-C$_{20}$)alkyl; unsubstituted (C$_1$-C$_{10}$)alkyl; unsubstituted (C$_1$-C$_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted (C$_1$-C$_{40}$)alkyl are substituted (C$_1$-C$_{20}$)alkyl, substituted (C$_1$-C$_{10}$)alkyl, trifluoromethyl, and [C$_{45}$]alkyl. The term "[C$_{45}$]alkyl" means there is a maximum of 45 carbon atoms in the radical, including substituents, and is, for example, a (C$_{27}$-C$_{40}$)alkyl substituted by one R$^S$, which is a (C$_1$-C$_5$)alkyl, respectively. Each (C$_1$-C$_5$)alkyl may be methyl, trifluoromethyl, ethyl, 1-propyl, 1-methylethyl, or 1,1-dimethylethyl.

The term "(C$_6$-C$_{50}$)aryl" means an unsubstituted or substituted (by one or more R$^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted (C$_6$-C$_{50}$)aryl include: unsubstituted (C$_6$-C$_{20}$)aryl, unsubstituted (C$_6$-C$_{18}$)aryl; 2-(C$_1$-C$_5$)alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrene. Examples of substituted (C$_6$-C$_{40}$)aryl include: substituted $(C_1-C_{20})$aryl; substituted $(C_6-C_{18})$aryl; 2,4-bis([$C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooetyl, cyclononyl, and cyelodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo [2.2.1]heptane, and 2,3-bis (methylene)bicyclo [2.2.2] octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include O, S, S(O), $S(O)_2$, $Si(R^C)_2$, $P(R^P)$, $N(R^N)$, —N=$C(R^C)_2$, —$Ge(R^C)_2$—, or —$Si(R^C)$—, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom: one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-$S(O)_2$—, $(C_1-C_{50})$hydrocarbyl-$Si(R^C)_2$—, $(C_1-C_{50})$hydrocarbyl-$N(R^N)$— $(C_1-C_{50})$hydrocarbyl-$P(R^P)$—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein i is the number of heteroatoms and may be 1, 2, or 3; and each heteroatom may be O, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radicals include pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9-1-carbazol-9-yl. An example of the fused 6,6,6-ring system is acrydin-9-yl.

The term "$(C_1-C_{50})$heteroalkyl" means a saturated straight or branched chain radicals containing one to fifty carbon atoms, or fewer carbon atoms and one or more of the heteroatoms. The term "$(C_1-C_{50})$heteroalkylene" means a saturated straight or branched chain diradicals containing from 1 to 50 carbon atoms and one or more than one heteroatoms. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, $S(O)$, and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorous, or carbon-silicon double bonds, not including double bonds that may be present in substituents $R^S$, if any, or in (hetero) aromatic rings, if any.

Embodiments of this disclosure include catalysts systems. The catalyst system includes a procatalyst having a structure according to formula (I):

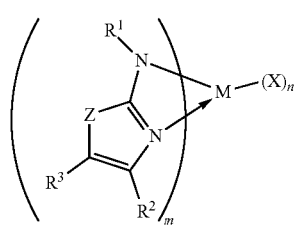

(I)

In formula (I), M is a metal chosen from titanium, zirconium, or hafnium, the metal having a formal oxidation state of +2, +3, or +4. Subscript m is 1 or 2. Subscript n of $(X)_n$ is 2 or 3, provided m+n=4. Each X is a monodentate or bidentate ligand independently chosen from unsaturated $(C_2-C_{20})$hydrocarbon, unsaturated $(C_2-C_{50})$heterohydrocarbon, $(C_1-C_{50})$hydrocarbyl, $(C_6-C_{50})$aryl, $(C_6-C_{50})$heteroaryl, cyclopentadienyl, substituted cyclopentadienyl, $(C_4-C_{12})$diene, halogen, $-N(R^N)_2$, and $-NCOR^C$. Formula (I) is overall charge neutral.

In formula (I), each Z is $NR^N$ or S, wherein $R^N$ is $(C_1-C_{20})$hydrocarbyl or $(C_1-C_{20})$heterohydrocarbyl. Each $R^1$ is a $(C_1-C_{40})$hydrocarbyl or $(C_1-C_{20})$heterohydrocarbyl. Each $R^2$ and $R^3$ is independently selected from the group consisting of $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, halogen, and $-H$, wherein $R^C$ is independently selected from the group consisting of $(C_1-C_{20})$hydrocarbyl, $(C_1-C_{20})$heterohydrocarbyl, and $-H$; and optionally, $R^2$ and $R^3$ are covalently linked to form a ring.

In one or more embodiments, in formula (I), Z is $NR^N$, where $R^N$ is $(C_1-C_8)$alkyl. In embodiments, $R^N$ is methyl, ethyl, 1-propyl, 2-propyl, n-butyl, tert-butyl, 2-methylpropyl (iso-butyl), n-butyl, n-hexyl, cyclohexyl, n-octyl, or tert-octyl. In other embodiments, Z is S.

In various embodiments, each $R^3$ is 2,4,6-triisopropylphenyl, 2,4,6-trimethylphenyl 3,5-di-tert-butylphenyl, naphthyl, carbozolyl, or cyclopropyl.

In one or more embodiments, each $R^1$ is chosen from a linear $(C_1-C_{12})$alkyl, branched $(C_1-C_{12})$alkyl, $(C_1-C_{12})$cycloalkyl, trimethylsilyl methyl, benzyl, and 1-adamantyl.

In some embodiments, the metal-ligand complex of formula (I) has a structure according to formula (Ia), formula (Ib), formula (Ic), or formula (Id):

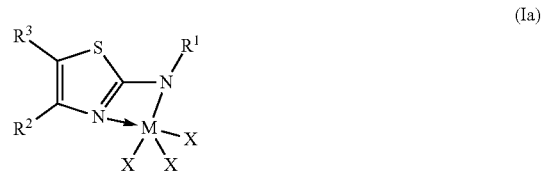

(Ia)

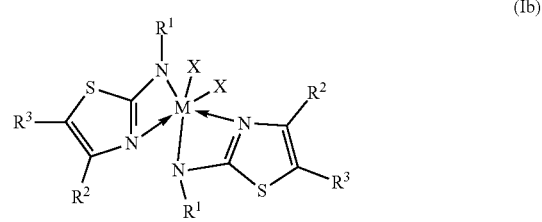

(Ib)

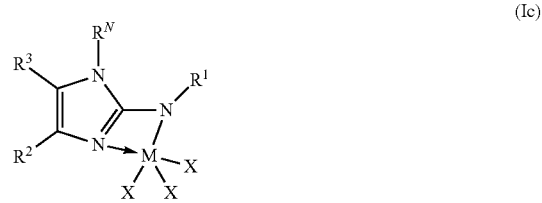

(Ic)

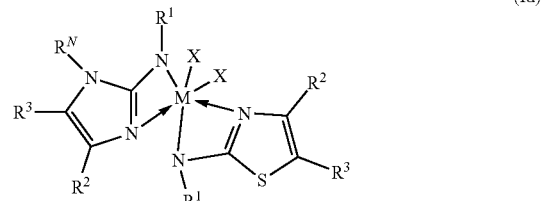

(Id)

In formulas (Ia), (Ib), (Ic), and (Id), each $R^1$, $R^2$, $R^3$, $R^N$, X, and M are defined as in formula (I).

In one or more embodiments, in formula (I), $R^2$ and $R^3$ are covalently linked to form an aromatic ring, and the metal-ligand complex has a structure according to formula (II):

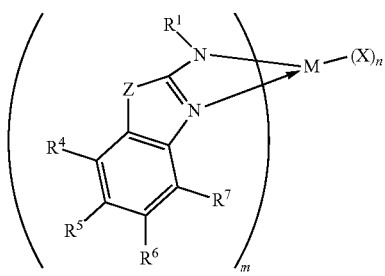
(II)

In formula (II), each $R^1$, Z, X, n, m, and M are defined as in formula (I); and each $R^4$, $R^5$, $R^6$, and $R^7$ are independently $(C_1-C_{40})$hydrocarbyl or $(C_1-C_{40})$heterohydrocarbyl.

In some embodiments of this disclosure, in formula (II), $R^7$ is $(C_6-C_{40})$aryl or $(C_6-C_{40})$heteroaryl. In various embodiments, $R^7$ is phenyl, 2,4,6-triisopropylphenyl, 2,4,6-trimethylphenyl, 3,5-di-tert-butylphenyl, naphthyl, carbozolyl, or cyclopropyl.

In some embodiments of this disclosure, in formulas (I) and (II), m is 2. In other embodiments, m is 1.

In various embodiments, in formula (II), the metal-ligand complex has a structure according to formula (IIa), formula (IIb), formula (IIc), or formula (IId):

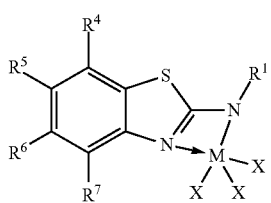
(IIa)

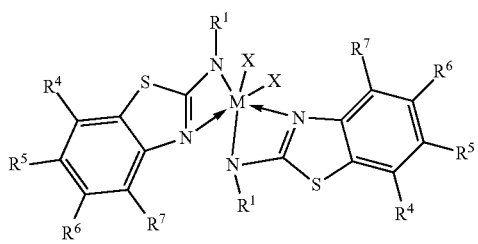
(IIb)

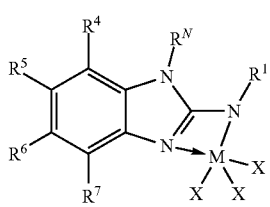
(IIc)

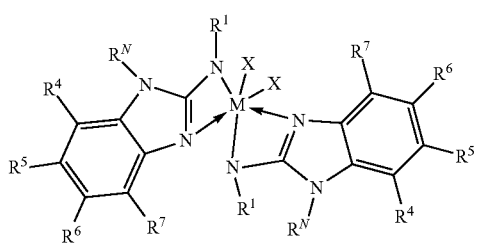
(IId)

In formulas (IIa), (IIb), (IIc), and (IId), each $R^1$, $R^4$, $R^5$, $R^6$, $R^7$, $R^N$, X, and M are defined as in formula (II).

In the metal-ligand complex according to formula (I) or formula (II), each X bonds with M through a covalent bond, a dative bond, or an ionic bond. In some embodiments, each X is identical. The metal-ligand complex has 6 or fewer metal-ligand bonds and can be overall charge-neutral or may have a positive-charge associated with the metal center. In some embodiments, the catalyst system includes a metal-ligand complex according to formula (I), in which M is zirconium or hafnium; each X is independently chosen from $(C_1-C_{20})$alkyl, $(C_1-C_{20})$heteroalkyl, $(C_6-C_{20})$aryl, $(C_4-C_{20})$heteroaryl, $(C_4-C_{12})$diene, or a halogen. In one or more embodiments, each X is independently benzyl, phenyl, or chloro.

In some embodiments, the monodentate ligand may be a monoanionic ligand. Monoanionic ligands have a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, carbonate, phosphate, sulfate, HC(O)O⁻, HC(O)N(H)⁻, $(C_1-C_{40})$hydrocarbylC(O)O⁻, $(C_1-C_{40})$hydrocarbylC(O)N$((C_1-C_{20})$hydrocarbyl)⁻, $(C_1-C_{40})$hydrocarbylC(O)N(H)⁻, $R^K R^L B^-$, $R^K R^L N^-$, $R^K O^-$, $R^K S^-$, $R^K R^L P^-$, or $R^M R^K R^L Si^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^Q NR^K R^L$, $R^K OR^L$, $R^K SR^L$, or $R^Q PR^K R^L$, where each $R^Q$ independently is hydrogen, $[(C_1-C_{10})$hydrocarbyl$]_3Si(C_1-C_{10})$hydrocarbyl, $(C_1-C_{40})$hydrocarbyl, $[(C_1-C_{10})$hydrocarbyl$]_3Si$, or $(C_1-C_{40})$heterohydrocarbyl and each $R^K$ and $R^L$ independently is as previously defined.

Additionally, each X can be a monodentate ligand that, independently from any other ligands X, is a halogen, unsubstituted $(C_1-C_{20})$hydrocarbyl, unsubstituted $(C_1-C_{20})$hydrocarbylC(O)O—, or $R^K R^L N$—, wherein each of $R^K$ and $R^L$ independently is an unsubstituted$(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^K R^L N$—, wherein each of $R^K$ and $R^L$ independently is an unsubstituted $(C_1-C_{10})$hydrocarbyl. In one or more embodiments of formula (I), (II), and (III), X is benzyl, chloro, —CH$_2$SiMe$_3$, or phenyl.

In further embodiments, each X is selected from methyl; ethyl; 1-propyl; 2-propyl; 1-butyl; 2,2-dimethylpropyl; trimethylsilylmethyl; phenyl; benzyl; or chloro. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In some embodiments, any or all of the chemical groups (e.g., X and $R^1$-$R^4$) of the metal-ligand complex of formula (I) may be unsubstituted. In other embodiments, none, any, or all of the chemical groups X and $R^1$-$R^4$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^1$-$R^4$ may be persubstituted with $R^S$. In the chemical groups that are persubstituted with $R^S$, the individual $R^S$ may all be the same or may be independently chosen.

Embodiments of this disclosure includes polymerization processes. The polymerization processes include polymerizing ethylene and one or more olefins in the presence of a catalyst system under olefin polymerization conditions to form an ethylene-based polymer, the catalyst system comprising a metal-ligand complex according to formula (I).

In illustrative embodiments, the catalyst systems may include a metal-ligand complex according to formula (I) having the structure of any of the Procatalysts 1-22 listed below which are synthesized from the corresponding Ligand 1-43:

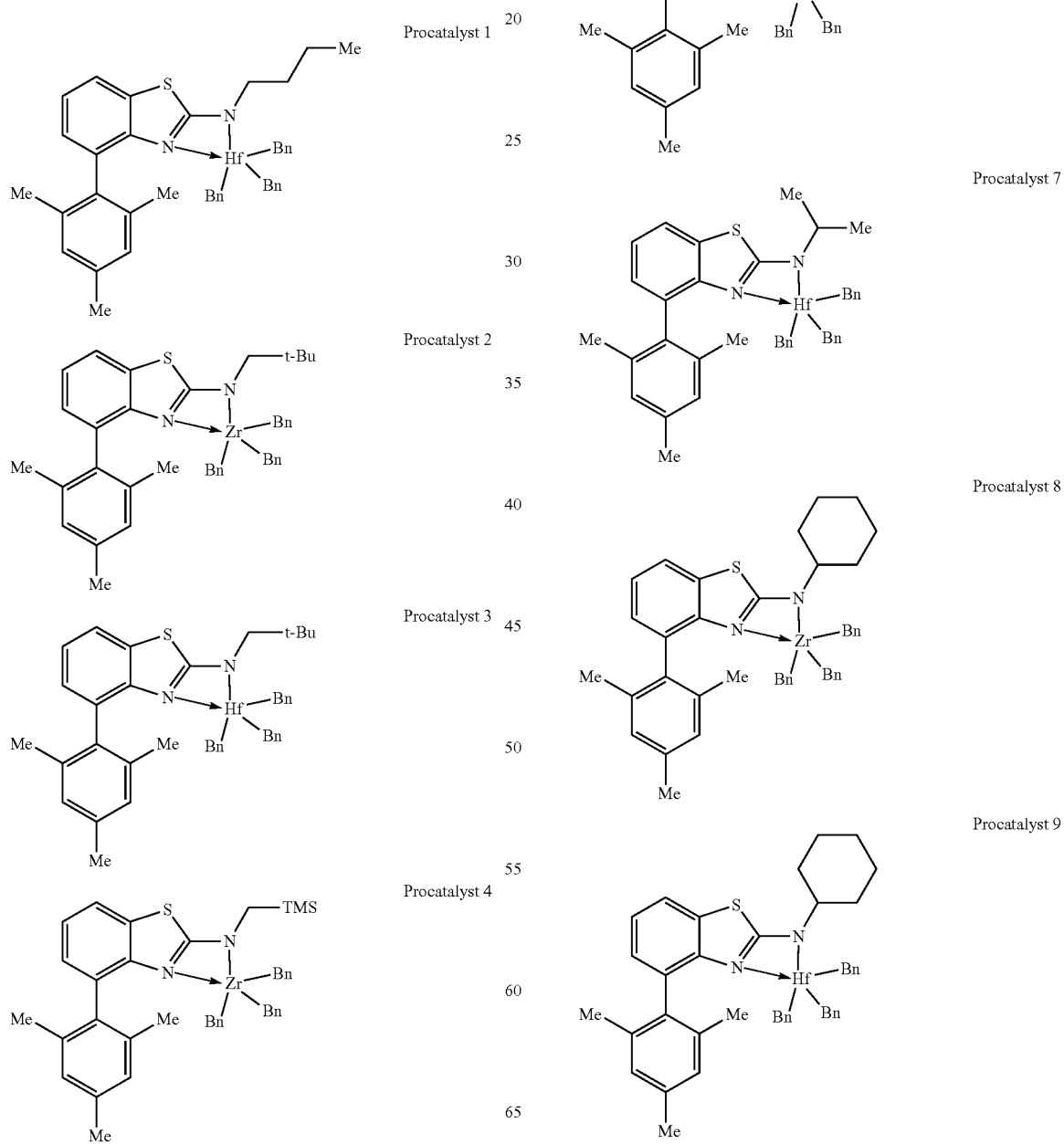

Procatalyst 10
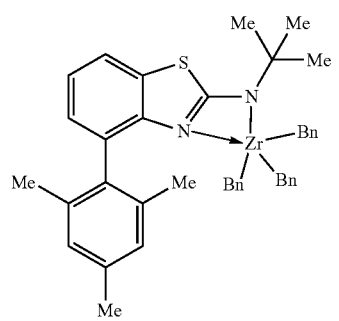
Procatalyst 11
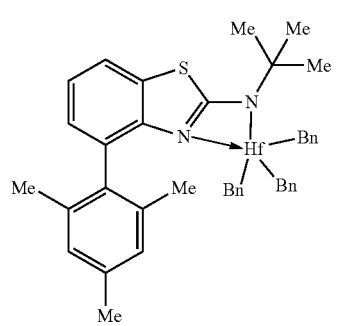
Procatalyst 12
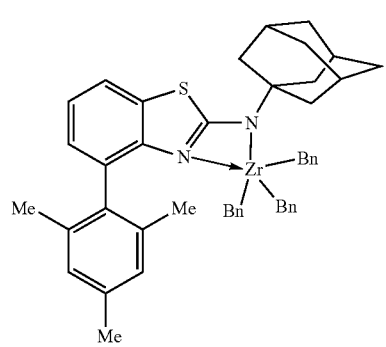
Procatalyst 13
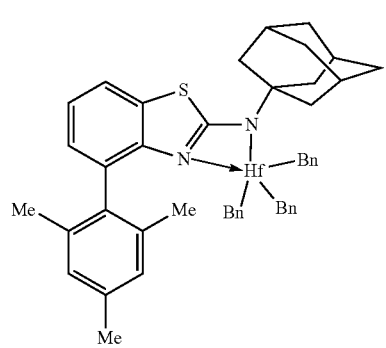
Procatalyst 14
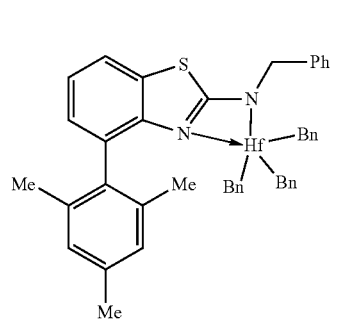
Procatalyst 15
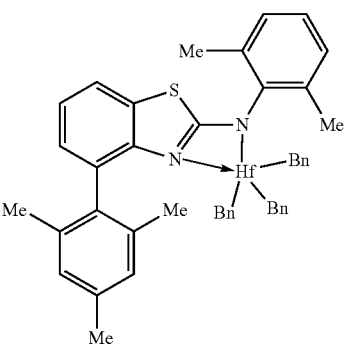
Procatalyst 16
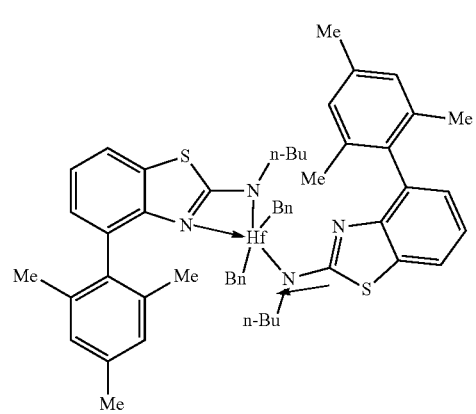
Procatalyst 17
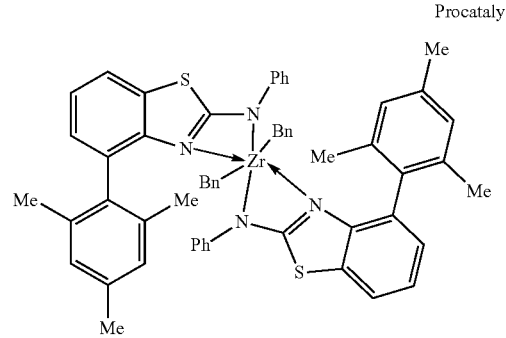
Procatalyst 18
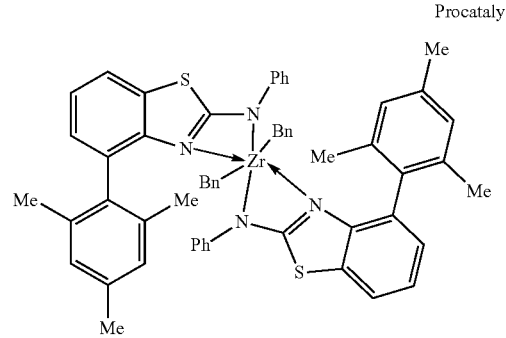

Procatalyst 19
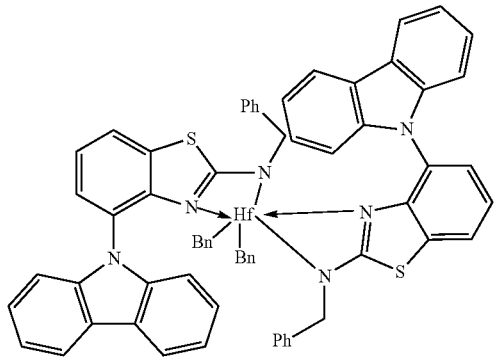
Procatalyst 20
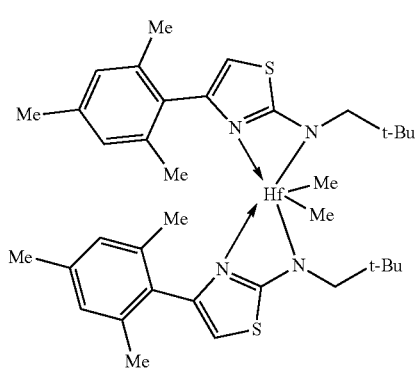
Procatalyst 21
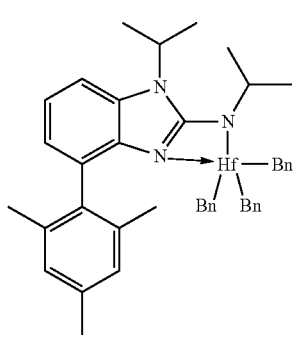
Procatalyst 22
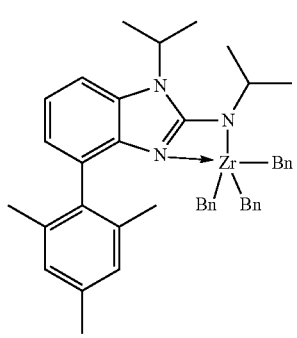
Ligand 1
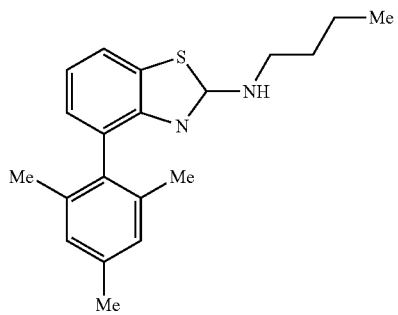
Ligand 2
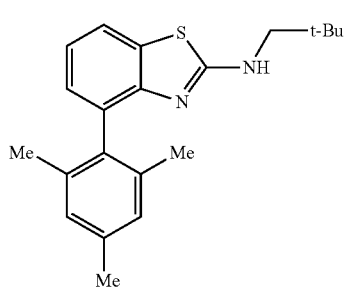
Ligand 3
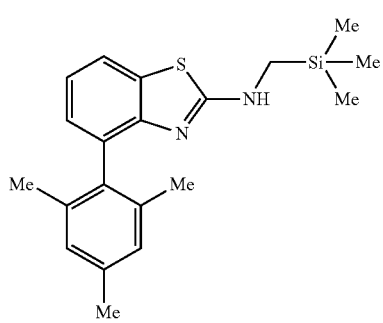
Ligand 4
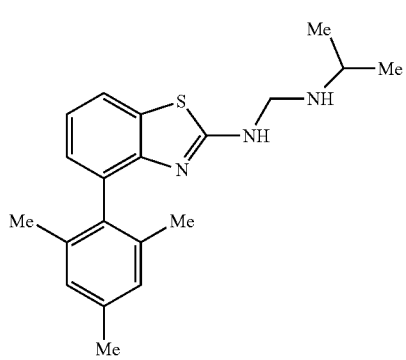
Ligand 5
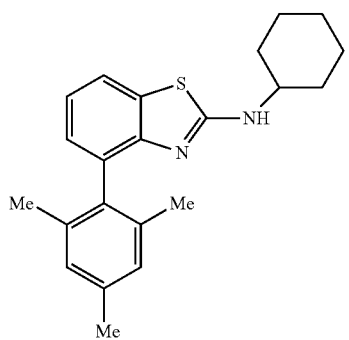

Ligand 6
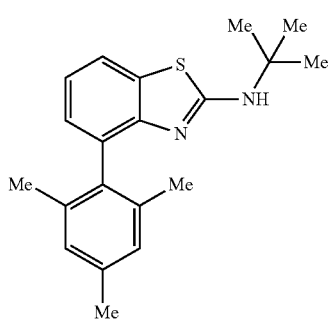
Ligand 7
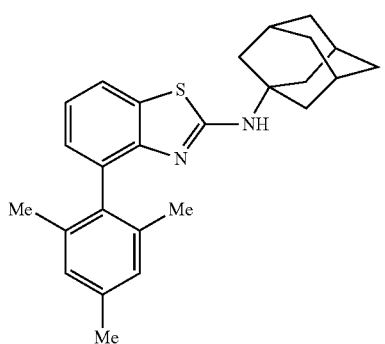
Ligand 8
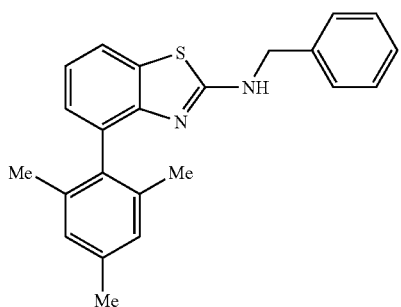
Ligand 9
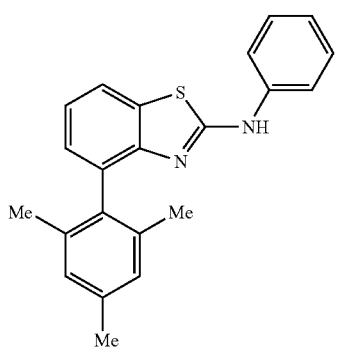
Ligand 10
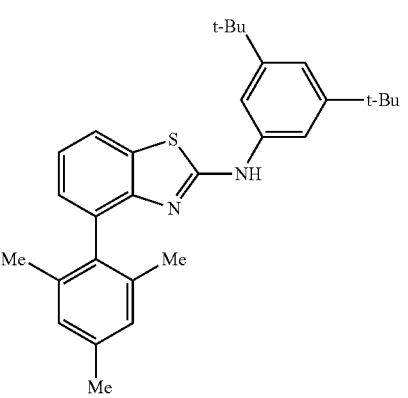
Ligand 11
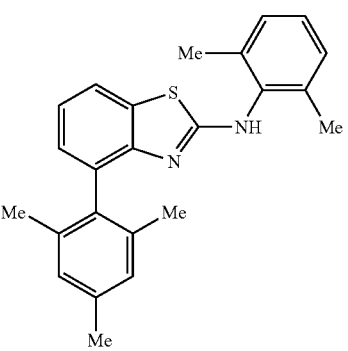
Ligand 12
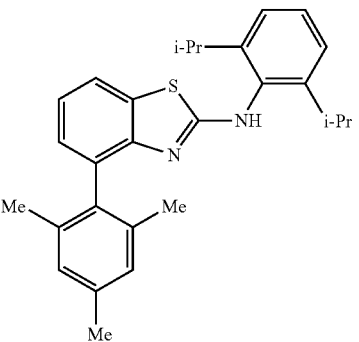
Ligand 13
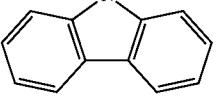
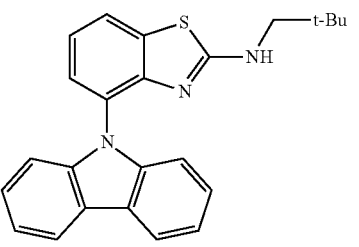
Ligand 14

Ligand 15
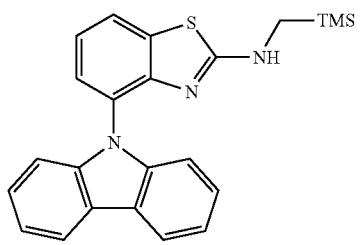
Ligand 16
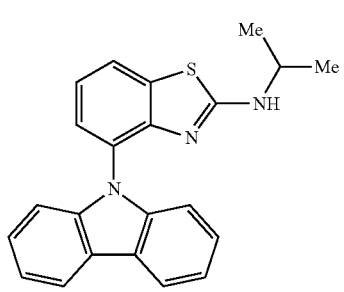
Ligand 17
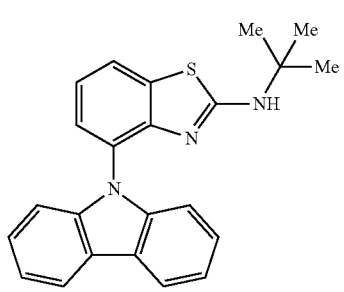
Ligand 18
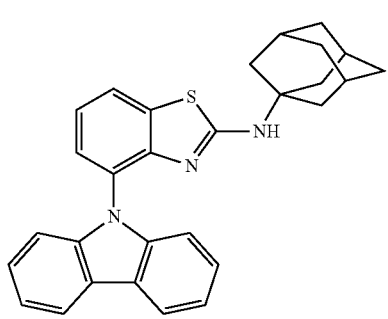
Ligand 19
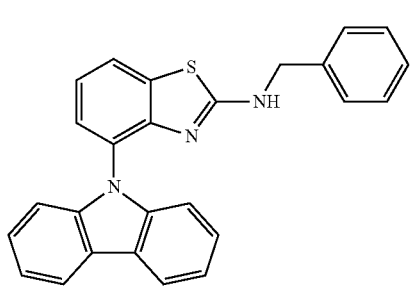
Ligand 20
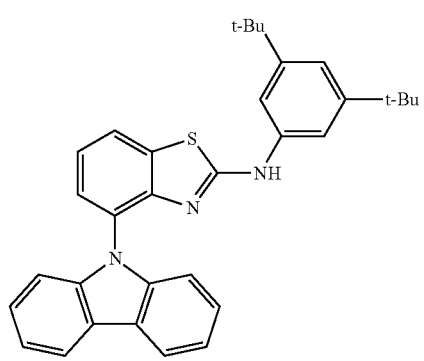
Ligand 21
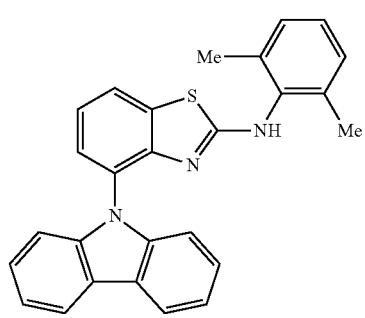
Ligand 22
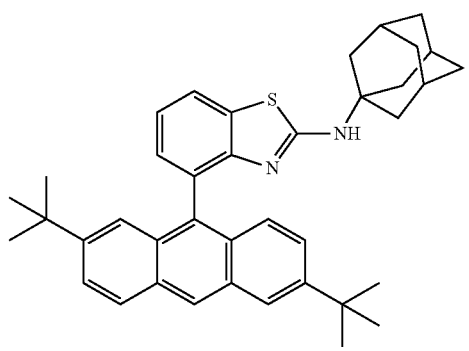
Ligand 23
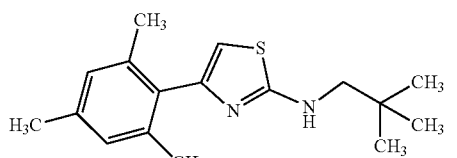
Ligand 24
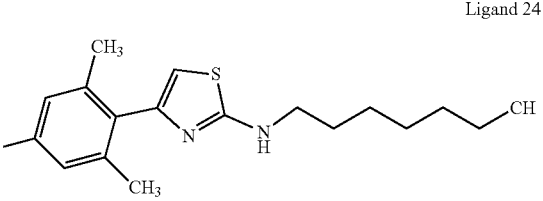

Ligand 25
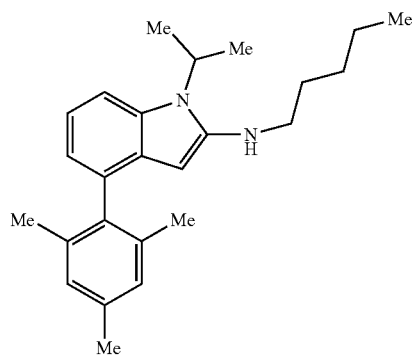
Ligand 26
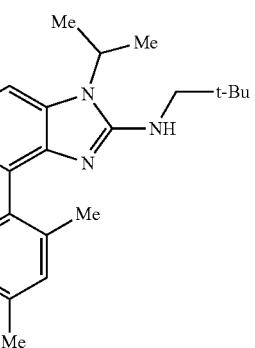
Ligand 27
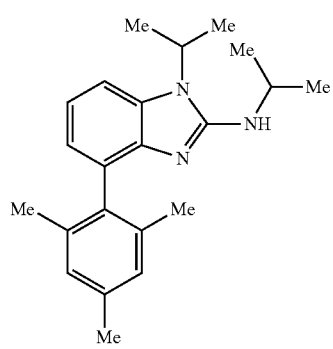
Ligand 28
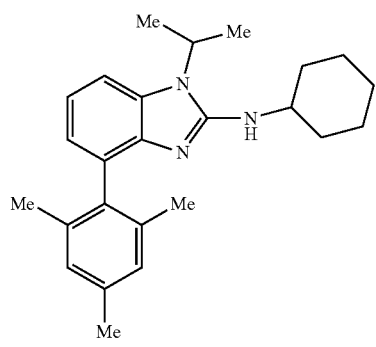
Ligand 29
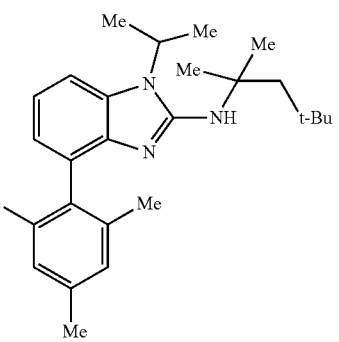
Ligand 30
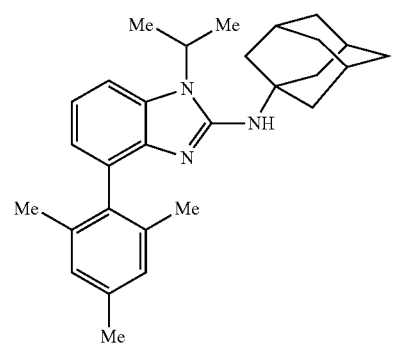
Ligand 31
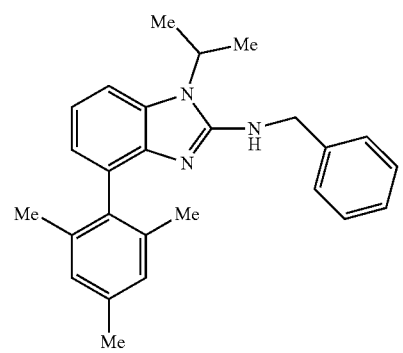
Ligand 32
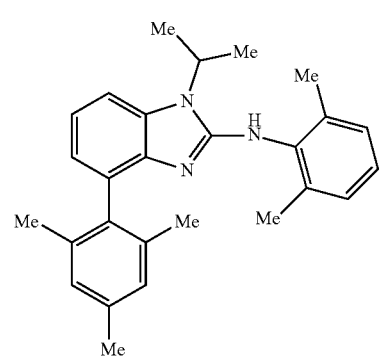

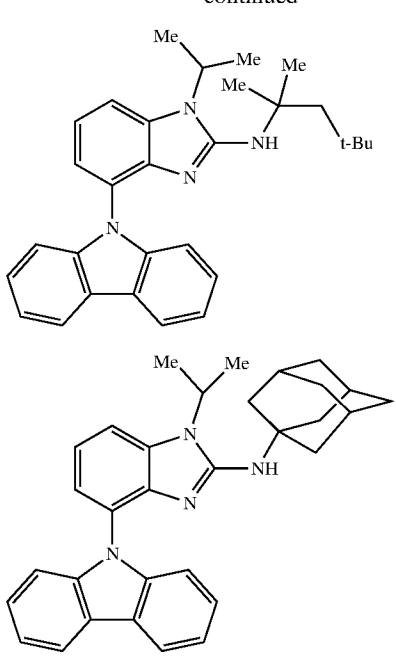

Ligand 33

Ligand 34

Chain Shuttling and/or Chain Transfer Agent

In one or more embodiments, the polymerization processes of this disclosure include contacting ethylene and/or one or more ($C_3$-$C_{12}$)α-olefins in a reactor in the presence of a catalyst system and a chain transfer agent or chain shuttling agent. In such embodiments, the polymerization process includes three components: (A) a procatalyst comprising a metal-ligand complex having a structure of formula (I) and, optionally, a cocatalyst; (B) an olefin polymerization catalyst having a comonomer selectivity different from that of the procatalyst (A); and (C) the chain transfer agent or chain shuttling agent.

As additions to a catalyst system, chain transfer agents and chain shuttling agents are compounds capable of transferring polymer chains between two catalyst molecules in a single polymerization reactor. The catalyst molecules may have the same structure or different structures. When the catalyst molecules have different structures, they may have different monomer selectivites. Whether the compounds function as chain transfer agents or as chain shuttling agents depends on the type of polymerization reactor, even though the three components (A)-(C) previously described may be chemically identical in either type of polymerization reactor. For example, in a batch reactor with a single-catalyst system or a dual-catalyst system, the compounds function as chain transfer agents. In a continuous reactor with a dual-catalyst system, the compounds function as chain shuttling agents. In general, compounds that function as chain transfer agents in a batch reactor also can function as chain shuttling agents in a continuous reactor; conversely, molecules that function as chain shuttling agents also can function as chain transfer agents. Therefore, in embodiments of polymerization processes in this disclosure, it should be understood that disclosure of a compound as a "chain transfer agent" further constitutes disclosure of the same compounds as a "chain shuttling agent." Thus, the terms "chain transfer agent" and "chain shuttling agent" are interchangeable with respect to chemical compounds but are distinguishable when a process is specified to occur within a particular kind of polymerization reactor.

A catalyst's chain transfer ability is initially evaluated by running a campaign in which the level of chain transfer or shuttling agent (CSA) is varied to observe the depression in molecular weight and overall effect on the PDI expected for a shuttling catalyst. The molecular weight of the polymer generated by catalysts with potential to be good chain shuttlers will be more sensitive to the addition of CSA than the polymer molecular weight generated by catalysts exhibiting poorer shuttling or slower chain transfers kinetics. The Mayo equation (Equation 1) describes how a chain transfer agent decreases the number average chain length ($\bar{X}_n$) from the native number average chain length ($\bar{X}_{n0}$) where no chain transfer agent is present. Equation 2 defines a chain transfer or chain shuttling constant, Ca, as the ratio of chain transfer and propagation rate constants. By assuming that the vast majority of chain propagation occurs through ethylene insertion and not comonomer incorporation, Equation 3 describes the expected Mn of a polymerization. $Mn_0$ is the native molecular weight of the catalyst in the absence of chain shuttling agent and Mn is the molecular weight that is observed with chain shuttling agent ($Mn=Mn_0$ with no chain shuttling agent).

$$\frac{1}{\bar{X}_n} = \frac{1}{\bar{X}_{n_0}} + \frac{k_{tr}[\text{chain transfer agent}]}{k_p[\text{monomer}]} \qquad \text{Equation 1}$$

$$Ca = \frac{k_{tr}}{k_p} \qquad \text{Equation 2}$$

$$\frac{1}{Mn} = \frac{1}{Mn_0} + Ca\frac{[CSA]}{[\text{monomer}] \times 28} \qquad \text{Equation 3}$$

[Monomer] = \qquad Equation 4

(Mol % $C2$) × [ethylene] + (Mol % $C8$) × [octene]

Typically, chain transfer agents comprise a metal that is Al, B, or Ga being in a formal oxidation state of +3; or a metal that is Zn or Mg being in a formal oxidation state of +2. Chain transfer agents suitable for processes of this disclosure are described in U.S. Patent Application Publication Number US 2007/0167315, which is incorporated herein by reference in its entirety.

In one or more embodiments of the polymerization process, the chain transfer agent, when present, may be chosen from diethylzinc, di(iso-butyl)zine, di(n-hexyl)zine, di(n-octyl)zine, triethylaluminum, trioctylaluminum, triethylgallium, iso-butylaluminum bis(dimethyl(t-butyl)siloxane), iso-butylaluminum bis(di(trimethylsilyl)amide), n-octylaluminum di(pyridine-2-methoxide), bis(n-octadecyl) iso-butylaluminum, iso-butylaluminum bis(di(n-pentyl) amide), n-octylaluminum bis(2,6-di-t-butylphenoxide, n-octylaluminum di(ethyl(1-naphthyl) amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), ethylzinc (t-butoxide), dimethylmagnesium, dibutylmagnesium, and n-butyl-sec-butylmagnesium.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to, or combining the complex with, an activating co-catalyst. Additionally, the metal-ligand complex according for formula (I) includes both a procatalyst form, which is neutral, and a catalytic form, which may be positively charged due to the loss of a monoanionic ligand, such a benzyl or phenyl. Suitable activating co-catalysts for use herein include alkyl aluminums; polymeric or oligomeric alumoxanes (also known as aluminoxanes); neutral Lewis acids; and non-polymeric, noncoordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluiminum. Examples of polymeric or oligomeric alumoxanes include methylalumoxane, triisobutylaluminurn-modified methylalumoxane, and isobutylalumoxane.

Lewis acid activating co-catalysts include Group 13 metal compounds containing $(C_1-C_{20})$hydrocarbyl substituents as described herein. In some embodiments, Group 13 metal compounds are tri$((C_1-C_{20})$hydrocarbyl$)$-substituted-aluminum or tri$((C_1-C_{20})$hydrocarbyl$)$-boron compounds. In other embodiments, Group 13 metal compounds are tri(hydrocarbyl)-substituted-aluminum, tri$((C_1-C_{20})$hydrocarbyl$)$-boron compounds, tri$((C_1-C_{10})$alkyl$)$aluminum, tri$((C_6-C_{18})$aryl$)$ boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$((C_1-C_{20})$hydrocarbyl borate (e.g. trityl tetrafluoroborate) or a tri$((C_1-C_{20})$hydrocarbyl$)$ammonium tetra$((C_1-C_{20})$hydrocarbyl$)$borane (e.g. bis(octadecyl)methylammonium tetrakis(pentafluorophenyl)borane). As used herein, the term "ammonium" means a nitrogen cation that is a $((C_1-C_{20})$hydrocarbyl$)_4N^+$ a $((C_1-C_{20})$hydrocarbyl$)_3N(H)^+$, a $((C_1-C_{20})$hydrocarbyl$)_2N(H)_2^+$, $(C_1-C_{20})$hydrocarbylN(H)$_3^+$, or N(H)$_4^+$, wherein each $(C_1-C_{20})$hydrocarbyl, when two or more are present, may be the same or different.

Combinations of neutral Lewis acid activating co-catalysts include mixtures comprising a combination of a tri $((C_1-C_4)$alkyl$)$aluminum and a halogenated tri$((C_6-C_{18})$aryl$)$ boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri$((C_1-C_4)$hydrocarbyl$)$aluminum, tri$((C_1-C_4)$hydrocarbyl$)$borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems described in the preceding paragraphs are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 0.5 mole percent (mol %) to 25 mol %; and in further embodiments the amount of additional α-olefin includes at least 5 mol % to 10 mol %. In some embodiments, the additional α-olefin is 1-octene.

Any conventional polymerization processes may be employed to produce the ethylene based polymers. Such conventional polymerization processes include, but are not limited to, solution polymerization processes, gas phase polymerization processes, slurry phase polymerization processes, and combinations thereof using one or more conventional reactors such as loop reactors, isothermal reactors, fluidized bed gas phase reactors, stirred tank reactors, batch reactors in parallel, series, or any combinations thereof, for example.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I). The polymer resulting from such a catalyst system that incorporates the metal-ligand complex of formula (I) may have a density according to ASTM D792 (incorporated herein by reference in its entirety) from 0.850 g/cm³ to 0.950 g/cm³, from 0.880 g/cm³ to 0.920 g/cm³, from 0.880 g/cm³ to 0.910 g/cm³, or from 0.880 g/cm³ to 0.900 g/cm³, for example.

In another embodiment, the polymer resulting from the catalyst system that includes the metal-ligand complex of formula (I) has a melt flow ratio ($I_{10}/I_2$) from 5 to 15, in which melt index $I_2$ is measured according to ASTM D1238 (incorporated herein by reference in its entirety) at 190° C. and 2.16 kg load, and melt index $I_{10}$ is measured according to ASTM D1238 at 190° C. and 10 kg load. In other embodiments the melt flow ratio ($I_{10}/I_2$) is from 5 to 10, and in others, the melt flow ratio is from 5 to 9.

In some embodiments, the polymer resulting from the catalyst system that includes the metal-ligand complex of formula (I) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 µm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 µm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel pressure reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of ligand in toluene and mixing it with a solution of hafnium tetrabenzyl or zirconium tetrabenzyl in toluene to form the procatalyst in situ. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 µL aliquot of the sample. The GPC is equipped with two Polymer Labs PLgel 10 µm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4Å molecular sieves, the second containing Q5 reactant. The $N_2$, used for transfers, is passed through a single column containing A204 alumina, 4Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 88 g ethylene and 568 g 1-octene in 1155 g of IsoparE, and the standard conditions at 150° C. are 81 g ethylene and 570 g 1-octene in 1043 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Examples 1 to 75 are synthetic procedures for ligand intermediates, ligands, and isolated procatalysts Structures of Ligands 1-34. Procatalysts 1 to 22 were synthesized from the Ligands 1-8. In Example 76, the results of the polymerization reactions of Procatalysts 1-22 are tabulated and discussed. One or more features of the present disclosure are illustrated in view of the examples as follows:

Example 1: 2-bromo-6-mesitylaniline

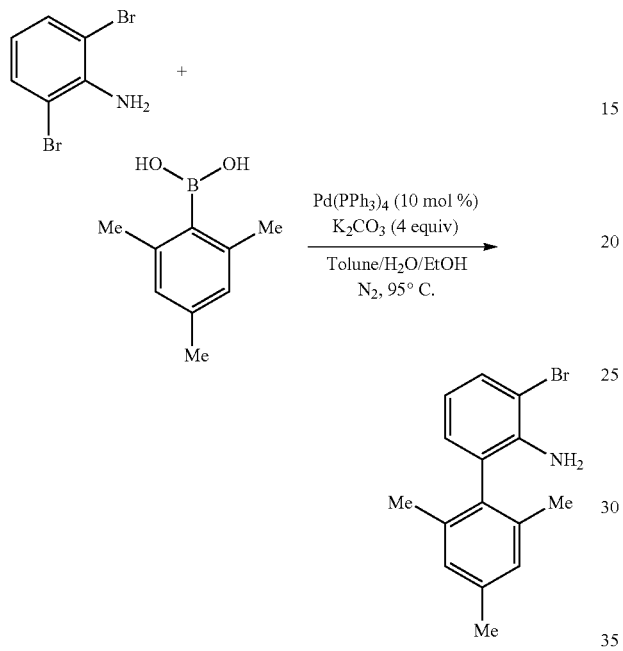

Under $N_2$ atmosphere, 2,6-dibromoaniline (1.50 g, 5.98 mmol, 1.0 equiv), mesitylboronic acid (7.17 mmol, 1.18 g, 1.2 equiv), $K_2CO_3$ (3.31 g, 23.9 mmol, 4.0 equiv), and $Pd(PPh_3)_4$ (0.690 g, 0.60 mmol, 0.1 equiv) were added to a round bottom flask. Toluene (36 mL), 24 mL of $H_2O$, and 12 mL of EtOH were added and the resulting mixture was heated to 95° C. for 48 hours. After cooling, the biphasic solution was diluted with saturated aqueous $NH_4Cl$ (100 mL) and $CH_2Cl_2$ (100 mL) and separated. The organic phase was washed with water (1×100 mL) and saturated aqueous $NaHCO_3$ (1×100 mL). The organic phase was dried over $Na_2SO_4$ and filtered. The filtrate was concentrated in vacuo to afford a brown oil. The crude product was purified by ISCO column chromatography on silica gel with ethyl acetate in hexanes as the solvent system. The product was not separated from residual starting material or the bis-coupled material as determined by UPLC, so it was resubmitted to reverse phase ISCO column chromatography with a water in acetonitrile solvent system. The purified material was collected as a pale yellow oil, 708.6 mg (41%).

$^1$H NMR (400 MHz, $CDCl_3$) δ 7.41 (ddd, J=8.0, 1.5, 0.6 Hz, 1H), 6.97 (s, 2H), 6.86 (ddd, J=7.4, 1.5, 0.5 Hz, 1H), 6.67 (ddd, J=7.9, 7.3, 0.6 Hz, 1H), 3.84 (s, 2H), 2.33 (s, 3H), 2.00 (s, 6H). $^{13}$C NMR (101 MHz, $CDCl_3$) δ 141.67, 137.62, 137.07, 134.50, 131.45, 129.25, 128.72, 127.30, 119.02, 109.36, 21.22, 20.17.

Example 2: 3-bromo-2-isothiocyanato-2',4',6'-trimethyl-1,1'-biphenyl

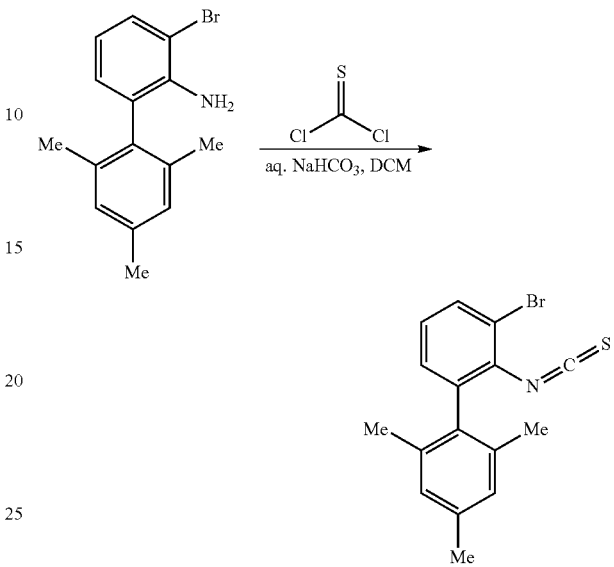

To a solution of 2-bromo-6-mesitylaniline (846 mg, 2.91 mmol, 1 equiv) in dichloromethane (4 mL) was added a solution of saturated aqueous $NaHCO_3$ (4 mL). The reaction mixture was cooled to 0° C., and thiophosgene (0.581 mL, 7.58 mmol, 2.6 equiv) was added dropwise. The reaction was allowed to warm to room temperature and stir for 48 hr. The mixture was then diluted with methylene chloride (20 mL), washed with brine (20 mL), the organic layer was dried over $Na_2SO_4$ and concentrated in vacuo to afford an orange oil. The crude product was purified by ISCO column chromatography on silica gel with ethyl acetate in hexanes as the solvent system. The purified material was collected as pale yellow crystals, a 914.3 mg yield (94% yield).

$^1$H NMR (400 MHz, $CDCl_3$) δ 7.57 (dd, J=8.0, 1.5 Hz, 1H), 7.18 (t, J=7.8 Hz, 1H), 7.12 (dd, J=7.6, 1.6 Hz, 1H), 6.96 (s, 2H), 2.35 (s, 3H), 1.98 (s, 6H). $^{13}$C NMR (101 MHz, $CDCl_3$) δ 140.98, 138.33, 136.28, 134.29, 132.01, 129.79, 128.43 (2C), 128.04, 119.90, 21.28, 20.32.

Example 3: Ligand 1—N-butyl-4-mesitylbenzothiazol-2-amine

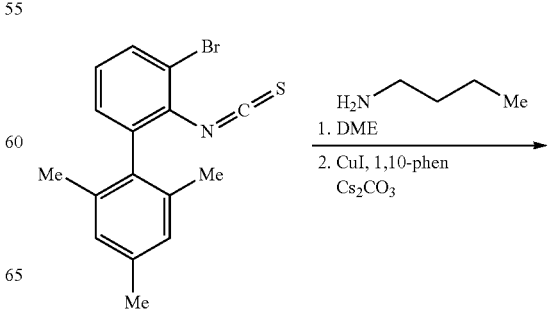

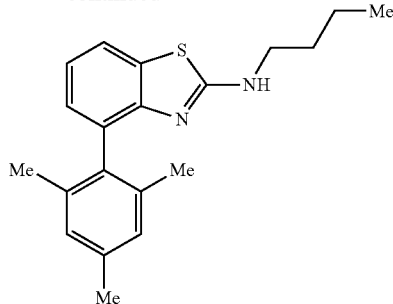

In the glovebox, a solution of 3-bromo-2-isothiocyanato-2',4',6'-trimethyl-1,1'-biphenyl in dimethoxyethane (0.3 M, 1.0 mL, 0.3 mmol, 1 equiv.) was added to a vial equipped with a stir bar. To the same vial was added dimethoxyethane (1.0 mL) and n-butylamine (0.060 mL, 0.6 mmol, 2 equiv.). The reaction was allowed to stir at room temperature overnight in order to allow the formation of the thiourea intermediate. The next day, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), and then washed with H₂O (2×25 mL), followed by saturated aqueous NaCl (25 mL). The organic layer was dried over MgSO₄, and concentrated in vacuo. The crude reaction mixture was purified using ISCO flash column chromatography with a silica gel column and an ethyl acetate in hexanes solvent system. The product was collected to provide 75 mg (77% yield).

¹H NMR (400 MHz, CDCl₃) δ 7.62 (d, J=7.8 Hz, 1H), 7.13 (t, J=7.6 Hz, 1H), 7.05 (d, J=7.4 Hz, 1H), 6.97 (s, 2H), 5.36 (t, J=5.4 Hz, 1H), 3.27 (q, J=6.9 Hz, 2H), 2.35 (s, 3H), 2.01 (s, 6H), 1.70-1.56 (m, 2H), 1.42 (dq, J=14.5, 7.3 Hz, 2H), 0.96 (t, J=7.3 Hz, 3H). ¹³C NMR (101 MHz, CDCl₃) δ 167.27, 151.08, 136.81, 136.57, 136.29, 131.44, 130.82, 128.05, 127.24, 120.99, 119.50, 45.71, 31.62, 21.19, 20.64, 19.96, 13.69.

Example 4: 1-(3-bromo-2',4',6'-trimethyl-[1,1'-biphenyl]-2-yl)-3-((trimethylsilyl)methyl)thiourea

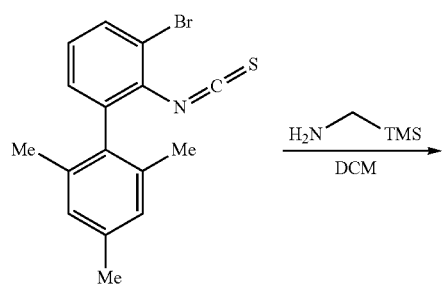

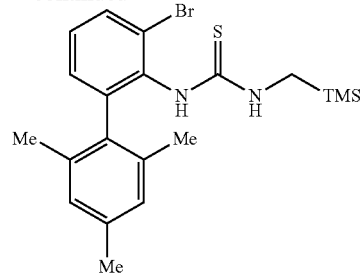

To a solution of 3-bromo-2-isothiocyanato-2',4',6'-trimethyl-1,1'-biphenyl (227 mg, 0.68 mmol, 1 equiv) in dichloromethane (4 mL) was added (trimethylsilyl)methylamine (0.183 mL, 1.37 mmol, 2 equiv). The reaction was allowed to stir at room temperature overnight. After 16 hrs the reaction was complete as determined by UPLC MS. The crude reaction mixture was purified using ISCO flash column chromatography with a silica gel column and an ethyl acetate in hexanes solvent system. The product was collected a provided 286 mg (96%).

¹H NMR (400 MHz, CDCl₃) δ 7.71 (d, J=8.0 Hz, 1H), 7.30 (t, J=7.8 Hz, 1H), 7.19 (d, J=7.6 Hz, 1H), 6.92 (s, 2H), 6.82 (s, 1H), 5.46 (s, 1H), 3.04 (s, 2H), 2.30 (s, 3H), 1.91 (s, 6H), 0.02 (s, 9H). ¹³C NMR (101 MHz, CDCl₃) δ 181.49, 141.87, 137.85, 135.10, 133.64, 132.96, 130.84, 129.68, 128.76 (2C), 123.61, 21.10, 20.41, -2.55.

Example 5: Ligand 3—4-mesityl-N-((trimethylsilyl)methyl)benzothiazol-2-amine

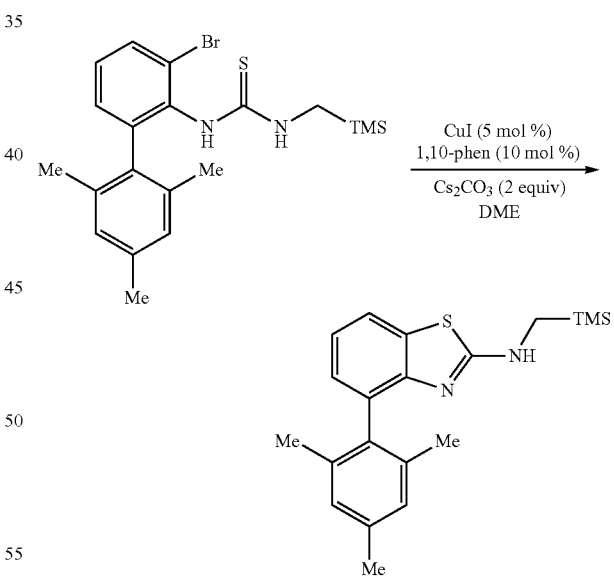

To a mixture of thiourea (94.7 mg, 0.22 mmol, 1 equiv.), Cs₂CO₃ (141.7 mg, 0.43 mmol, 2 equiv.), CuI (2.1 mg, 0.01 mmol, 5 mol %) and 1,10-phenanthroline (3.9 mg, 0.02 mmol, 10 mol %), was added dimethoxyethane (2 mL). The reaction mixture was heated at 70° C. for 16 h under nitrogen, at which point the cyclization was complete as determined by UPLCMS. The reaction was then diluted with ethyl acetate (25 mL), and then washed twice with 25 mL of water, followed by saturated aqueous NaCl (25 mL). The organic layer was dried over MgSO₄, and concentrated in vacuo. The crude reaction mixture was purified using ISCO flash column chromatography with a silica gel column and an ethyl acetate in hexanes solvent system. The reaction provided a 67% yield, 51.3 mg.

¹H NMR (500 MHz, CDCl₃) δ 7.62 (dd, J=7.8, 1.4 Hz, 1H), 7.10 (t, J=7.6 Hz, 1H), 7.03 (dd, J=7.4, 1.4 Hz, 1H), 6.95 (s, 2H), 5.24 (s, 1H), 2.66 (d, J=4.8 Hz, 2H), 2.32 (s, 3H), 1.99 (s, 6H), 0.11 (s, 9H). ¹³C NMR (101 MHz, CDCl₃) δ 170.56, 151.51, 136.97, 136.76, 136.45, 131.38, 130.95, 128.18, 127.30, 120.91, 119.68, 36.53, 21.33, 20.75, −2.57.

Example 6: 1-(3-bromo-2',4',6'-trimethyl-[1,1'-biphenyl]-2-yl)-3-isopropylthiourea

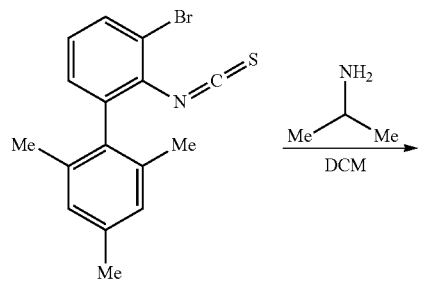

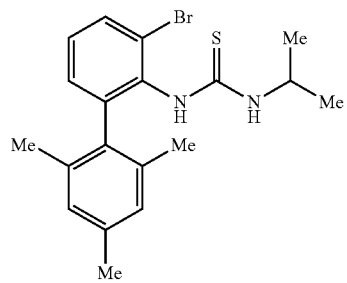

To a solution of 3-bromo-2-isothiocyanato-2',4',6'-trimethyl-1,1'-biphenyl (81.1 mg, 0.24 mmol, 1 equiv) in dichloromethane (2 mL) was added isopropylamine (0.042 mL, 0.49 mmol, 2 equiv). The reaction was allowed to stir at room temperature overnight. After 16 hrs the reaction was complete as determined by UPLC MS, and concentrated to a pale yellow oil, 95 mg (99%). The oil was carried on to the next step without further purification.

¹H NMR (400 MHz, CDCl₃) δ 7.70 (dd, J=8.0, 1.5 Hz, 1H), 7.30 (t, J=7.8 Hz, 1H), 7.19 (dd, J=7.6, 1.5 Hz, 1H), 6.93 (s, 2H), 5.29 (s, 2H), 4.49 (dq, J=13.0, 6.3 Hz, 1H), 2.30 (s, 3H), 1.93 (s, 6H), 1.14 (d, J=6.6 Hz, 6H). ¹³C NMR (101 MHz, CDCl₃) δ 178.89, 141.81, 138.07, 135.20, 133.61, 133.26, 131.01, 129.80, 128.94 (2C), 123.52, 47.69, 22.30, 21.17, 20.59.

Example 7: Ligand 4—N-isopropyl-4-mesitylbenzothiazol-2-amine

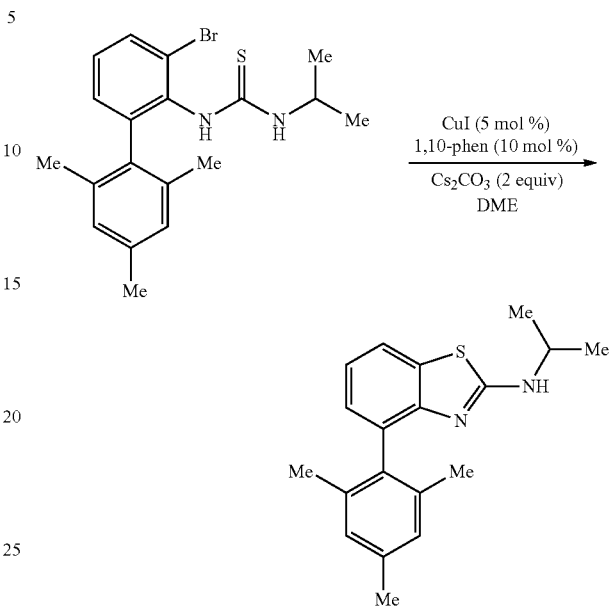

To a mixture of the thiourea (95.0 mg, 0.24 mmol, 1 equiv.), Cs₂CO₃ (158.2 mg, 0.49 mmol, 2 equiv.), CuI (2.3 mg, 0.01 mmol, 5 mol %) and 1,10-phenanthroline (4.4 mg, 0.02 mmol, 10 mol %), was added dimethoxyethane (2 mL). The reaction mixture was heated at 70° C. for 4 h under nitrogen, at which point the cyclization was complete as determined by UPLCMS. The reaction was then diluted with ethyl acetate (25 mL), and then washed with H₂O (2×25 mL), followed by saturated aqueous NaCl (25 mL). The organic layer was dried over MgSO₄, and concentrated in vacuo. The crude reaction mixture was purified using ISCO flash column chromatography with a silica gel column and an ethyl acetate in hexanes solvent system. The product 58.3 mg (77%).

¹H NMR (500 MHz, CDCl₃) δ 7.60 (dt, J=7.8, 1.1 Hz, 1H), 7.12 (td, J=7.6, 0.9 Hz, 1H), 7.04 (dt, J=7.5, 1.1 Hz, 1H), 6.96 (s, 2H), 5.23 (d, J=7.9 Hz, 1H), 3.66 (h, J=6.5 Hz, 1H), 2.34 (s, 3H), 2.01 (s, 6H), 1.27 (d, J=6.4 Hz, 6H). ¹³C NMR (126 MHz, CDCl₃) δ 166.14, 151.05, 136.94, 136.64, 136.40, 131.58, 130.99, 128.16, 127.33, 121.16, 119.59, 48.14, 23.19, 21.32, 20.79.

Example 8: Ligand 5—N-cyclohexyl-4-mesitylbenzothiazol-2-amine

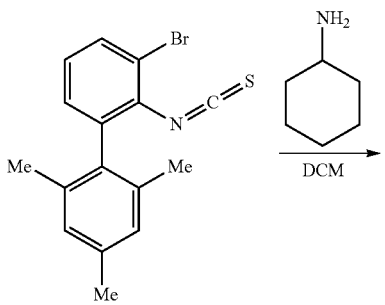

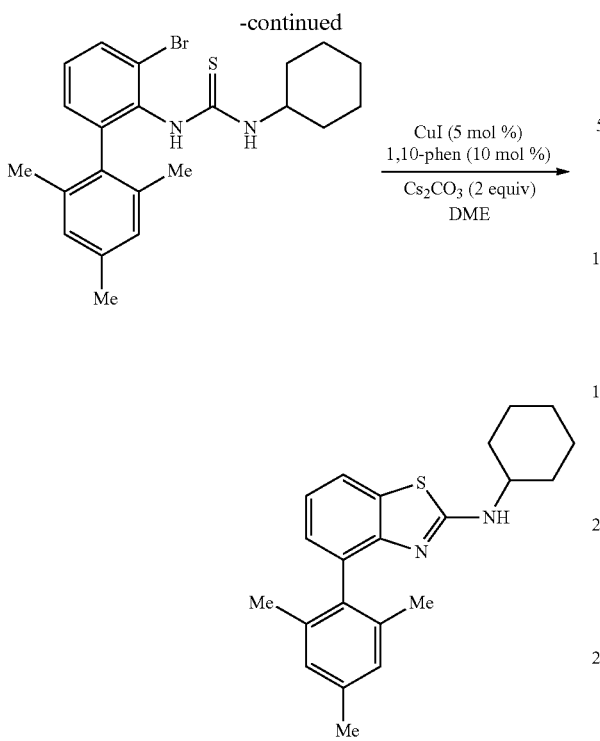

To a solution of 3-bromo-2-isothiocyanato-2',4',6'-trimethyl-1,1'-biphenyl (99.0 mg, 0.30 mmol, 1 equiv) in dichloromethane (3 mL) was added cyclohexylamine (0.068 mL, 0.60 mmol, 2 equiv). The reaction was allowed to stir at room temperature overnight. After 16 hrs the reaction was concentrated to a colorless translucent oil and was carried on to the next step without further purification. To a mixture of the thiourea (128.0 mg, 0.30 mmol, 1 equiv.), $Cs_2CO_3$ (193.3 mg, 0.59 mmol, 2 equiv.), CuI (2.8 mg, 0.01 mmol, 5 mol %) and 1,10-phenanthroline (5.3 mg, 0.03 mmol, 10 mol %), was added dimethoxyethane (2 mL). The reaction mixture was heated at 70° C. for 4 h under nitrogen, at which point the cyclization was complete as determined by UPLCMS. The reaction was then diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected providing 79.5 mg (77%).

$^1$H NMR (400 MHz, $CDCl_3$) δ 7.62 (dd, J=7.7, 1.4 Hz, 1H), 7.13 (t, J=7.6 Hz, 1H), 7.07 (dd, J=7.4, 1.4 Hz, 1H), 6.99 (s, 2H), 5.42 (d, J=8.3 Hz, 1H), 3.31 (dddd, J=13.5, 9.7, 8.1, 3.8 Hz, 1H), 2.36 (s, 3H), 2.16-2.06 (m, 2H), 2.04 (s, 6H), 1.84-1.73 (m, 2H), 1.70-1.59 (m, 1H), 1.50-1.34 (m, 2H), 1.34-1.22 (m, 3H). $^{13}$C NMR (101 MHz, $CDCl_3$) δ 166.22, 151.05, 136.92, 136.61, 136.35, 131.43, 130.88, 128.15, 127.27, 121.04, 119.55, 55.09, 33.29, 25.50, 24.68, 21.29, 20.77.

Example 9: Ligand 6—N-(tert-butyl)-4-mesitylbenzothiazol-2-amine

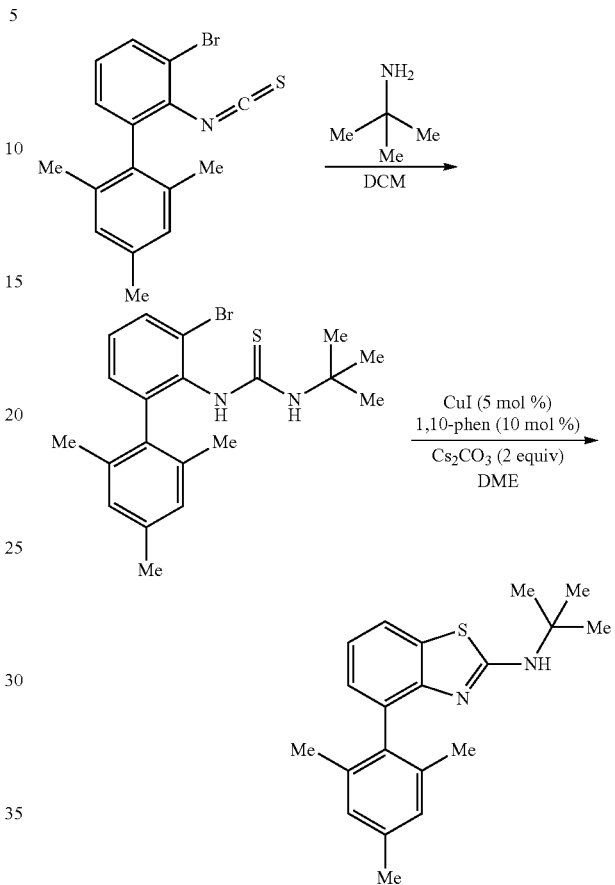

To a solution of 3-bromo-2-isothiocyanato-2',4',6'-trimethyl-1,1'-biphenyl (128.0 mg, 0.39 mmol, 1 equiv) in dichloromethane (3 mL) was added t-butylamine (0.081 mL, 0.77 mmol, 2 equiv). The reaction was allowed to stir at room temperature overnight. After 16 hrs the reaction was concentrated to a colorless translucent oil, 150 mg (96%). The oil was carried on to the next step without further purification. To a mixture of thiourea (150 mg, 0.37 mmol, 1 equiv.), $Cs_2CO_3$ (241.1 mg, 0.74 mmol, 2 equiv.), CuI (3.5 mg, 0.02 mmol, 5 mol %) and 1,10-phenanthroline (6.7 mg, 0.04 mmol, 10 mol %), was added dimethoxyethane (2 mL). The reaction mixture was heated at 70° C. for 16 h under nitrogen, at which point the cyclization was complete as determined by UPLCMS. The reaction was then diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected, providing 101.2 mg (84%).

$^1$H NMR (400 MHz, $CDCl_3$) 7.62 (dd, J=7.7, 1.4 Hz, 1H), 7.15 (t, J=7.6 Hz, 1H), 7.08 (dd, J=7.4, 1.4 Hz, 1H), 6.99 (s, 2H), 5.40 (s, 1H), 2.38 (s, 3H), 2.05 (s, 6H), 1.42 (s, 9H). $^{13}$C NMR (101 MHz, $CDCl_3$) δ 163.99, 150.50, 137.04, 136.43, 136.40, 131.68, 131.38, 127.99, 127.15, 121.30, 119.25, 52.77, 29.15, 21.29, 20.76.

Example 10: Ligand 7—N-(adamantan-1-yl)-4-mesitylbenzothiazol-2-amine

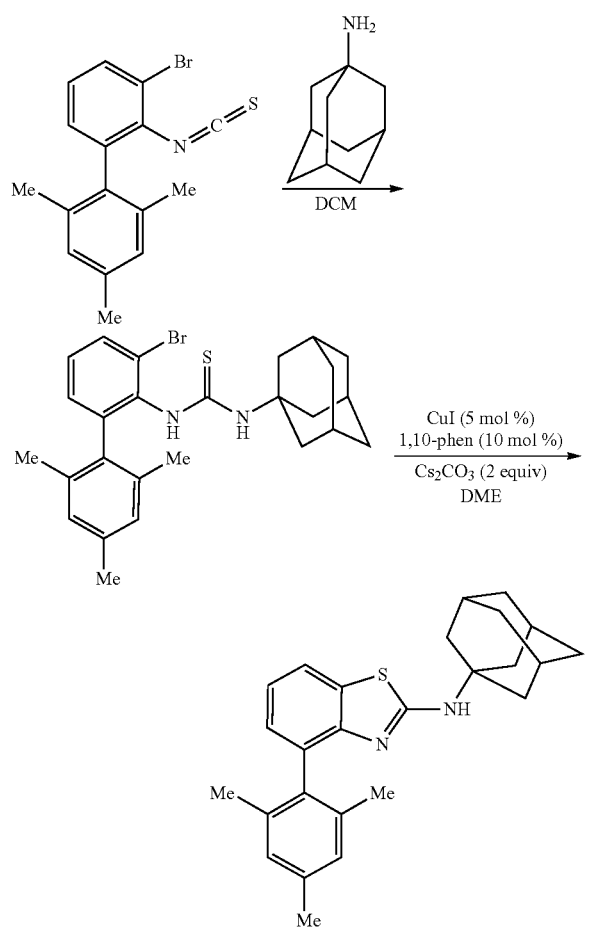

To a solution of 3-bromo-2-isothiocyanato-2',4',6'-trimethyl-1,1'-biphenyl (101.0 mg, 0.30 mmol, 1 equiv) in dichloromethane (3 mL) was added 1-adamantylamine (0.069 mg, 0.46 mmol, 1.5 equiv). The reaction was allowed to stir at room temperature overnight. After 16 hrs the reaction was concentrated to an off-white solid. The resultant solid was carried on to the next step without further purification. To a mixture of thiourea (147.0 mg, 0.30 mmol, 1 equiv.), $Cs_2CO_3$ (198.1 mg, 0.52 mmol, 2 equiv.), CuI (2.9 mg, 0.02 mmol, 5 mol %) and 1,10-phenanthroline (5.5 mg, 0.03 mmol, 10 mol %) was added dimethoxyethane (2 mL). The reaction mixture was heated at 70° C. for 6 h under nitrogen, at which point the cyclization was complete as determined by UPLCMS. The reaction was then diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected, providing 108 mg (88%).

$^1$H NMR (400 MHz, $CDCl_3$) δ 7.60 (dd, J=7.7, 1.3 Hz, 1H), 7.13 (t, J=7.6 Hz, 1H), 7.06 (dd, J=7.4, 1.4 Hz, 1H), 6.98 (s, 2H), 5.46 (s, 1H), 2.36 (s, 3H), 2.18-2.11 (m, 3H), 2.03 (s, 6H), 2.01 (d, J=2.9 Hz, 6H), 1.70 (qd, J=12.2, 5.9 Hz, 6H). $^{13}$C NMR (101 MHz, $CDCl_3$) δ 163.45, 150.04, 136.99, 136.53, 136.41, 131.56, 131.48, 128.04, 127.09, 121.19, 119.20, 52.86, 42.00, 36.29, 29.60, 21.27, 20.77.

Example 11: Ligand 8—N-benzyl-4-mesitylbenzothiazol-2-amine

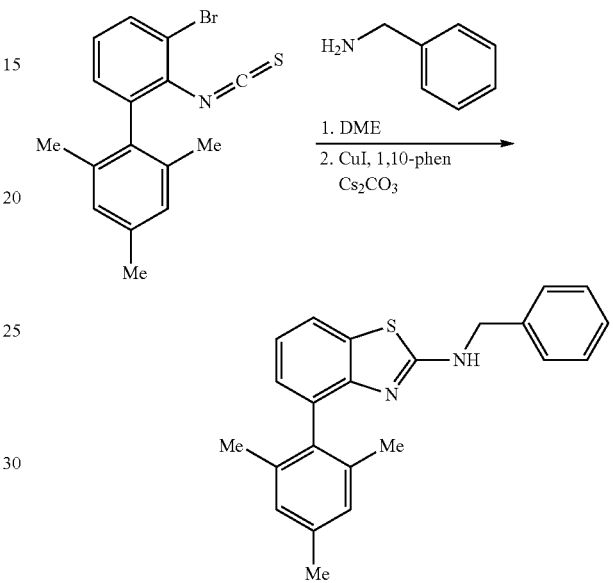

In the glovebox, a solution of 3-bromo-2-isothiocyanato-2',4',6'-trimethyl-1,1'-biphenyl in dimethoxyethane (0.3 M, 1.0 mL, 0.3 mmol, 1 equiv.) was added to a vial equipped with a stir bar. To the same vial was added dimethoxyethane (1.0 mL) and benzylamine (0.066 mL, 0.6 mmol, 2 equiv.). The reaction was allowed to stir at room temperature overnight in order to allow the formation of the thiourea intermediate. The next day, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the CM-3 glovebox. The reaction was diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected, providing 100 mg (93%).

$^1$H NMR (400 MHz, $CDCl_3$) δ 7.61 (d, J=7.8 Hz, 1H), 7.39-7.30 (m, 5H), 7.15 (t, J=7.6 Hz, 1H), 7.07 (d, J=6.1 Hz, 1H), 6.97 (s, 2H), 5.67 (s, 1H), 4.49 (d, J=5.8 Hz, 2H), 2.35 (s, 3H), 2.01 (s, 6H). $^{13}$C NMR (101 MHz, $CDCl_3$) δ 136.83, 136.32, 129.56, 128.09, 127.42, 124.02, 122.38, 119.61, 119.46, 41.00, 21.20, 20.65.

Example 12: 1-(3-bromo-2',4',6'-trimethyl-[1,1'-biphenyl]-2-yl)-3-phenylthiourea

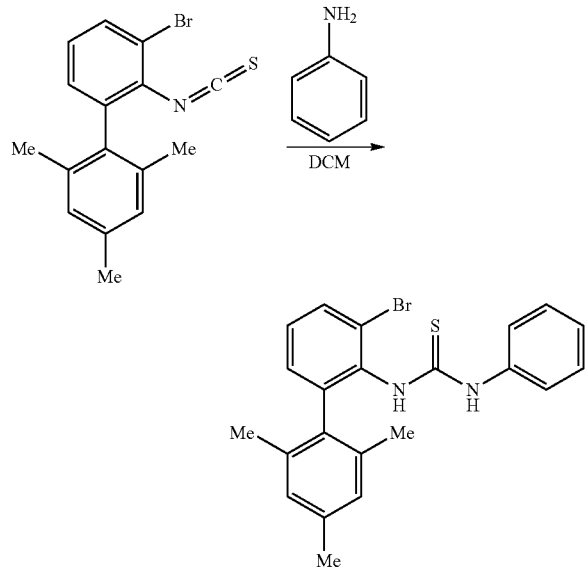

To a solution of 3-bromo-2-isothiocyanato-2',4',6'-trimethyl-1,1'-biphenyl (107.5 mg, 0.32 mmol, 1 equiv) in dichloromethane (2.5 mL) was added aniline (0.059 mL, 0.65 mmol, 2 equiv). The reaction was allowed to stir at room temperature overnight. After 16 hrs the reaction was concentrated to a pale yellow oil. The crude reaction mixture was purified using ISCO flash column chromatography with a silica gel column and an ethyl acetate in hexanes solvent system. The product was collected, providing 138 mg (87%).

$^1$H NMR (400 MHz, CDCl$_3$) δ 7.69 (ddd, J=8.0, 1.5, 0.5 Hz, 1H), 7.50 (s, 1H), 7.35-7.26 (m, 4H), 7.17 (ddd, J=7.6, 1.5, 0.6 Hz, 1H), 6.96 (s, 2H), 6.89 (s, 1H), 6.85 (d, J=7.4 Hz, 2H), 2.36 (s, 3H), 1.95 (s, 6H). $^{13}$C NMR (101 MHz, CDCl$_3$) δ 180.26, 141.87, 137.72, 136.54, 135.03, 134.57, 132.67, 130.17, 129.87, 129.65, 128.77, 127.58, 125.70 (2C), 125.12, 21.26, 20.75.

Example 13: Ligand 9-4-mesityl-N-phenylbenzothiazol-2-amine

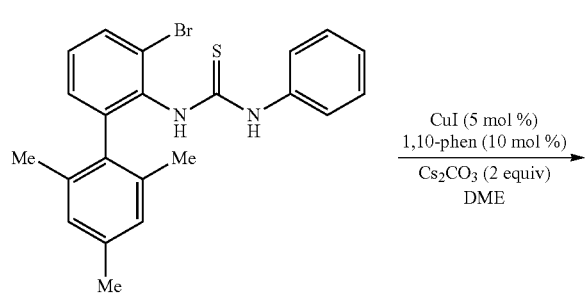

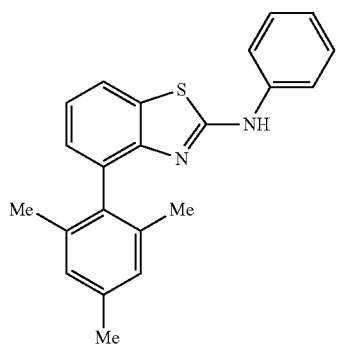

To a mixture of thiourea (111.4 mg, 0.26 mmol, 1 equiv.), Cs$_2$CO$_3$ (170.6 mg, 0.52 mmol, 2 equiv.), CuI (2.5 mg, 0.01 mmol, 5 mol %) and 1,10-phenanthroline (4.7 mg, 0.03 mmol, 10 mol %), was added dimethoxyethane (2 mL). The reaction mixture was heated at 70° C. for 18 h under nitrogen, at which point the cyclization was complete as determined by UPLCMS. The reaction was then diluted with ethyl acetate (25 mL), and then washed with H$_2$O (2×25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The product was collected, providing 75.1 mg (83%).

$^1$H NMR (400 MHz, CDCl$_3$) δ 7.63 (dd, J=7.8, 1.3 Hz, 1H), 7.42 (s, 1H), 7.39-7.32 (m, 2H), 7.30 (dt, J=8.3, 0.9 Hz, 2H), 7.21 (t, J=7.6 Hz, 1H), 7.15-7.09 (m, 2H), 6.98 (s, 2H), 2.35 (s, 3H), 2.02 (s, 6H). $^{13}$C NMR (101 MHz, CDCl$_3$) δ 162.99, 149.66, 140.05, 136.86, 136.46, 136.38, 132.23, 130.48, 129.51, 128.20, 127.58, 123.94, 122.46, 119.70, 119.47, 21.29, 20.80.

Example 14: Ligand 10—N-(3,5-di-tert-butylphenyl)-4-mesitylbenzothiazol-2-amine

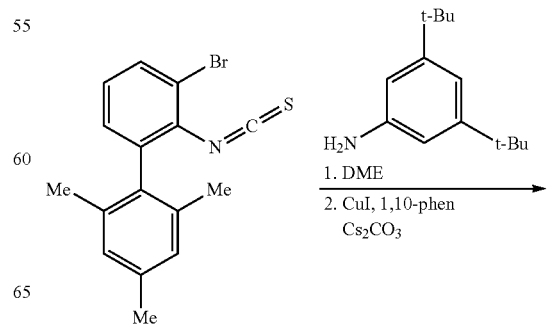

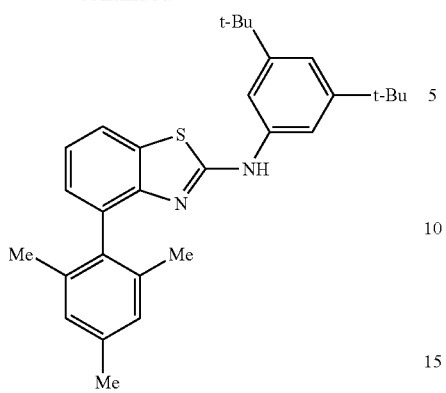

In the glovebox, a solution of 3-bromo-2-isothiocyanato-2',4',6'-trimethyl-1,1'-biphenyl in dimethoxyethane (0.3 M, 1.0 mL, 0.3 mmol, 1 equiv.) was added to a vial equipped with a stir bar. To the same vial was added dimethoxyethane (1.0 mL) and 3,5-di-tert-butylaniline (124 mg, 0.6 mmol, 2 equiv.). The reaction was allowed to stir at room temperature overnight in order to allow the formation of the thiourea intermediate. The next day, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the CM-3 glovebox. The reaction was diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected, providing 117 mg (85%).

$^1$H NMR (400 MHz, $CDCl_3$) δ 7.66 (dd, J=7.9, 1.3 Hz, 1H), 7.29-7.26 (d, 2H), 7.23 (t, J=7.6 Hz, 1H), 7.17 (t, J=1.7 Hz, 1H), 7.14 (dd, J=7.4, 1.3 Hz, 1H), 6.99 (s, 2H), 2.38 (s, 3H), 2.05 (s, 6H), 1.31 (s, 18H). $^{13}$C NMR (101 MHz, $CDCl_3$) δ 152.18, 136.59, 136.27, 129.06, 128.25, 128.09, 127.26, 125.32, 122.28, 119.45, 117.80, 113.76, 34.98, 31.35, 21.21, 20.69.

Example 15: Ligand 11—N-(2,6-dimethylphenyl)-4-mesitylbenzothiazol-2-amine

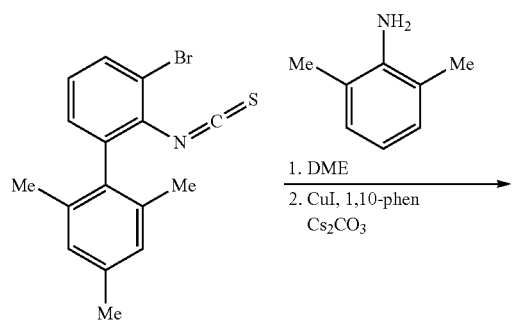

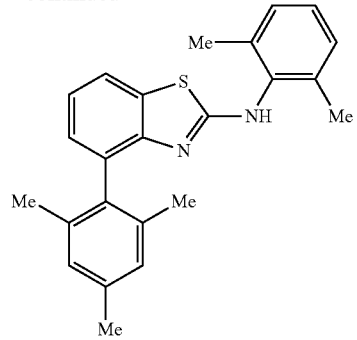

In the glovebox, a solution of 3-bromo-2-isothiocyanato-2',4',6'-trimethyl-1,1'-biphenyl in dimethoxyethane (0.3 M, 1.0 mL, 0.3 mmol, 1 equiv.) was added to a vial equipped with a stir bar. To the same vial was added dimethoxyethane (1.0 mL) and 2,6-dimethylaniline (74 uL, 0.6 mmol, 2 equiv.). The reaction was allowed to stir at room temperature overnight in order to allow the formation of the thiourea intermediate. The next day, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the CM-3 glovebox. The reaction was diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected, providing 80.7 mg (72%).

$^1$H NMR (400 MHz, $CDCl_3$) δ 7.52 (dd, J=7.7, 1.4 Hz, 1H), 7.27-7.20 (m, 1H), 7.19 (d, J=7.9 Hz, 2H), 7.15 (t, J=7.6 Hz, 1H), 7.09 (dd, J=7.5, 1.4 Hz, 1H), 7.07 (s, 1H), 7.00 (s, 2H), 2.39 (s, 3H), 2.30 (s, 6H), 2.07 (s, 6H). $^{13}$C NMR (101 MHz, $CDCl_3$) δ 167.79, 150.92, 137.52, 137.18, 136.80, 136.62, 136.40, 131.61, 131.10, 128.98, 128.38, 128.29, 127.37, 121.54, 119.66, 21.33, 20.77, 18.23.

Example 16: Ligand 12—N-(2,6-diisopropylphenyl)-4-mesitylbenzothiazol-2-amine

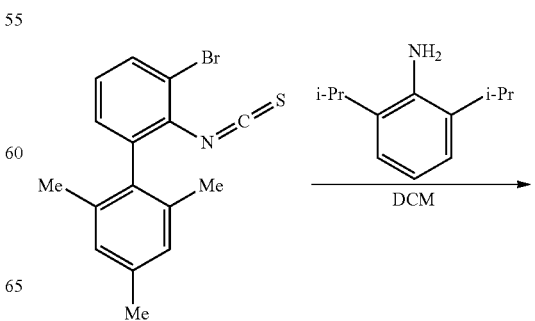

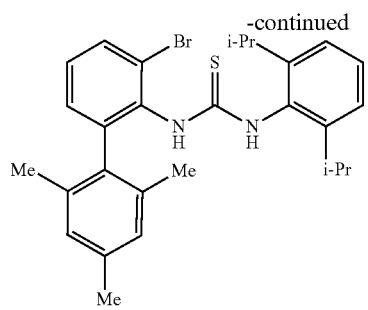

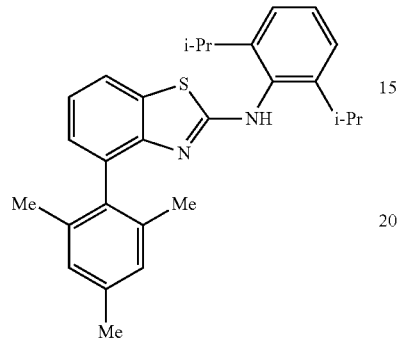

To a solution of 3-bromo-2-isothiocyanato-2',4',6'-trimethyl-1,1'-biphenyl (94.2 mg, 0.28 mmol, 1 equiv) in dichloromethane (3 mL) was added 2,6-diisopropylaniline (0.107 mL, 0.57 mmol, 2 equiv). The reaction was allowed to stir at room temperature overnight. After 16 hrs the reaction was concentrated to a colorless translucent oil. The yield was taken to be quantitative and the oil was carried on to the next step without further purification. To a mixture of the thiourea (144 mg, 0.28 mmol, 1 equiv.), $Cs_2CO_3$ (170.6 mg, 0.57 mmol, 2 equiv.), CuI (2.7 mg, 0.01 mmol, 5 mol %) and 1,10-phenanthroline (5.1 mg, 0.03 mmol, 10 mol %), was added dimethoxyethane (2 mL). The reaction mixture was heated at 70° C. for 16 h under nitrogen, at which point the cyclization was complete as determined by UPLCMS. The reaction was then diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product co-eluted with 2,6-diisopropylaniline and was collected. 2,6-diisopropylaniline were further purified using reverse phase ISCO flash column chromatography with a water in acetonitrile solvent system. The product was collected providing 57.6 mg (48%).

$^1$H NMR (400 MHz, $CDCl_3$) δ 7.53 (dd, J=7.6, 1.5 Hz, 1H), 7.41 (t, J=7.7 Hz, 1H), 7.28 (d, J=7.7 Hz, 2H), 7.15 (t, J=7.5 Hz, 1H), 7.10 (dd, J=7.5, 1.5 Hz, 1H), 7.03 (s, 2H), 6.73 (s, 1H), 3.29 (hept, J=6.8 Hz, 2H), 2.38 (s, 3H), 2.10 (s, 6H), 1.21 (d, J=6.9 Hz, 12H). $^{13}$C NMR (101 MHz, $CDCl_3$) δ 168.90, 151.30, 148.16, 136.96, 136.78, 136.46, 133.96, 131.84, 131.40, 129.44, 128.34, 127.31, 124.42, 121.53, 119.76, 28.51, 25.41, 21.35, 20.84.

Example 17: 2',4',6'-trimethyl-[1,1'-biphenyl]-2-amine

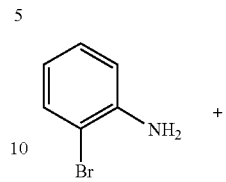

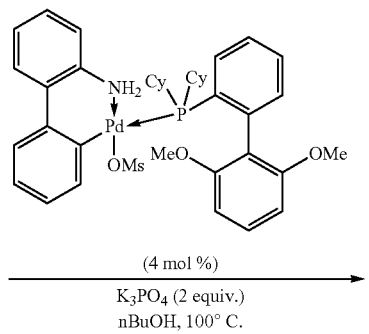

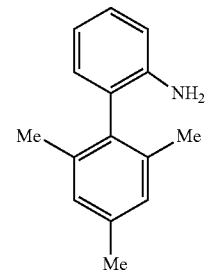

In a nitrogen-filled glovebox, a reaction vial was charged with SPhos G3 precatalyst (0.552 g, 0.707 mmol, 4 mol %), SPhos (0.290 g, 0.707 mmol, 4 mol %), $K_3PO_4$ (7.50 g, 35.3 mmol, 2 equiv.), and mesityl boronic acid (4.35 g, 26.5 mmol, 1.5 equiv.). The vessel was sealed with a septum, removed from the glovebox, and attached to a nitrogen-filled Schlenk line. 2-Bromoaniline (2.0 mL, 17.7 mmol, 1 equiv.) and anhydrous n-butanol (40 mL) were added via syringe. The reaction was stirred at 100° C. for 20 h, resulting in a black solution with significant amounts of precipitate. The material was filtered through a short plug of silica gel, which was eluted with ethyl acetate (3×50 mL), yielding a light brown solution. The filtrate was concentrated in vacuo, adsorbed onto silica gel, and purified by flash column chromatography (220 g silica gel, 0.5-3% EtOAc in hexane) to afford a white solid (1.48 g, 40% yield).

$^1$H NMR (400 MHz, Chloroform-d) δ 7.15 (ddt, J=7.9, 7.3, 1.6 Hz, 1H), 6.96 (s, 2H), 6.90 (dt, J=7.5, 1.5 Hz, 1H), 6.84-6.74 (m, 2H), 3.38 (s, 2H), 2.32 (d, J=0.7 Hz, 3H), 2.01 (d, J=0.8 Hz, 6H). $^{13}$C NMR (101 MHz, Chloroform-d) δ 143.53, 137.02, 136.95, 134.85, 129.95, 128.37, 128.01, 126.16, 118.46, 114.93, 21.03, 20.07. HRMS (ESI) Calculated for $C_{15}H_{17}N$ [M+H]$^+$: 212.1434; found 212.1431.

Example 18: 1-(2',4',6'-trimethyl-[1,1'-biphenyl]-2-yl)thiourea

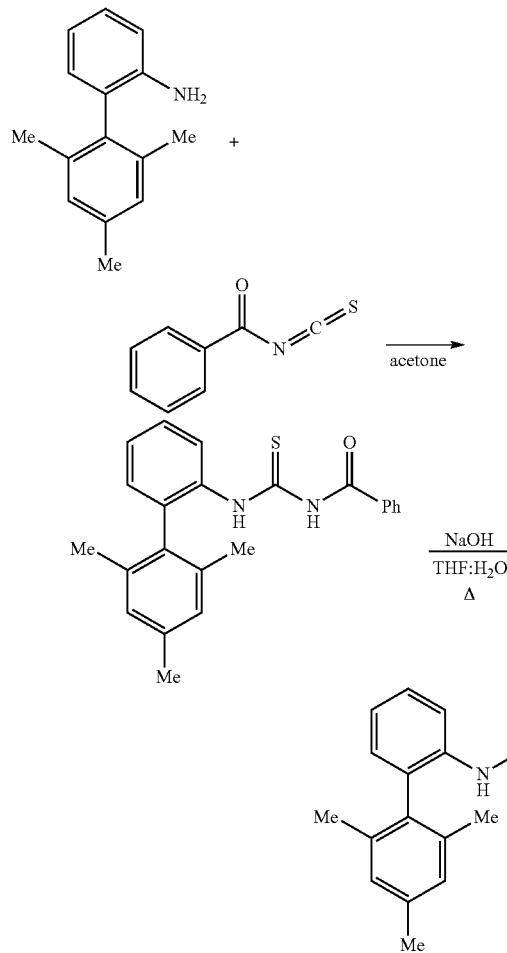

A reaction vial was charged with 2',4',6'-trimethyl-[1,1'-biphenyl]-2-amine (0.973 g, 4.61 mmol, 1 equiv.) and acetone (12 mL). Benzoyl isothiocyanate (0.668 mL, 5.07 mmol, 1.1 equiv.) was added, yielding a yellow solution. The reaction was stirred at room temperature for 50 min. All volatiles were removed in vacuo, yielding a yellow solid. The solid was washed with hexane (3×5 mL). The material was dried in vacuo. The solid was dissolved in THF (20 mL). NaOH (0.921 g, 23.0 mmol, 5 equiv.) and water (8 mL) were added, and the reaction was stirred under reflux at 85° C. for 2.5 h, followed by stirring at room temperature for 2 h. The majority of the THF was removed in vacuo. The solution was poured onto deionized water (100 mL). The aqueous phase was washed with EtOAc (3×50 mL). The combined organic phases were dried over MgSO$_4$, filtered, and concentrated in vacuo. The material was adsorbed onto silica gel and purified by flash column chromatography (80 g silica gel, 20-40% EtOAc in hexane) to yield the product as a white solid (0.921 g, 74% yield).

$^1$H NMR (400 MHz, Chloroform-d) δ 7.45 (dd, J=8.0, 1.5 Hz, 1H), 7.40 (ddd, J=8.2, 7.4, 1.6 Hz, 1H), 7.30 (td, J=7.4, 1.5 Hz, 1H), 7.19-7.15 (m, 1H), 7.13 (s, 1H), 6.43 (s, 2H), 2.29 (s, 3H), 1.90 (s, 6H). $^{13}$C NMR (101 MHz, Chloroform-d) δ 181.24, 138.05, 136.18, 135.55, 134.91, 133.03, 131.93, 128.90, 128.74, 127.23, 123.93, 21.22, 20.40.

Example 19: 4-mesitylbenzothiazol-2-amine

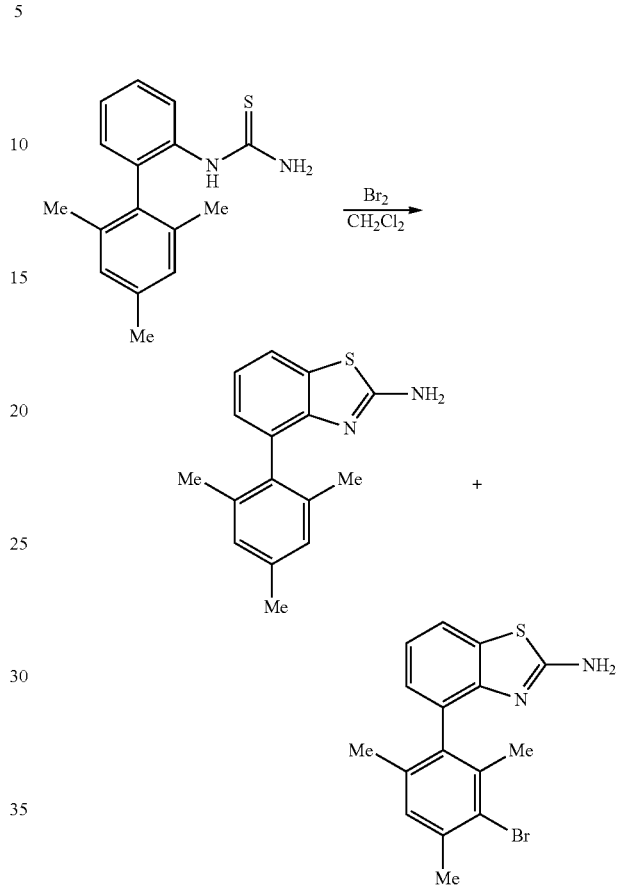

A 100 mL round bottom flask was charged with 1-(2',4',6'-trimethyl-[1,1'-biphenyl]-2-yl)thiourea (0.899 mg, 3.32 mmol, 1 equiv.). The vessel was evacuated and backfilled with nitrogen three times. Dichloromethane (19 mL) was added via syringe. Bromine (0.17 mL, 3.32 mmol, 1 equiv.) was added dropwise via syringe. The color quickly dissipated after the addition of each drop for the first half of the addition. Subsequently, some color remained to yield a final slightly orange colored homogeneous solution. The reaction was stirred at room temperature for 3 h. upon which 40% aqueous NH$_4$OH (5 mL) was added via syringe to neutralize the acid. The material was poured onto deionized water (100 mL). The aqueous phase was extracted with dichloromethane (3×50 mL). The combined organic phases were dried over MgSO$_4$, filtered, and concentrated in vacuo. The residue was adsorbed onto silica gel and purified by flash column chromatography (40 g silica gel, 15-30% EtOAc in hexane) to yield an off-white solid (0.7543 g). NMR analysis showed the material to be an 85:15 mixture of the desired product and the mesityl bromination product 4-(3-bromo-2,4,6-trimethylphenyl)benzothiazol-2-amine. From the molar ratios and crude yield, the actual yield was calculated to be 0.665 g (75%).

$^1$H NMR (400 MHz, Chloroform-d) δ 7.54 (dd, J=7.8, 1.3 Hz, 1H), 7.15-7.10 (m, 1H), 7.05-7.00 (m, 3H), 6.11 (s, 2H), 2.46 (s, 3H), 1.99 (s, 6H). $^{13}$C NMR (101 MHz, Chloroform-d) δ 167.28, 150.70, 137.58, 137.36, 136.45, 130.90, 130.49, 127.72, 126.67, 121.60, 119.64, 21.07, 20.55.

Example 20:
N-(4-mesitylbenzothiazol-2-yl)pivalamide

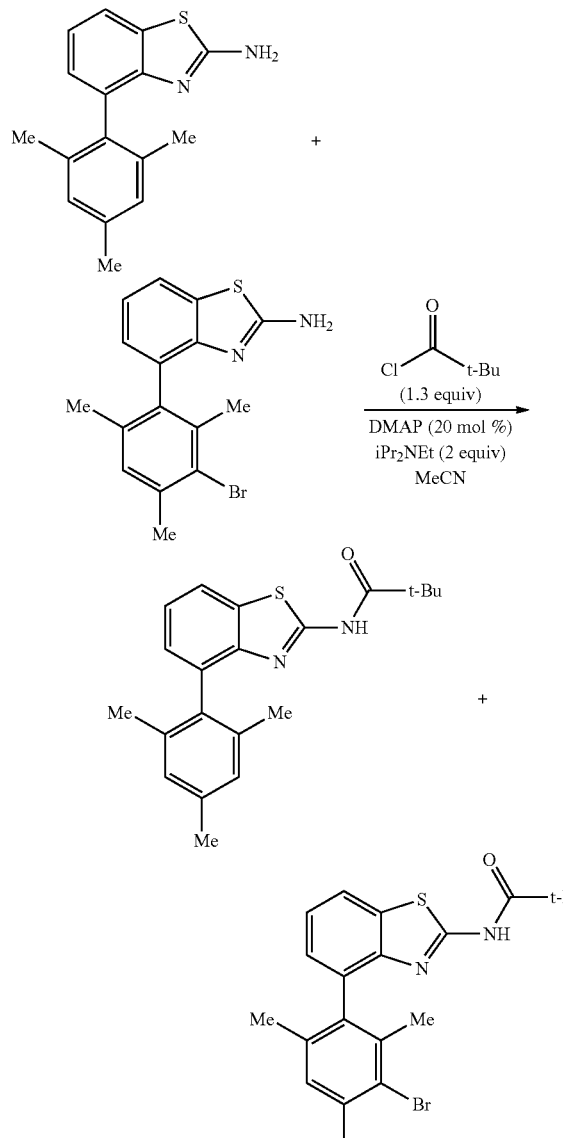

A 100 mL round bottom flask was charged with 4-mesitylbenzo[d]thiazol-2-amine (0.754 g of crude mixture which corresponds to 0.665 g of pure starting material, 2.48 mmol, 1 equiv.) and N,N-dimethyl-4-aminopyridine (60.5 mg, 0.496 mmol, 20 mol %). The vessel was sealed with a septum. The vessel was evacuated and backfilled with nitrogen (this process was repeated for a total of three times). Acetonitrile (25 mL), N,N-diisopropylethylamine (0.86 mL, 4.96 mmol, 2 equiv.), and trimethylacetyl chloride (0.40 mL, 3.22 mmol, 1.3 equiv.) were added via syringe, and the reaction was stirred at room temperature for 18 h. Initially, the starting material was not very soluble in acetonitrile. However, upon addition of the acyl chloride and brief stirring, a pale yellow, clear solution was obtained. The mixture was poured onto saturated aqueous NH$_4$Cl (100 mL) and washed with EtOAc (3×50 mL). The combined organic phases were dried over MgSO$_4$, filtered, and concentrated in vacuo. The mixture was purified by flash column chromatography (40 g silica gel, 1-10% EtOAc in hexane) to afford a white solid (0.7543 g). NMR analysis showed the material contained approximately 15% of the brominated impurity N-(4-(3-bromo-2,4,6-trimethylphenyl)benzo[d]thiazol-2-yl)pivalamide. The yield of pure product is 0.620 g (71% yield).

$^1$H NMR (400 MHz, Chloroform-d) δ 8.95 (s, 1H), 7.81 (dd, J=7.9, 1.2 Hz, 1H), 7.34 (dd, J=7.9, 7.4 Hz, 1H), 7.17 (dd, J=7.4, 1.2 Hz, 1H), 7.00 (s, 2H), 2.36 (s, 3H), 1.96 (s, 6H), 1.31 (s, 9H). $^{13}$C NMR (101 MHz, Chloroform-d) δ 176.59, 157.16, 147.00, 137.17, 136.45, 136.15, 133.61, 132.57, 128.09, 127.21, 123.82, 120.14, 39.32, 27.22, 21.26, 20.56. HRMS (ESI) Calculated for C$_{21}$H$_{24}$N$_2$OS [M+H]$^+$: 353.1682; found 353.1694.

Example 21: Ligand 2-4-mesityl-N-neopentylbenzo[d]thiazol-2-amine

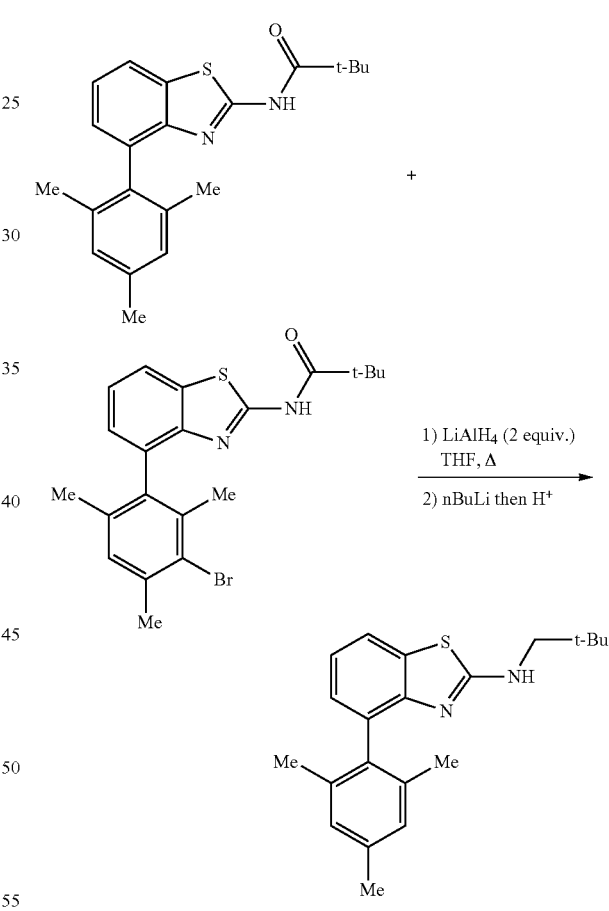

A 250 mL round bottom flask was charged with N-(4-mesitylbenzo[d]thiazol-2-yl)pivalamide (0.7556 g of crude mixture which corresponds to 0.621 g of pure starting material, 1.76 mmol, 1 equiv.) and THF (15 mL). A suspension of LiAlH$_4$ (0.134 g, 3.52 mmol, 2 equiv.) in THF (2 mL) was added dropwise to the stirring amide solution. Gas evolution, was observed immediately upon addition of LiAlH$_4$. The LiAlH$_4$ vial was rinsed with THF (3×1 mL), and the reaction was heated to reflux (80° C.) and stirred for 2.5 h. The reaction was diluted with diethyl ether (40 mL), sealed with a septum, and removed from the glovebox. The solution became hazy with some precipitate. The solution was cooled in an ice bath. Water (0.13 mL), 15% aqueous NaOH (0.13 mL), and water (0.39 mL) were sequentially added, resulting in the evolution of a gas and precipitation of a white solid. The ice bath was removed and the reaction was stirred for 15 min. MgSO$_4$ was added, and the reaction was stirred for an additional 15 min. The reaction was filtered, the filter cake was washed with diethyl ether (2×20 mL), and the filtrate was concentrated in vacuo to yield a white solid (0.672 g). The material contained 15% of the brominated impurity 4-(3-bromo-2,4,6-trimethylphenyl)-N-neopentylbenzothiazol-2-amine. From the ratios in the NMR spectra, the yield of pure material was calculated to be 0.552 g (93%). The crude mixture containing 4-(3-bromo-2,4,6-trimethylphenyl)-N-neopentyl benzothiazol-2-amine and 4-mesityl-N-neopentylbenzothiazol-2-amine was converted to pure 4-mesityl-N-neopentylbenzothiazol-2-amine via lithium-halogen exchange followed by protonolysis. In a nitrogen-filled glovebox, a reaction vial was charged with the mixture (0.604 g, 85% pure material) and THF (20 mL). The vessel was sealed with a screw-cap septum, removed from the glovebox, attached to a nitrogen-filled glovebox, and cooled in an acetone/dry ice bath. A 1.6 M solution of nBuLi in hexane (2.2 mL, 3.57 mmol, approximately 2 equiv.) was added, and the reaction was stirred at −78° C. for 45 min. Saturated aqueous NH$_4$Cl (5 mL) was added dropwise, the solution was removed from the cooling bath and stirred for 5 minutes at room temperature. The material was poured onto 100 mL of water. The aqueous phase was extracted with diethyl ether (3×50 mL). The combined organic layers were dried over MgSO$_4$, filtered, and concentrated in vacuo to afford the product as a white solid (0.575 g).

$^1$H NMR (400 MHz, Chloroform-d) δ 7.58 (dd, J=7.8, 1.4 Hz, 1H), 7.09 (t, J=7.6 Hz, 1H), 7.02 (dd, J=7.4, 1.4 Hz, 1H), 6.94 (t, J=0.6 Hz, 2H), 5.74 (s, 1H), 2.93 (d, J=5.7 Hz, 2H), 2.32 (s, 3H), 1.99 (s, 6H), 0.93 (s, 9H). $^{13}$C NMR (101 MHz, cdcl$_3$) δ 168.23, 151.00, 136.79, 136.58, 136.33, 131.16, 130.50, 128.05, 127.26, 120.89, 119.41, 58.40, 32.42, 27.20, 21.16, 20.63. HRMS (ESI) Calculated for C$_{21}$H$_{26}$N$_2$S [M+H]$^+$: 339.1889; found 339.1890.

Example 22: 9-(3-bromo-2-nitrophenyl)-carbazole

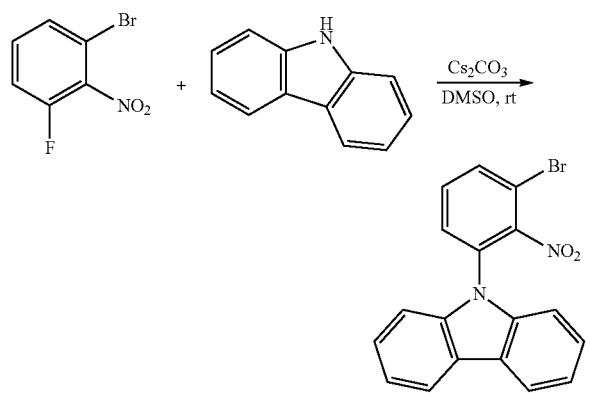

Carbazole (0.380 g, 2.27 mmol) and 1-bromo-3-fluoro-2-nitrobenzene (0.5 g, 2.27 mmol) were dissolved in DMSO (7 mL). Cesium carbonate (0.888 g, 2.73 mmol) was added to the solution with stirring. The suspension was stirred for 48 h at room temp before being diluted with water (10 mL). The mixture was extracted with dichloromethane (3×20 mL). The combined organic layers were washed with water (3×20 mL), dried over MgSO$_4$, and concentrated under reduced pressure. The residue was purified by ISCO flash column chromatography with a silica gel column and an ethyl acetate in hexanes solvent system. The product was collected, providing 494.2 mg (59%).

$^1$H NMR (400 MHz, CDCl$_3$) δ 8.10 (ddd, J=7.7, 1.3, 0.7 Hz, 2H), 7.88 (dd, J=8.1, 1.3 Hz, 1H), 7.56 (t, J=8.1 Hz, 1H), 7.45 (td, J=8.2, 8.1, 1.3 Hz, 2H), 7.40 (dd, J=7.1, 1.2 Hz, 1H), 7.32 (td, J=7.7, 1.0 Hz, 2H), 7.14 (dt, J=8.1, 0.9 Hz, 2H). $^{13}$C NMR (101 MHz, CDCl$_3$) δ 141.56, 134.34, 132.30, 132.02, 130.61, 126.52, 123.96, 121.09, 120.56, 114.62, 109.88 (2C).

Example 23: 2-bromo-6-(carbazol-9-yl)aniline

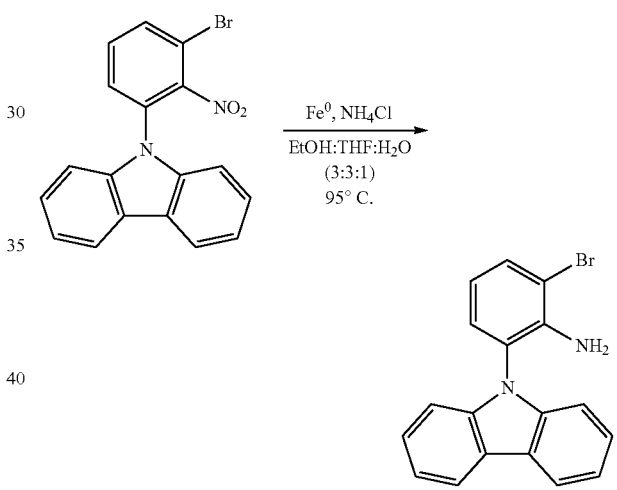

A mixture of 9-(3-bromo-2-nitrophenyl)carbazole (0.10 g, 0.27 mmol), iron powder (0.076 g, 1.36 mmol), and ammonium chloride (0.022 g, 0.41 mmol) in a solvent mixture of ethanol (1.5 mL), THF (1.5 mL), water (0.5 mL) was heated at 95° C. with vigorous stirring for 24 h. The reaction mixture was cooled and filtered through a plug of Celite, and the Celite pad was washed repeatedly with ethanol and THF. The filtrate was concentrated and the residue dissolved in ethyl acetate, washed with saturated aqueous sodium chloride, dried over anhydrous sodium sulfate, filtered, and concentrated. The crude reaction mixture was purified by ISCO column chromatography with a silica gel column and an ethyl acetate in hexanes solvent system. The product was collected, provided 91 mg (99%).

$^1$H NMR (400 MHz, CDCl$_3$) δ 8.18 (dt, J=7.7, 1.0 Hz, 2H), 7.62 (dd, J=8.1, 1.4 Hz, 1H), 7.44 (ddd, J=8.3, 7.2, 1.2 Hz, 2H), 7.33 (ddd, J=8.1, 7.3, 1.0 Hz, 2H), 7.26 (dd, J=7.8, 1.4 Hz, 1H), 7.19 (dt, J=8.1, 0.8 Hz, 2H), 6.80 (t, J=7.9 Hz, 1H), 4.04 (s, 2H). $^{13}$C NMR (101 MHz, CDCl$_3$) δ 142.50, 140.47, 132.97, 129.04, 126.30, 123.60, 123.01, 120.53, 120.34, 118.77, 110.24, 110.16.

Example 24: 9-(3-bromo-2-isothiocyanatophenyl)-carbazole

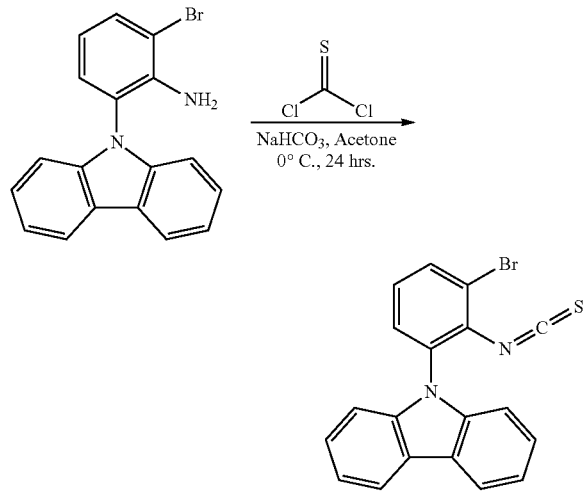

2-bromo-6-carbazoleaniline (1.38 g, 4.07 mmol, 1 equiv.) and NaHCO₃ (1.35 g, 16.28 mmol, 4 equiv.) were charged to vial, and diluted in Acetone (25 mL). The reaction was then cooled to 0° C., and thiophosgene (0.94 mL, 12.21 mmol, 3 equiv.) was added. The reaction was then allowed to warm to room temperature and stir for 24 hours. The reaction was then filtered through celite with dichloromethane (100 mL) and concentrated under vacuum. The crude mixture was purified by ISCO chromatography using a gradient of methylene chloride and hexanes. The product was isolated in yield (1.32 g, 85% yield).

$^1$H NMR (400 MHz, CDCl₃) δ 8.18 (d, J=7.8 Hz, 2H), 7.78 (dd, J=8.1, 1.3 Hz, 1H), 7.53 (d, J=9.2 Hz, 1H), 7.46 (t, J=7.7 Hz, 2H), 7.36 (td, J=7.9, 2.4 Hz, 3H), 7.16 (d, J=8.1 Hz, 2H). $^{13}$C NMR (101 MHz, CDCl₃) δ 140.62, 135.41, 133.01, 128.95, 128.09, 126.32, 123.73, 121.20, 120.66, 120.62, 109.65.

Example 25: Ligand 18—N-(adamantan-1-yl)-4-(9H-carbazol-9-yl)benzothiazol-2-amine

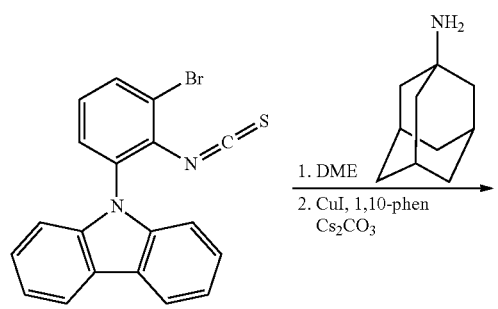

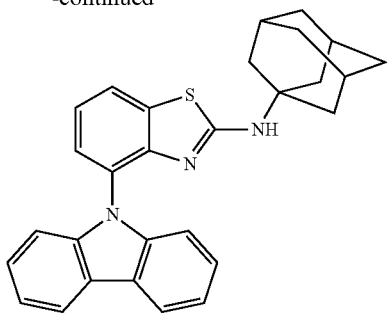

In a continuous purge nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and 1-adamantylamine (91 mg, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. The vial was heated to 70° C. and allowed to stir for 2.5 hr. The reaction was then cooled to room temperature and removed from the glovebox. The reaction was diluted with ethyl acetate (25 mL), poured into a separatory funnel, organics were washed with H₂O (2×25 mL), followed by saturated aqueous NaCl (25 mL). The organic layer was dried over MgSO₄, and concentrated in vacuo. The crude reaction mixture was purified using ISCO flash column chromatography with a silica gel column and an ethyl acetate in hexanes solvent system. The product was collected for a yield of 108.9 mg (81%).

$^1$H NMR (400 MHz, CDCl₃) δ 8.18 (dt, J=7.7, 1.0 Hz, 2H), 7.69 (dd, J=7.9, 1.2 Hz, 1H), 7.51 (dd, J=7.8, 1.2 Hz, 1H), 7.40 (ddd, J=8.2, 6.9, 1.3 Hz, 2H), 7.33-7.27 (m, 4H), 7.27-7.23 (m, 1H), 5.13 (s, 1H), 2.01-1.91 (m, 3H), 1.84 (d, J=2.9 Hz, 6H), 1.57 (dt, J=12.2, 3.0 Hz, 3H), 1.43 (dq, J=12.5, 2.0 Hz, 3H). $^{13}$C NMR (101 MHz, CDCl₃) δ 163.44, 149.26, 141.47, 133.21, 127.58, 125.45, 125.02, 123.54, 121.59, 120.05, 119.98, 119.50, 111.27, 53.96, 41.43, 36.12, 29.47.

Example 26: Ligand 19—N-benzyl-4-(carbazol-9-yl)benzothiazol-2-amine

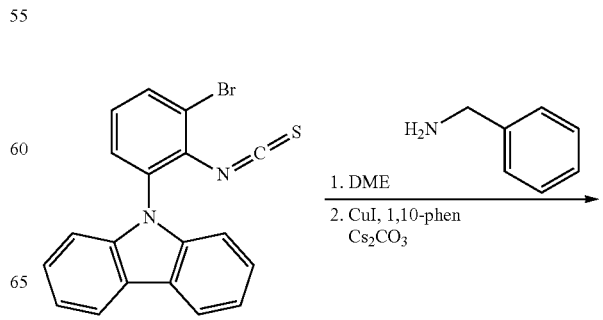

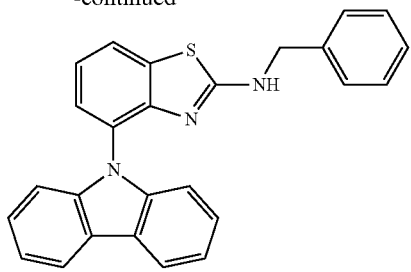

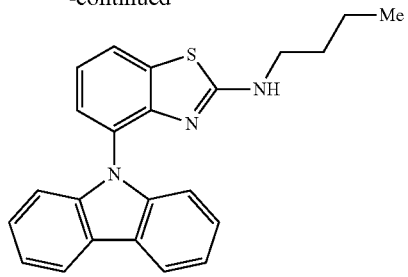

In a continuous purge nitrogen filled glovebox, a solution of 3-bromo-2-isothiocyanato-2',4',6'-trimethyl-1,1'-biphenyl in dimethoxyethane (0.3 M, 1.0 mL, 0.3 mmol, 1 equiv.) was added to a vial equipped with a stir bar. To the same vial was added dimethoxyethane (1.0 mL) and benzylamine (0.066 mL, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), poured into a separatory funnel, partitioned, organics were washed with H$_2$O (2×25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The product was collected, providing 116 mg (95%).

$^1$H NMR (400 MHz, CDCl$_3$) δ 8.17 (d, J=7.5 Hz, 2H), 7.73 (dd, J=7.9, 1.2 Hz, 1H), 7.47 (dd, J=7.8, 1.1 Hz, 1H), 7.38 (ddd, J=8.3, 7.2, 1.2 Hz, 2H), 7.28-7.32 (m, 5H), 7.27-7.22 (m, 5H), 5.67 (t, J=5.6 Hz, 1H), 4.39 (d, J=5.8 Hz, 2H). $^{13}$C NMR (101 MHz, CDCl$_3$) δ 167.71, 149.24, 141.26, 137.21, 132.79, 128.58, 127.60, 127.47, 125.54, 125.37, 123.45, 121.68, 120.46, 120.05, 119.63, 110.98, 49.09.

Example 27: Ligand 13—N-butyl-4-(carbazol-9-yl)benzothiazol-2-amine

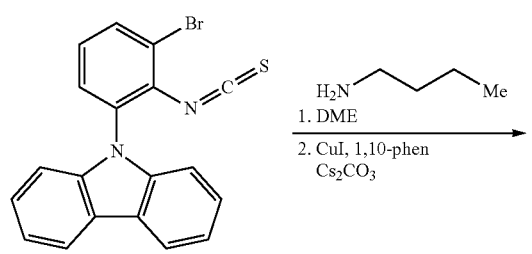

In continuous purge nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and n-butylamine (0.059 mL, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), and then washed with H$_2$O (2×25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The product was collected, providing 106 mg (95%).

$^1$H NMR (400 MHz, CDCl$_3$) δ 8.17 (d, J=7.6 Hz, 2H), 7.74 (dd, J=7.8, 1.1 Hz, 1H), 7.48-7.44 (m, 1H), 7.41-7.36 (m, 2H), 7.32-7.26 (m, 4H), 5.79 (t, J=5.4 Hz, 1H), 3.16-2.89 (q, 2H), 1.42 (p, J=7.3 Hz, 2H), 1.23 (dq, J=14.4, 7.3 Hz, 2H), 0.83 (t, J=7.3 Hz, 3H). $^{13}$C NMR (101 MHz, CDCl$_3$) δ 168.01, 149.53, 141.26, 132.71, 127.27, 125.49, 125.35, 123.46, 121.34, 120.40, 120.04, 119.56, 110.95, 45.51, 31.30, 19.81, 13.59.

Example 28: Ligand 14—4-(carbazol-9-yl)-N-neopentylbenzothiazol-2-amine

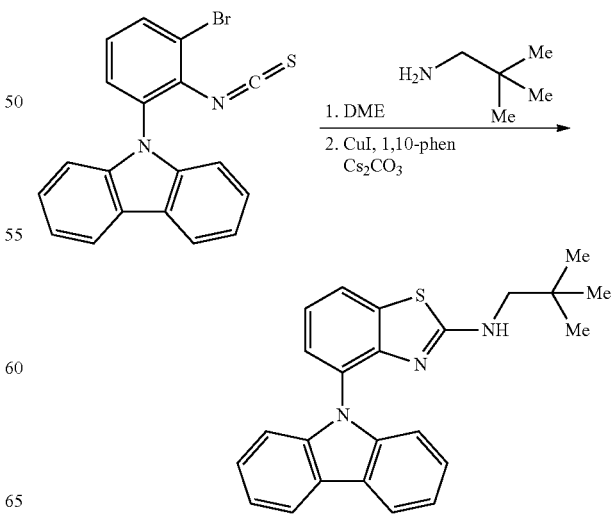

A solution of 9-(3-bromo-2-isothiocyanatophenyl)-carbazole (167 mg, 0.44 mmol, 1 equiv.) in dimethoxyethane (3.0 mL) was added to a vial equipped with a stir bar. To the same vial was added neopentylamine (0.103 mL, 0.88 mmol, 2 equiv.). The reaction was allowed to stir at room temperature overnight in order to allow the formation of the thiourea intermediate. Then, copper (I) iodide (4.2 mg, 0.02 mmol, 5 mol %), 1,10-phenanthroline (8 mg, 0.04 mmol, 10 mol %), and cesium carbonate (287 mg, 0.88 mmol, 2 equiv.), were added to the vial. Once all additions were complete, the vial was heated to 70° C. and again allowed to stir overnight. The reaction was then cooled to room temperature, diluted with ethyl acetate (25 mL), poured into a separatory funnel, and washed with H$_2$O (2×25 mL) followed by saturated aqueous NaCl (25 mL). The organic layer was dried over Na$_2$SO$_4$, and concentrated in vacuo. The crude reaction mixture was purified using ISCO flash column chromatography with a silica gel column and an ethyl acetate in hexanes solvent system. The product was collected, providing 114 mg (67%).

$^1$H NMR (400 MHz, CDCl$_3$) δ 8.16 (d, J=7.7 Hz, 2H), 7.73 (d, J=7.8 Hz, 1H), 7.43 (d, J=6.9 Hz, 1H), 7.38 (t, J=7.6 Hz, 2H), 7.28 (d, J=7.1 Hz, 2H), 7.27-7.21 (m, 3H), 2.90 (d, J=6.2 Hz, 2H), 0.88 (s, 9H). $^{13}$C NMR (101 MHz, CDCl$_3$) δ 169.38, 149.20, 141.09, 132.25, 126.82, 125.49, 125.18, 123.49, 121.10, 120.23, 119.99, 119.68, 111.10, 58.01, 32.36, 26.83.

Example 29: Ligand 15—4-(carbazol-9-yl)-N-((trimethylsilyl)methyl) benzothiazol-2-amine

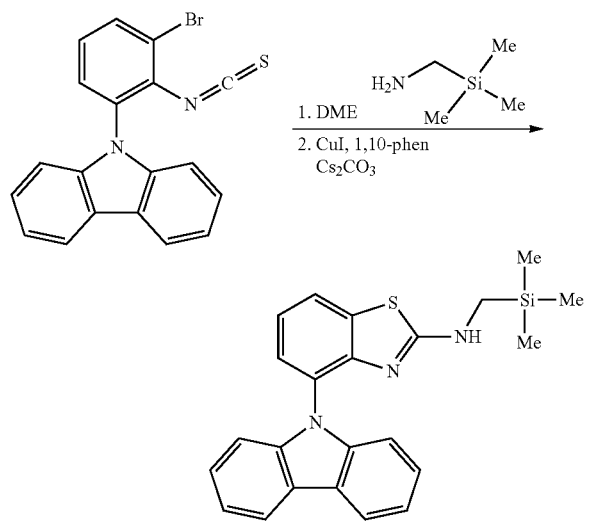

In a continuous purge nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and (trimethylsilyl)methylamine (0.080 mL, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), poured into a separatory funnel, and then washed with H$_2$O (2×25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The product was collected, providing 107 mg (88%).

$^1$H NMR (400 MHz, CDCl$_3$) δ 8.18 (d, J=7.7 Hz, 2H), 7.76 (d, J=8.4 Hz, 1H), 7.44 (d, J=7.7 Hz, 1H), 7.39 (t, J=7.6 Hz, 2H), 7.29 (d, J=7.3 Hz, 2H), 7.23 (d, J=7.7 Hz, 2H), 5.67 (s, 1H), 2.50 (d, J=5.4 Hz, 2H), 0.01 (s, 9H). $^{13}$C NMR (101 MHz, CDCl$_3$) δ 171.00, 150.09, 141.34, 132.72, 127.06, 125.55, 125.52, 123.46, 121.09, 120.55, 120.10, 119.56, 110.88, 36.52, −2.84.

Example 30: Ligand 16—4-(carbazol-9-yl)-N-isopropylbenzothiazol-2-amine

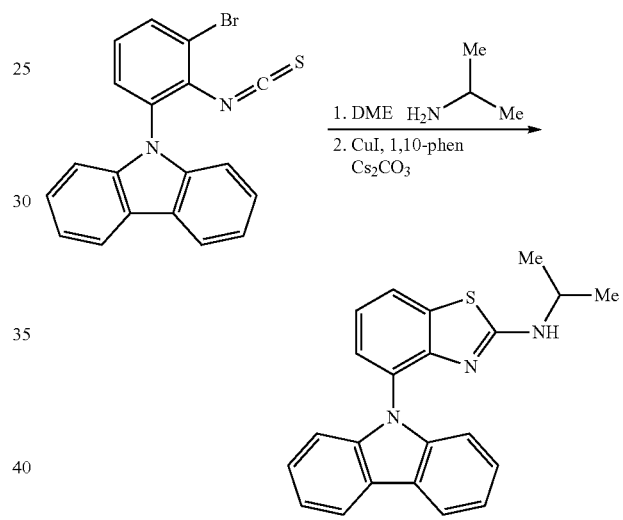

In a continuous purge nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and iso-propylamine (0.052 mL, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), poured into a separatory funnel, and then washed with H$_2$O (2×25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The product was collected, providing 101 mg (94%).

$^1$H NMR (400 MHz, CDCl$_3$) δ 8.18 (d, J=7.7 Hz, 2H), 7.75 (d, J=7.8 Hz, 1H), 7.46 (d, J=8.7 Hz, 1H), 7.40 (t, J=7.6

Hz, 2H), 7.36-7.28 (m, 2H), 7.27-7.23 (m, 2H), 5.18 (d, J=7.9 Hz, 1H), 3.68 (dq, J=12.9, 6.7 Hz, 1H), 1.22 (d, J=6.4 Hz, 6H). $^{13}$C NMR (101 MHz, CDCl$_3$) b 166.39, 149.69, 141.37, 132.88, 127.48, 125.51, 125.42, 123.47, 121.54, 120.43, 120.09, 119.51, 110.93, 47.92, 22.79.

Example 31: Ligand 17—N-(tert-butyl)-4-(carbazol-9-yl)benzothiazol-2-amine

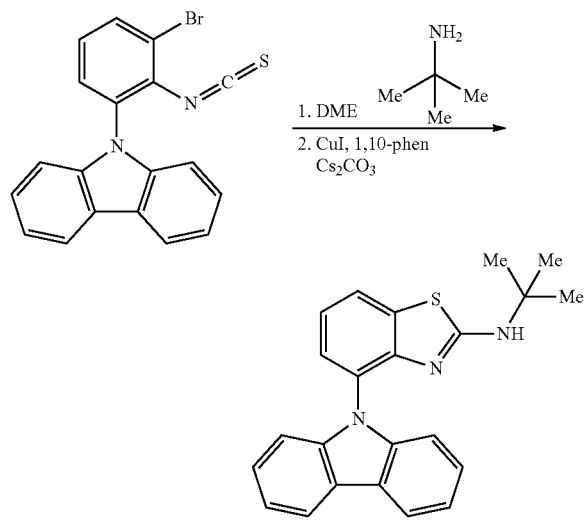

In a continuous purge nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and tert-butylamine (63 uL, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), poured into a separatory funnel, and then washed with H$_2$O (2×25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The product was collected with a yield of 90.7 mg (81%).

$^1$H NMR (400 MHz, CDCl$_3$) δ 8.22-8.14 (m, 2H), 7.70 (dd, J=7.8, 1.2 Hz, 1H), 7.47 (dd, J=7.8, 1.2 Hz, 1H), 7.41-7.35 (m, 2H), 7.31-7.23 (m, 5H), 5.16 (s, 1H), 1.26 (s, 9H). $^{13}$C NMR (101 MHz, CDCl$_3$) δ 164.27, 149.47, 141.48, 133.20, 127.77, 125.54, 125.19, 123.54, 121.76, 120.09, 119.53, 111.18, 53.59, 28.88.

Example 32: Ligand 20—4-(carbazol-9-yl)-N-(3,5-di-tert-butylphenyl) benzothiazol-2-amine

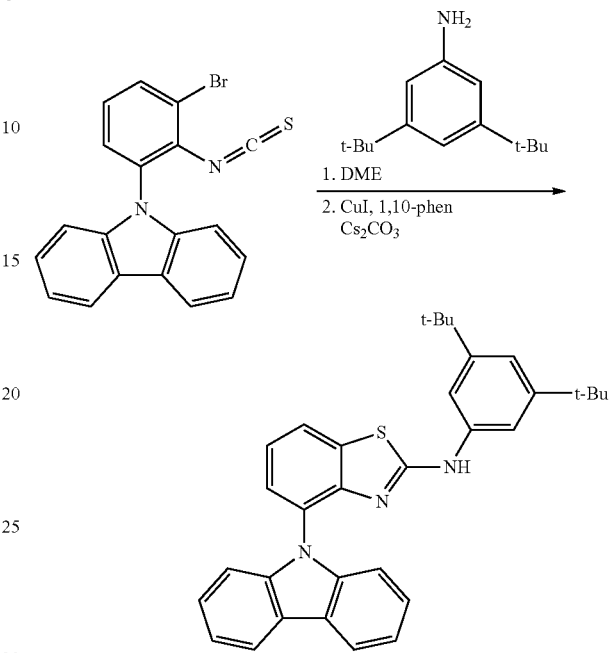

In continuous purge nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and 3,5-di-tert-butylaniline (123 mg, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), and then washed with H$_2$O (2×25 mL), followed by saturated aqueous NaCl (25 mL). The organic layer was dried over MgSO$_4$, and concentrated in vacuo. Attempted purification using ISCO flash column chromatography with a silica gel column and an ethyl acetate in hexanes solvent system led to a mixture of starting amine and product. Mixture was then successfully purified by reverse-phase ISCO flash column chromatography on a gradient of water and acetonitrile. The product was collected with a yield of 116 mg (77%).

$^1$H NMR (400 MHz, CDCl$_3$) δ 8.19 (d, J=7.7 Hz, 2H), 7.80 (dd, J=7.9, 1.0 Hz, 1H), 7.51 (dd, J=7.7, 1.0 Hz, 1H), 7.40 (t, J=8.2 Hz, 2H), 7.35 (t, J=7.8 Hz, 1H), 7.31-7.23 (m, 4H), 7.16 (m, J=2.5 Hz, 3H), 1.23 (s, 18H). $^{13}$C NMR (101 MHz, CDCl$_3$) δ 163.85, 152.32, 149.27, 141.42, 138.66, 132.44, 129.05, 128.06, 125.82, 125.65, 123.48, 122.69, 120.55, 120.19, 119.60, 118.40, 114.11, 110.64, 34.90, 31.26.

Example 33: Ligand 21—4-(carbazol-9-yl)-N-(2,6-dimethylphenyl)benzothiazol-2-amine

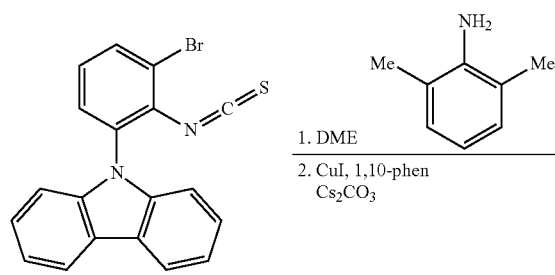

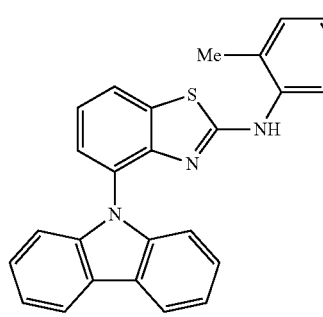

In a continuous nitrogen filled glovebox, a solution of 9-(3-bromo-2-isothiocyanatophenyl)-carbazole in dimethoxyethane (0.3 M, 1.0 mL, 0.3 mmol, 1 equiv.) was added to a vial equipped with a stir bar. To the same vial was added dimethoxyethane (1.0 mL) and 2,6-dimethylaniline (74 uL, 0.6 mmol, 2 equiv.). The reaction was allowed to stir at room temperature overnight in order to allow the formation of the thiourea intermediate. Then, copper (I) iodide (6 mg, 0.03 mmol, 10 mol %), 1,10-phenanthroline (10 mg, 0.03 mmol, 10 mol %), and cesium carbonate (196 mg, 0.6 mmol, 2 equiv.), were added to the vial. Once all additions were complete, the vial was heated to 70° C. and allowed to stir for 2.5 hr. The reaction was then cooled to room temperature and removed from the glovebox. The reaction was diluted with ethyl acetate (25 mL), and then washed with $H_2O$ (2×25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system. The product was collected to provide 92.5 mg (73%).

$^1$H NMR (400 MHz, CDCl$_3$) δ 8.14 (dd, J=7.7, 1.2 Hz, 2H), 7.90 (s, 1H), 7.59 (dd, J=7.8, 1.2 Hz, 1H), 7.42 (ddd, J=8.3, 7.1, 1.3 Hz, 2H), 7.38 (dd, J=7.8, 1.2 Hz, 1H), 7.32 (td, J=7.5, 1.1 Hz, 2H), 7.28 (d, J=8.3 Hz, 2H), 7.20 (t, J=7.8 Hz, 1H), 7.09 (dd, J=8.3, 6.8 Hz, 1H), 7.00 (d, J=7.5 Hz, 2H), 2.14 (s, 6H). $^{13}$C NMR (101 MHz, CDCl$_3$) δ 169.43, 149.37, 141.44, 137.01, 136.39, 132.96, 128.78, 128.45, 127.99, 125.68, 125.21, 123.83, 121.83, 120.33, 120.22, 119.76, 111.12, 18.01.

Example 34: 2-(2,6-di-tert-butylanthracen-9-yl)-4,4,5,5-tetramethyl-1,3,2-dioxaborolane

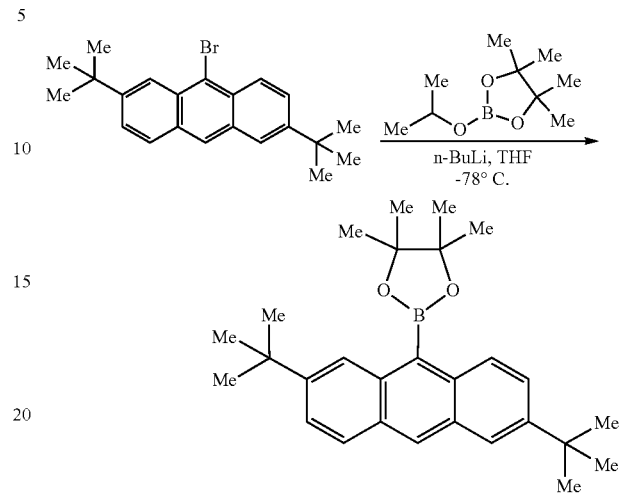

In a continuous purge nitrogen filled glovebox, 9-bromo-2,6-di-tert-butylanthracene (2.0 g, 5.41 mmol, 1 equiv.) was charged to an oven-dried flask and diluted in dried THF (12.0 mL). Reaction was then pumped out of the glovebox and cooled to −78 C. n-BuLi in hexanes (2.5 M, 2.768 mL, 5.96 mmol, 1.1 eq.) was then added dropwise over five minutes. Reaction was then warmed to 0° C. for 4 hrs. 2-isopropoxy-4,4,5,5-tetramethyl-1,3,2-dioxaborolane (2.77 mL, 13.54 mmol) was then added and the reaction was allowed to warm to room temperature overnight. The reaction was the quenched with water (70 mL) and poured into a separatory funnel. The solution was then extracted with dichloromethane (3×50 mL) and combined organic layers were washed with brine (70 mL). Organics were then dried with sodium sulfate and concentrated under vacuum. The reaction mixture was then purified by ISCO chromatography on a gradient of 0-10% dichloromethane and hexanes. The desired product was collected to provide 980 mg (44% yield).

$^1$H NMR (400 MHz, CDCl$_3$) δ 8.39-8.30 (m, 3H), 7.90 (d, J=8.9 Hz, 1H), 7.83 (d, J=1.4 Hz, 1H), 7.57 (dd, J=9.2, 2.1 Hz, 1H), 7.51 (dd, J=8.8, 1.5 Hz, 1H), 1.58 (s, 12H), 1.44 (d, J=7.3 Hz, 18H). $^{13}$C NMR (101 MHz, CDCl$_3$) δ 147.35, 146.63, 135.82, 134.74, 131.01, 129.89, 128.65, 128.27, 127.87, 125.29, 124.31, 122.87, 122.74, 84.14, 35.29, 34.76, 31.02, 30.95, 25.27.

Example 35: 2-bromo-6-(2,6-di-tert-butylanthracen-9-yl)aniline

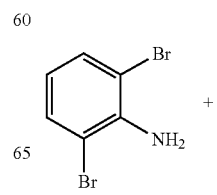 +

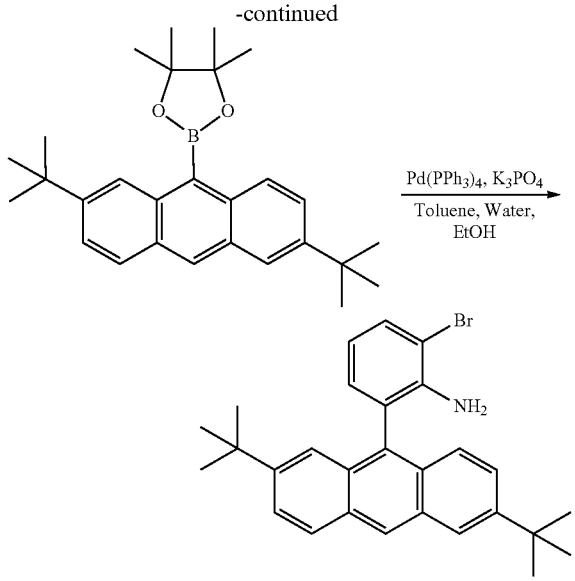

2,6-dibromoaniline (360 mg, 1.44 mmol, 2 equiv), 2-bromo-6-(2,6-di-tert-butylanthracen-9-yl)aniline (300 mg, 0.72 mmol, 1 equiv), Pd(PPh$_3$)$_4$ (83 mg, 0.0.72 mmol, 0.1 equiv), and K$_3$PO$_4$ (459 mg, 2.16 mmol, 3 equiv) were charged to round-bottomed flask equipped with a reflux condenser. The flask was then placed under vacuum and refilled with N$_2$ four times. Toluene, water, and ethanol (volume?) were then added, and the reaction was stirred at 100° C. for 18 hours. Reaction was then cooled to room temperature, run through a pad of silica with ethyl acetate (50 mL), and poured into water. Extracted with ethyl acetate (3×40 mL), and washed with brine. Organics were then dried with sodium sulfate, and concentrated on vacuum. Reaction was then purified by ISCO chromatography on a gradient of 0-75% dichloromethane in hexanes to afford the aniline (151 mg, 46%).

$^1$H NMR (400 MHz, CDCl$_3$) δ 8.42 (s, 1H), 7.97 (d, J=8.9 Hz, 1H), 7.90 (d, J=1.8 Hz, 1H), 7.63-7.53 (m, 3H), 7.50 (s, 1H), 7.47 (dd, J=9.2, 2.0 Hz, 1H), 7.10 (dd, J=7.4, 1.4 Hz, 1H), 6.80 (t, J=7.7 Hz, 1H), 3.78 (s, 2H), 1.42 (s, 9H), 1.30 (s, 9H). $^{13}$C NMR (101 MHz, CDCl$_3$) δ 148.09, 147.38, 142.83, 132.11, 131.50, 131.47, 131.33, 130.42, 129.76, 128.78, 128.13, 126.68, 125.75, 125.57, 124.80, 124.75, 122.74, 120.10, 118.70, 109.56, 35.06, 34.85, 30.94, 30.87.

Example 36: 9-(3-bromo-2-isothiocyanatophenyl)-2,6-di-tert-butylanthracene

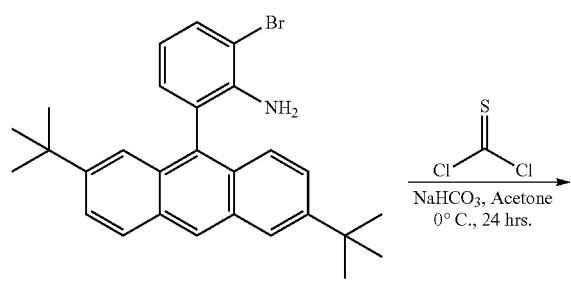

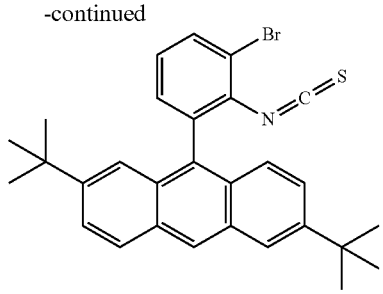

2-bromo-6-(2,6-di-tert-butylanthracen-9-yl)aniline (151 mg, 0.33 mmol, 1 equiv.) and NaHCO$_3$ (110 mg, 1.31 mmol, 4 equiv.) were charged to vial, and diluted in acetone (2 mL). The reaction was then cooled to 0° C., and thiophosgene (0.08 mL, 0.98 mmol, 3 equiv.) was added. The reaction was then allowed to warm to room temperature and stir for 24 hours. The reaction was then filtered through celite with dichloromethane (100 mL) and concentrated under vacuum. $^1$H NMR of the crude material indicated the desired product which was used in the subsequent reaction without further purification (162 mg, 98% yield).

$^1$H NMR (400 MHz, CDCl$_3$) 8.48 (s, 1H), 8.00 (d, J=8.9 Hz, 1H), 7.93 (s, 1H), 7.78 (dd, J=8.0, 1.4 Hz, 1H), 7.57 (dd, J=8.9, 1.7 Hz, 1H), 7.49 (dd, J=9.2, 1.9 Hz, 1H), 7.44-7.39 (m, 2H), 7.36-7.30 (m, 2H), 1.44 (s, 9H), 1.32 (s, 9H). $^{13}$C NMR (101 MHz, CDCl$_3$) δ 148.43, 147.22, 139.20, 138.53, 132.78, 132.56, 131.73, 131.05, 129.96, 128.35, 127.51, 127.45, 125.80, 125.01, 124.81, 124.71, 123.16, 122.93, 122.76, 119.32, 35.09, 34.82, 31.36, 30.89.

Example 37: Ligand 22—N-(adamantan-1-yl)-4-(2,6-di-tert-butylanthracen-9-yl)benzothiazol-2-amine

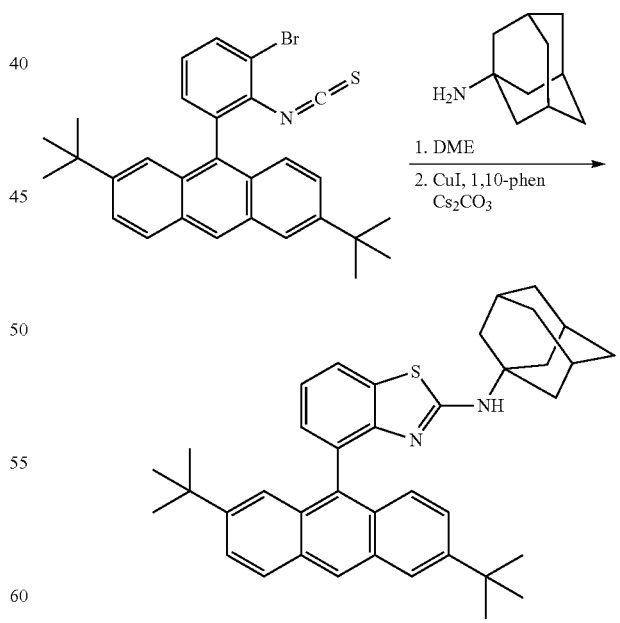

A solution of 9-(3-bromo-2-isothiocyanatophenyl)-2,6-di-tert-butylanthracene (81 mg, 0.16 mmol, 1 equiv.) in dimethoxyethane (3.0 mL) was added to a vial equipped with a stir bar. To the same vial was added adamantylamine (49 mg, 0.32 mmol, 2 equiv.). The reaction was allowed to stir at room temperature overnight in order to allow the formation of the thiourea intermediate. Then, copper (I) iodide (3.1 mg, 0.016 mmol, 10 mol %), 1,10-phenanthroline (4.4 mg, 0.024 mmol, 15 mol %), and cesium carbonate (105 mg, 0.32 mmol, 2 equiv.), were added to the vial. Once all additions were complete, the vial was heated to 70° C. and again allowed to stir overnight. The reaction was then cooled to room temperature The reaction was diluted with ethyl acetate (25 mL), and then washed with H$_2$O (2×25 mL), followed by saturated aqueous NaCl (25 mL). The organic layer was dried over Na$_2$SO$_4$, and concentrated in vacuo. The crude reaction mixture was purified using ISCO flash column chromatography with a silica gel column and an ethyl acetate in hexanes solvent system. The product was collected to provide 114 mg (67%).

$^1$H NMR (400 MHz, CDCl$_3$) δ 8.37 (s, 1H), 7.94 (m, 1H), 7.88 (d, J=1.9 Hz, 1H), 7.72 (dd, J=7.7, 1.3 Hz, 1H), 7.53-7.45 (m, 2H), 7.36 (dd, J=9.3, 2.0 Hz, 1H), 7.31 (dd, J=7.4, 1.3 Hz, 1H), 7.23 (t, J=7.6 Hz, 1H), 5.00 (s, 1H), 2.29 (d, J=2.2 Hz, 1H), 1.91 (s, 3H), 1.78 (s, 6H), 1.52 (d, J=9.6 Hz, 5H), 1.41 (s, 9H), 1.23 (s, 9H). $^{13}$C NMR (101 MHz, CDCl$_3$) δ 162.84, 151.81, 146.49, 146.39, 134.44, 131.41, 131.30, 130.28, 129.90, 129.25, 129.17, 128.94, 127.78, 127.05, 127.00, 125.71, 124.24, 124.12, 122.43, 121.59, 120.92, 119.78, 53.29, 41.61, 36.08, 34.88, 34.71, 31.58, 31.12, 30.97, 30.92, 30.81, 29.74, 29.35, 22.64, 14.11.

Example 38: 2-bromo-1-mesitylethan-1-one

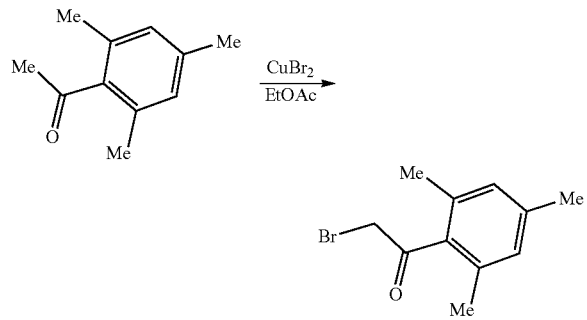

To a solution of 2-acetyl-mesitylene (CAS 1667-01-2, 1.18 g, 7.27 mmol, 1.0 equiv) in ethyl acetate (50 ml), under nitrogen, was added copper (II) bromide (3.25 g, 14.6 mmol, 2.0 equiv.). The reaction was heated to reflux (85° C.) and stirred for 2 hours. The reaction was allowed to cool and stir at room temperature overnight. The solids were filtered off and the filtrate was concentrated. The residue was taken up in dichloromethane and the solids were filtered off. The filtrated was concentrated and pumped on. The product was isolated as an orange solid, 68% yield. The product was a mixture of 40% 2-acetyl-mesitylene starting material and 60% desired product. The crude mixture was carried onto the next step without further purification.

$^1$H NMR (400 MHz, Chloroform-d) δ 6.89-6.85 (m, 2H), 4.26 (d, J=0.5 Hz, 2H), 2.30 (s, 3H), 2.23 (s, 6H).

Example 39: 4-Mesitylthiazol-2-amine

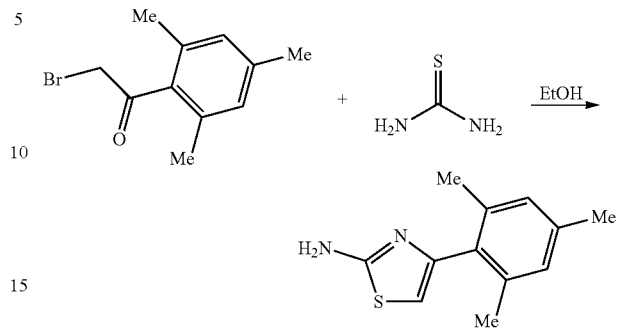

To a solution of 2-bromo-1-mesitylethan-1-one (1.500 g, approx. 56% pure by $^1$H NMR, 4.07 mmol, 1.00 equiv.) dissolved in ethanol (30 ml), under nitrogen, fitted with a water condenser, with nitrogen purged through a sodium hydroxide base bath, was added thiourea (0.402 g, 5.29 mmol, 1.30 equiv.). The reaction was stirred and refluxed (98° C.) for three hours, and then allowed to cool and stir overnight at room temperature. The solvent was removed in vacuo and the residue was recrystallized twice from isopropanol. The product was isolated as a light yellow solid, 0.356 g (40% yield).

$^1$H NMR (400 MHz, DMSO-d$_6$) δ 9.15 (s, 2H), 7.00 (s, 2H), 6.79 (s, 1H), 2.28 (s, 3H), 2.13 (s, 6H).

Example 40: N-(4-mesitylthiazol-2-yl)pivalamide

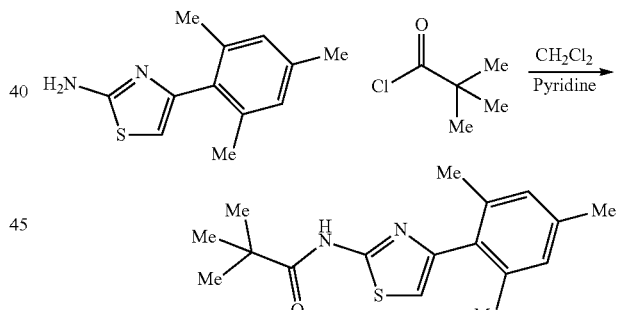

To a solution of 4-mesitylthiazol-2-amine (0.521 g, 2.39 mmol, 1.00 equiv.) dissolved in dichloromethane (20 mL) and THF (5 mL), under nitrogen, was added DMAP (0.010 g, 8.114 0.0811 mmol, 0.034 equiv.) and pyridine (2.15 mL, 26.7 mmol, 11.2 equiv.). Trimethylacetyl chloride (0.88 mL, 7.79 mmol, 3.00 equiv.) was added dropwise and the reaction was allowed to stir at 18° C. for 5.5 hours. The reaction was quenched with methanol (3 ml) and was allowed to stir for 15 minutes. The reaction was concentrated and the remaining material was taken up in ethyl acetate (30 mL). The organics were extracted with sat. ammonium chloride solution (30 mL×1). The aqueous layer was re-extracted with ethyl acetate (30 mL×1). The combined organics were washed with sat. ammonium chloride solution (20 mL×2) and brine (25 mL×1). The organics were dried over magnesium sulfate, filtered, and concentrated. The crude product was purified by ISCO column chromatography on silica gel with ethyl acetate in hexanes as the solvent system. The product was isolated as a white solid, 0.474 g (65%).

$^1$H NMR (400 MHz, Chloroform-d) δ 9.19 (s, 1H), 6.91 (s, 2H), 6.71 (d, J=0.7 Hz, 1H), 2.30 (s, 3H), 2.08 (s, 6H), 1.32 (d, J=0.9 Hz, 9H). $^{13}$C NMR (101 MHz, cdcl$_3$) δ 176.28, 157.58, 148.81, 137.86, 137.36, 132.13, 128.30, 111.30, 39.27, 27.34, 21.22, 20.42.

Example 41: Ligand 23-4-mesityl-N-neopentylthiazol-2-amine

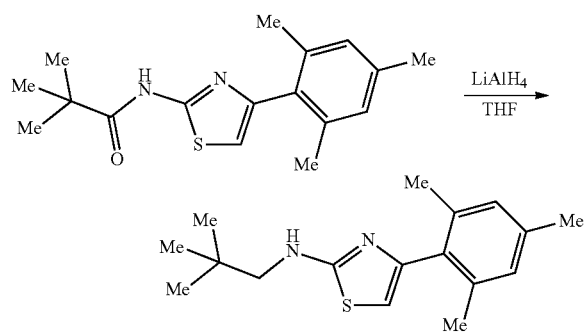

To a solution of N-(4-mesitylthiazol-2-yl)pivalamide (0.363 g, 1.20 mmol, 1.0 equiv) in THF (30 mL), under nitrogen, cooled in an ice bath, was added lithium aluminum hydride solution (1.0 M in THF, 3.60 mL, 3.60 mmol, 3.0 equiv.) dropwise. The reaction was allowed to stir cold for 5 hours, then room temperature overnight. The reaction was heated to 40° C. for 1 hour, then allowed to cool to room temperature. The reaction was worked up using the Fieser and Fieser work up by adding in order: 0.15 mL water, 0.15 mL 15% aqueous sodium hydroxide solution, and 0.45 mL water. The organics were diluted with ether and dried over magnesium sulfate. The crude product was purified by ISCO column chromatography on silica gel with ethyl acetate in hexanes as the solvent system. The product was isolated as a white solid, 0.180 g (52%).

$^1$H NMR (400 MHz, Chloroform-d) δ 6.87 (s, 2H), 6.18 (d, J=0.9 Hz, 1H), 5.29 (s, 1H), 3.04 (d, J=5.2 Hz, 2H), 2.28 (s, 3H), 2.14 (s, 6H), 0.98 (d, J=0.9 Hz, 9H). $^{13}$C NMR (101 MHz, cdcl$_3$) δ 170.20, 150.47, 137.44, 137.36, 133.10, 128.12, 103.18, 58.30, 32.43, 27.45, 21.20, 20.37.

Example 42: N-(4-mesitylthiazol-2-yl)heptanamide

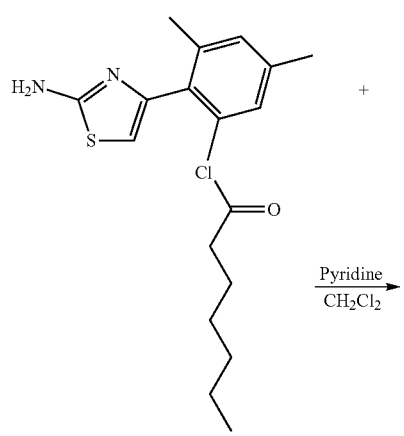

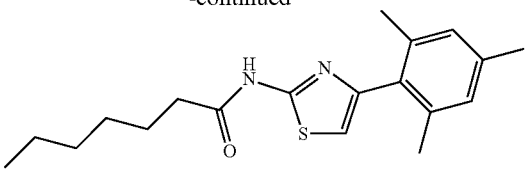

To a solution of 4-mesitylthiazol-2-amine (0.500 g, 2.29 mmol, 1.00 equiv.) dissolved in dichloromethane (20 mL), under nitrogen, was added pyridine (2.00 mL, 24.7 mmol, 10.8 equiv.). Heptanoyl chloride (1.06 mL, 6.87 mmol, 3.00 equiv.) was added drop-wise and the reaction was allowed to stir at 18° C. overnight. The reaction was concentrated and the remaining material was taken up in ethyl acetate (60 mL). The organic layer were washed with sat. aqueous ammonium chloride solution (40 mL) and brine (30 mL x1). The organic layer was dried over magnesium sulfate, filtered, and concentrated in vacuo. The crude product was purified by column chromatography on silica gel with ethyl acetate in hexanes as the solvent system. The product was isolated as a white solid, 0.320 g (42%).

$^1$H NMR (400 MHz, Chloroform-d) δ 11.61 (s, 1H), 6.90 (s, 2H), 6.72 (d, J=0.6 Hz, 1H), 2.30 (s, 3H), 2.08 (s, 6H), 1.69 (t, J=7.5 Hz, 2H), 1.43 (p, J=7.6 Hz, 2H), 1.35-1.09 (m, 7H), 0.88 (t, J=7.0 Hz, 3H). $^{13}$C NMR (101 MHz, Chloroform-d) δ 171.79, 158.90, 147.70, 137.91, 137.24, 131.82, 128.57, 111.07, 34.71, 31.56, 28.64, 24.49, 22.50, 21.04, 20.37, 14.03.

Example 43: Ligand 24—N-heptyl-4-mesitylthiazol-2-amine

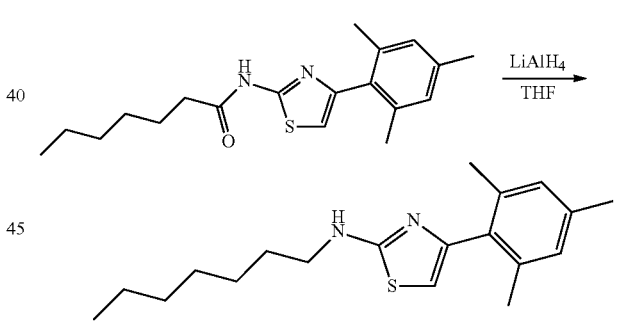

To a solution of N-(4-mesitylthiazol-2-yl)heptanamide (0.258 g, 0.781 mmol, 1.0 equiv) in THF (35 mL), under nitrogen, cooled in an ice bath, was added lithium aluminum hydride solution (1.0 M in THF, 2.73 mL, 2.73 mmol, 3.5 equiv.) dropwise. The reaction was allowed to stir at 0° C. for 1 hour, then room temperature overnight. The reaction was quenched by the Fieser work up method by adding, in order: 0.11 mL water, 0.11 mL 15% aqueous sodium hydroxide solution, and 0.33 mL water. The organics were diluted with ether and dried over magnesium sulfate. The crude product was purified by column chromatography on silica gel with ethyl acetate in hexanes as the solvent system. The product was isolated as a white solid, 0.191 g (77%).

$^1$H NMR (400 MHz, Chloroform-d) δ 6.87 (s, 2H), 6.17 (s, 1H), 6.10 (s, 1H), 3.09 (td, J=7.2, 5.2 Hz, 2H), 2.28 (s, 3H), 2.14 (s, 6H), 1.50 (p, J=7.2 Hz, 2H), 1.34-1.21 (m, 8H), 0.89 (t, J=6.8 Hz, 3H). $^{13}$C NMR (101 MHz, Chloroform-d)

δ 169.73, 150.29, 137.32, 137.18, 133.04, 127.96, 102.82, 46.24, 31.76, 29.27, 28.96, 26.88, 22.59, 21.05, 20.24, 14.07.

Example 44:—Methyl-(Z)—N'-(3-bromo-2',4',6'-trimethyl-[1,1'-biphenyl]-2-yl)-N-isopropylcarbamimidothioate

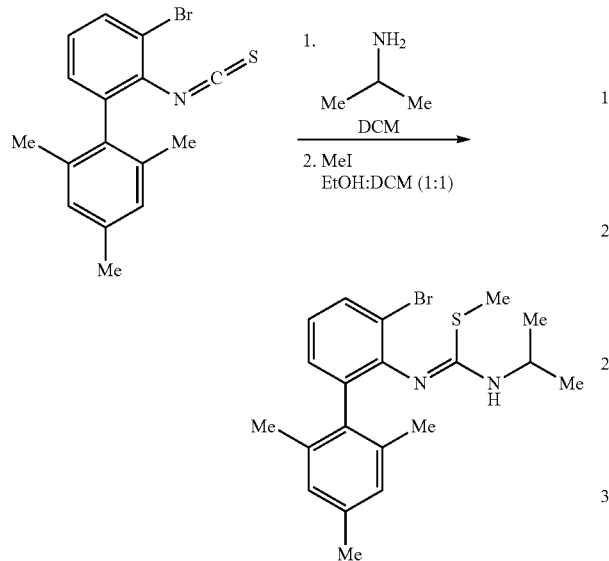

To a solution of 3-bromo-2-isothiocyanato-2',4',6'-trimethyl-1,1'-biphenyl (69.0 mg, 0.21 mmol, 1 equiv) in dichloromethane (2 mL) was added isopropylamine (0.036 mL, 0.42 mmol, 2 equiv). The reaction was allowed to stir at room temperature overnight. After 16 hrs the reaction was concentrated to a colorless translucent oil, which was carried on to the next step without further purification.

To a mixture of the thiourea (0.21 mmol) in ethanol and dichloromethane (4 mL, 1:1) was added iodomethane (0.028 mL, 0.45 mmol, 2.15 eq). The mixture was then allowed to stir at room temperature overnight. The clear colorless solution was then neutralized with an aqueous saturated mixture of NaHCO$_3$ (6 mL), diluted with dichloromethane (2 mL), stirred vigorously (1000 rpm) for 2 mins. An aqueous solution of NaOH (1 mL, 1 N) was then added, and the biphasic mixture was poured into a separatory funnel, partitioned, and the organic layer was washed with an aqueous saturated mixture of NaHCO$_3$ (3×5 mL). Residual organics were back extracted from the aqueous layer using dichloromethane (2×5 mL), and all organic layers were combined, washed with brine (1×5 mL), dried over solid Na$_2$SO$_4$, filtered, and concentrated to yield the product as a yellow oil (83.2 mg, 99%). The product was carried onto the subsequent reaction without further purification.

$^1$H NMR (400 MHz, CDCl$_3$) δ 7.55 (dd, J=8.0, 1.5 Hz, 1H), 7.04 (dd, J=7.5, 1.5 Hz, 1H), 6.92 (t, J=7.7 Hz, 1H), 6.88-6.82 (m, 2H), 3.93 (s, 1H), 3.84 (q, J=6.4 Hz, 1H), 2.29 (s, 3H), 2.17 (s, 3H), 2.09 (s, 6H), 1.04 (d, J=6.2 Hz, 6H). $^{13}$C NMR (101 MHz, CDCl$_3$) δ 146.54, 136.58, 136.37, 136.16, 135.56, 131.53, 129.89, 127.86, 123.37, 117.37, 44.76, 23.15, 21.15, 20.72, 14.31.

Example 45: N-(3-bromo-2',4',6'-trimethyl-[1,1'-biphenyl]-2-yl)-N-isopropylmethanediimine

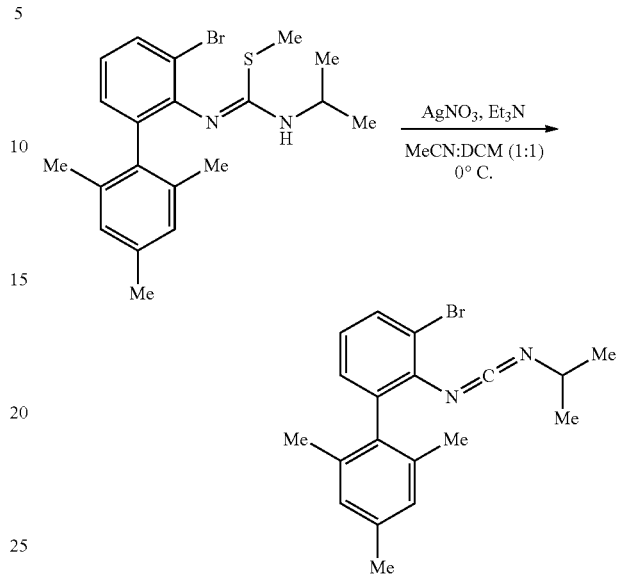

A solution of the methyl isothiourea (83.2 mg, 0.21 mmol, 1.00 eq) and Et$_3$N (57.2 µL, 0.41 mmol, 2.0 eq) in MeCN-dichloromethane (3.0 mL, 1:1) in an oven-dried brown vial protected from light was placed in an ice water cooling bath and stirred (300 rpm) for 30 min. Solid AgNO$_3$ (69.7 mg, 0.41 mmol, 2.0 eq) was added all at once. After 1 hr the yellow heterogeneous mixture was diluted with hexanes (4 mL), stirred vigorously (1000 rpm) for 5 mins, suction filtered cold over a pad of celite with hexanes, and concentrated to ~1 mL. The mixture was diluted with hexanes (4 mL), and concentrated to ~1 mL. This process was repeated twice more, and then the hexanes mixture was suction filtered over a pad of celite using hexanes and concentrated in vacuo to afford the carbodiimide (67.6 mg, 0.21 mmol, 92%). The oil was carried on to the next step without further purification.

$^1$H NMR (400 MHz, CDCl$_3$) δ 7.55 (dd, J=7.5, 2.1 Hz, 1H), 7.03-6.95 (m, 4H), 3.24 (hept, J=6.5 Hz, 1H), 2.34 (s, 3H), 2.01 (s, 6H), 1.00 (d, J=6.4 Hz, 6H). $^{13}$C NMR (101 MHz, CDCl$_3$) δ 137.86, 137.59, 137.45, 136.67, 135.39, 132.01, 129.71, 128.33, 125.32, 118.93, 49.33, 24.08, 21.19, 20.48.

Example 46: 2-(3-Bromo-2',4',6'-trimethyl-[1,1'-biphenyl]-2-yl)-1,3-diisopropylguanidine

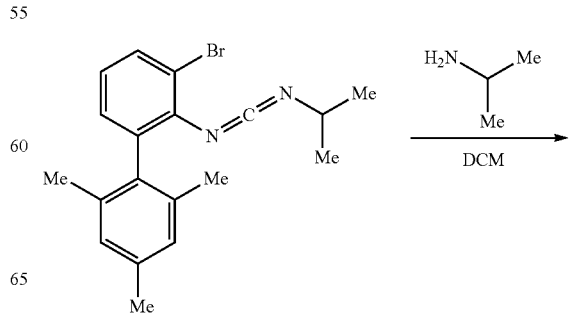

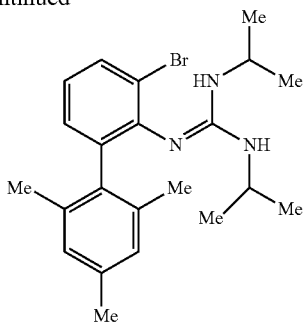

To a solution of N-(3-bromo-2',4',6'-trimethyl-[1,1'-biphenyl]-2-yl)-N-isopropylmethanediimine (67.6 mg, 0.19 mmol, 1 equiv) in dichloromethane (1.5 mL) was added isopropylamine (32.5 µL, 0.38 mmol, 2 equiv). The reaction was allowed to stir at room temperature overnight. After 16 hrs the reaction was concentrated to afford a pale yellow oil (78.7 mg, 99%). The oil was carried on to the next step without further purification.

$^1$H NMR (400 MHz, CDCl$_3$) δ 7.55 (dd, J=7.9, 1.5 Hz, 1H), 7.02 (dd, J=7.4, 1.5 Hz, 1H), 6.90-6.82 (m, 3H), 3.61 (q, J=6.7 Hz, 2H), 3.20 (d, J=8.2 Hz, 2H), 2.28 (s, 3H), 2.07 (s, 6H), 1.00 (d, J=6.4 Hz, 12H). $^{13}$C NMR (101 MHz, CDCl$_3$) δ 147.57, 146.58, 137.36, 137.14, 136.22, 135.83, 131.71, 129.97, 127.74, 122.44, 119.40, 43.10, 23.35, 21.09, 20.79.

Example 47: Ligand 27—N,1-diisopropyl-4-mesitylbenzimidazol-2-amine

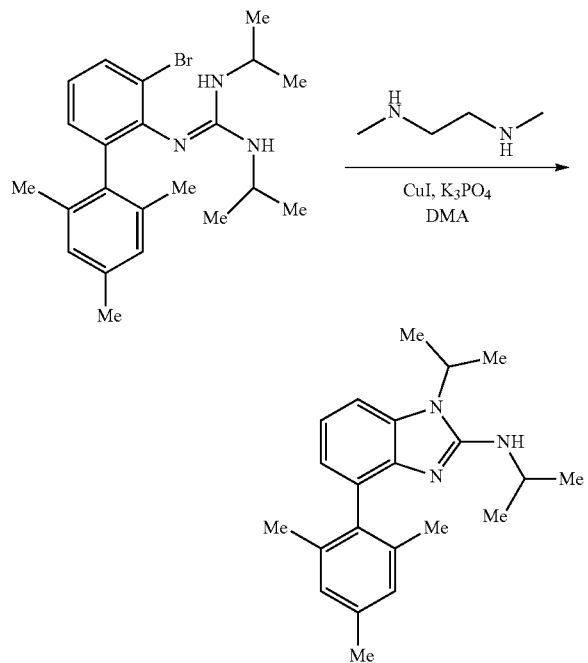

A reaction vial was charged with 2-(3-bromo-2',4',6'-trimethyl-[1,1'-biphenyl]-2-yl)-1,3-diisopropylguanidine (78.7 mg, 0.19 mmol, 1 equiv), K$_3$PO$_4$ (160.5 mg, 0.76 mmol, 4 equiv), and CuI (3.6 mg, 0.02 mmol, 0.1 equiv). N,N'-DMEDA (12.2 µL, 0.11 mmol, 0.6 equiv) and anhydrous DMAc (2 mL) were added via syringe, and the reaction was stirred at 140° C. for 18 h. The reaction was allowed to cool to room temperature. A small aliquot was dissolved in acetonitrile and analyzed by UPLC-MS, which showed complete conversion to the desired product. The material was poured onto water (50 mL). The aqueous phase was extracted with diethyl ether (3×25 mL). The combined organic layers were dried over MgSO$_4$, filtered, and concentrated in vacuo. The crude product was purified by ISCO column chromatography on silica gel with ethyl acetate in hexanes as the solvent system. The purified material was collected as a pale yellow solid, 51.9 mg (82%).

$^1$H NMR (400 MHz, CDCl$_3$) δ 7.22 (dd, J=7.9, 1.1 Hz, 1H), 7.03 (t, J=7.7 Hz, 1H), 6.96 (s, 2H), 6.85 (dd, J=7.5, 1.1 Hz, 1H), 4.39 (hept, J=7.0 Hz, 1H), 4.06 (hept, J=13.0, 6.5 Hz, 1H), 3.70 (d, J=8.0 Hz, 1H), 2.35 (s, 3H), 2.05 (s, 6H), 1.62 (d, J=6.9 Hz, 6H), 1.21 (d, J=6.3 Hz, 6H). $^{13}$C NMR (101 MHz, CDCl$_3$) δ 152.89, 141.22, 137.10, 136.54, 136.21, 133.29, 129.31, 128.02, 122.32, 118.72, 107.91, 46.37, 45.54, 23.38, 21.26, 21.21, 20.92.

Example 48: 3-fluoro-2',4',6'-trimethyl-2-nitro-1,1'-biphenyl

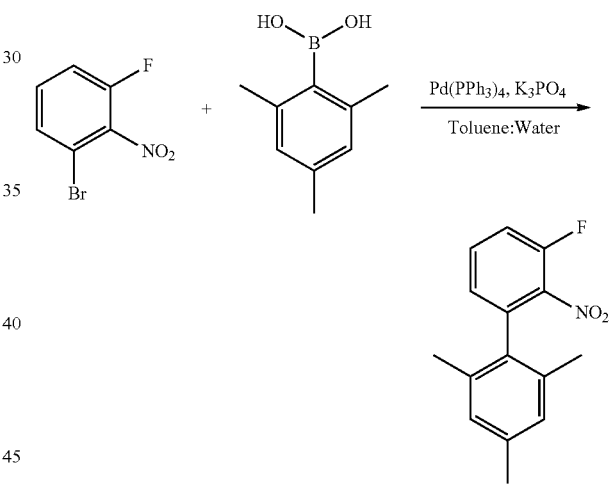

1-bromo-3-fluoro-2-nitrobenzene (200 mg, 0.91 mmol, 1 equiv), mesitylboronic acid (220 mg, 1.36 mmol, 1.5 equiv), Pd(PPh$_3$)$_4$ (110 mg, 0.09 mmol, 0.1 equiv), and K$_3$PO$_4$ (580 mg, 2.73 mmol, 3 equiv) were charged to a vial. The vial was then placed under vacuum and refilled with N$_2$ four times. Toluene (5.0 mL) and water (0.20 mL) were then added, and the reaction was stirred at 100° C. for 18 hours. Reaction was then cooled to room temperature, eluted through a pad of silica gel with ethyl acetate (20 mL), and concentrated under vacuum. The reaction was then purified by ISCO chromatography with an EtOAc in hexanes solvent system, and desired product was collected (156 mg, 66% yield).

$^1$H NMR (500 MHz, CDCl$_3$) δ 7.55 (td, J=8.0, 5.3 Hz, 1H), 7.28 (ddd, J=9.6, 8.4, 1.3 Hz, 1H), 7.05 (dt, J=7.7, 1.1 Hz, 1H), 6.92 (s, 2H), 2.32 (s, 3H), 2.02 (s, 6H). $^{13}$C NMR (126 MHz, CDCl$_3$) δ 153.85 (d, J=257.9 Hz), 138.53, 136.40, 133.85 (d, J=19.5 Hz), 131.97 (d, J=8.2 Hz), 128.74 (d, J=24.2 Hz), 128.58, 128.36, 126.67 (d, J=3.7 Hz), 115.93 (d, J=19.0 Hz), 21.20, 20.31.

Example 49: N-isopropyl-2',4',6'-trimethyl-2-nitro-[1,1'-biphenyl]-3-amine

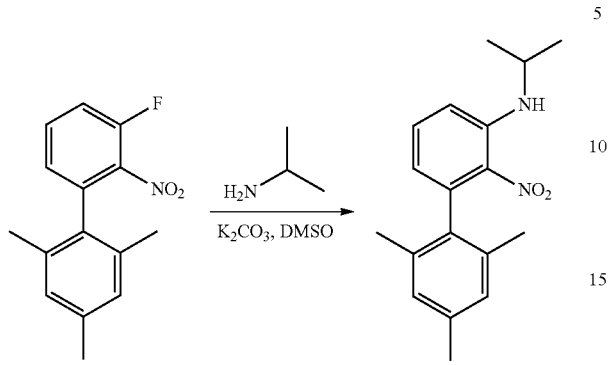

3-fluoro-2',4',6'-trimethyl-2-nitro-1,1'-biphenyl (150 mg, 0.58 mmol) was diluted in DMSO (3.0 mL). Potassium carbonate (240 mg, 1.74 mmol) and isopropylamine (0.342 mL, 4.05 mmol) were then added, the reaction was warmed to 70° C. and stirred overnight. The reaction was then poured into water and extracted with ethyl acetate (3×10 mL). It was then dried over sodium sulfate and concentrated under vacuum. $^1$H NMR of the bright orange-red oil indicated the desired product which was used without further purification (158 mg, 92% yield).

$^1$H NMR (400 MHz, CDCl$_3$) δ 7.35 (dd, J=8.4, 7.4 Hz, 1H), 6.88 (s, 2H), 6.82 (dt, J=8.6, 0.9 Hz, 1H), 6.38 (dd, J=7.3, 1.2 Hz, 1H), 6.13 (d, J=7.1 Hz, 1H), 3.86-3.68 (m, J=6.4 Hz, 1H), 2.30 (s, 3H), 2.01 (s, 6H), 1.30 (d, J=6.3 Hz, 6H).

Example 50: 1-isopropyl-4-mesitylbenzoimidazole

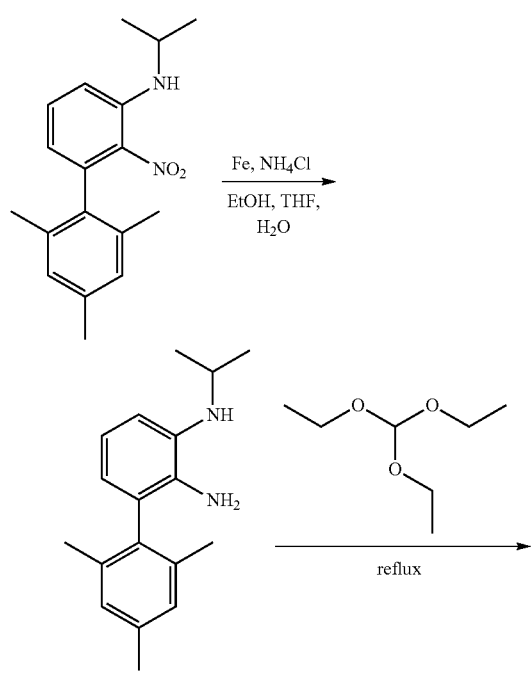

N-isopropyl-2',4',6'-trimethyl-2-nitro-[1,1'-biphenyl]-3-amine (690 mg, 2.31 mmol) was diluted in ethanol and water. Iron powder (646 mg, 11.56 mmol) and NH$_4$Cl (186 mg, 3.47 mmol) were then added and rinsed into the flask using THF. The reaction was then equipped with a reflux condenser and heated to 95° C. After three hours the reaction was then suction filtered through Celite with ethyl acetate (50 mL) and poured into aqueous saturated NH$_4$Cl. The biphasic mixture was poured into a separatory funnel, partitioned, organics were extracted with ethyl acetate (3×50 mL), washed with brine, dried with sodium sulfate, and concentrated on vacuum. The desired cyclization was then completed by refluxing the mixture in neat triethyl orthoformate (30 mL) for 2 hours. The reaction was then concentrated on vacuum and purified by ISCO chromatography using an ethyl acetate and hexane gradient to afford the desired product (554 mg, 86%).

$^1$H NMR (400 MHz, CDCl$_3$) δ 7.92 (s, 1H), 7.41 (d, J=7.5 Hz, 1H), 7.33 (t, J=7.7 Hz, 1H), 7.06 (d, J=6.5 Hz, 1H), 6.97 (s, 2H), 4.66 (hept, J=6.8 Hz, 1H), 2.33 (s, 3H), 1.98 (s, 6H), 1.66 (d, J=6.7 Hz, 6H).

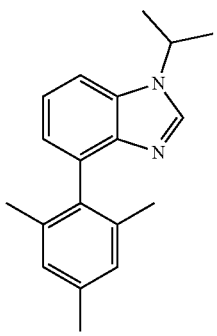

Example 51: 2-bromo-1-isopropyl-4-mesitylbenzoimidazole

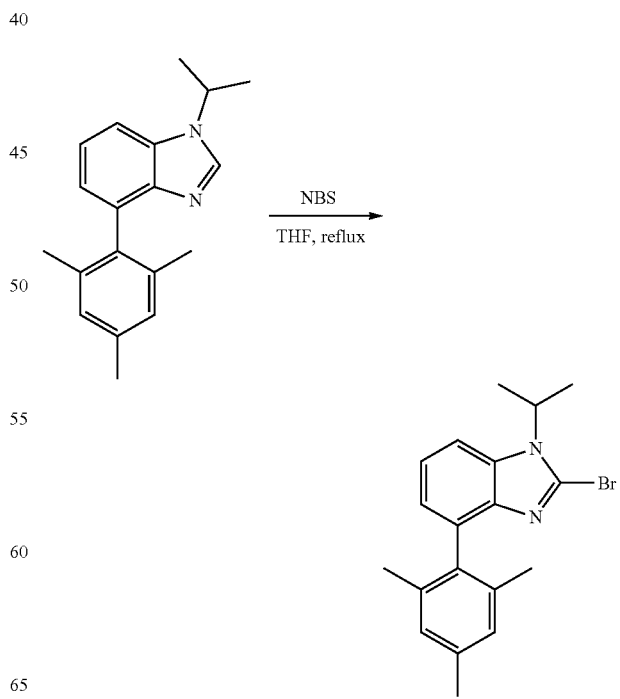

1-isopropyl-4-mesitylbenzoimidazole (550 mg, 1.98 mmol) was diluted in THF (20 mL). N-bromosuccinimide (387 mg, 2.17 mmol) was then added and the reaction was heated to reflux for four hours. Solvent was then evaporated by vacuum, and the reaction was purified by ISCO chromatography using an ethyl acetate and hexane gradient to provide the bromide product (356 mg, 50.4%).

$^1$H NMR (400 MHz, CDCl$_3$) δ 7.51 (dd, J=8.3, 1.1 Hz, 1H), 7.26 (t, J=7.8 Hz, 1H), 7.00 (dd, J=7.4, 1.0 Hz, 1H), 6.94 (s, 2H), 4.97 (hept, J=6.9 Hz, 1H), 2.32 (s, 3H), 1.97 (s, 6H), 1.70 (d, J=7.0 Hz, 6H). $^{13}$C NMR (101 MHz, CDCl$_3$) δ 142.60, 136.96, 136.56, 134.98, 134.14, 132.86, 129.44, 128.31, 123.49, 122.50, 109.83, 109.83, 50.57, 21.27, 21.27, 20.83.

Example 52: Ligand 31—N-benzyl-1-isopropyl-4-mesitylbenzimidazol-2-amine

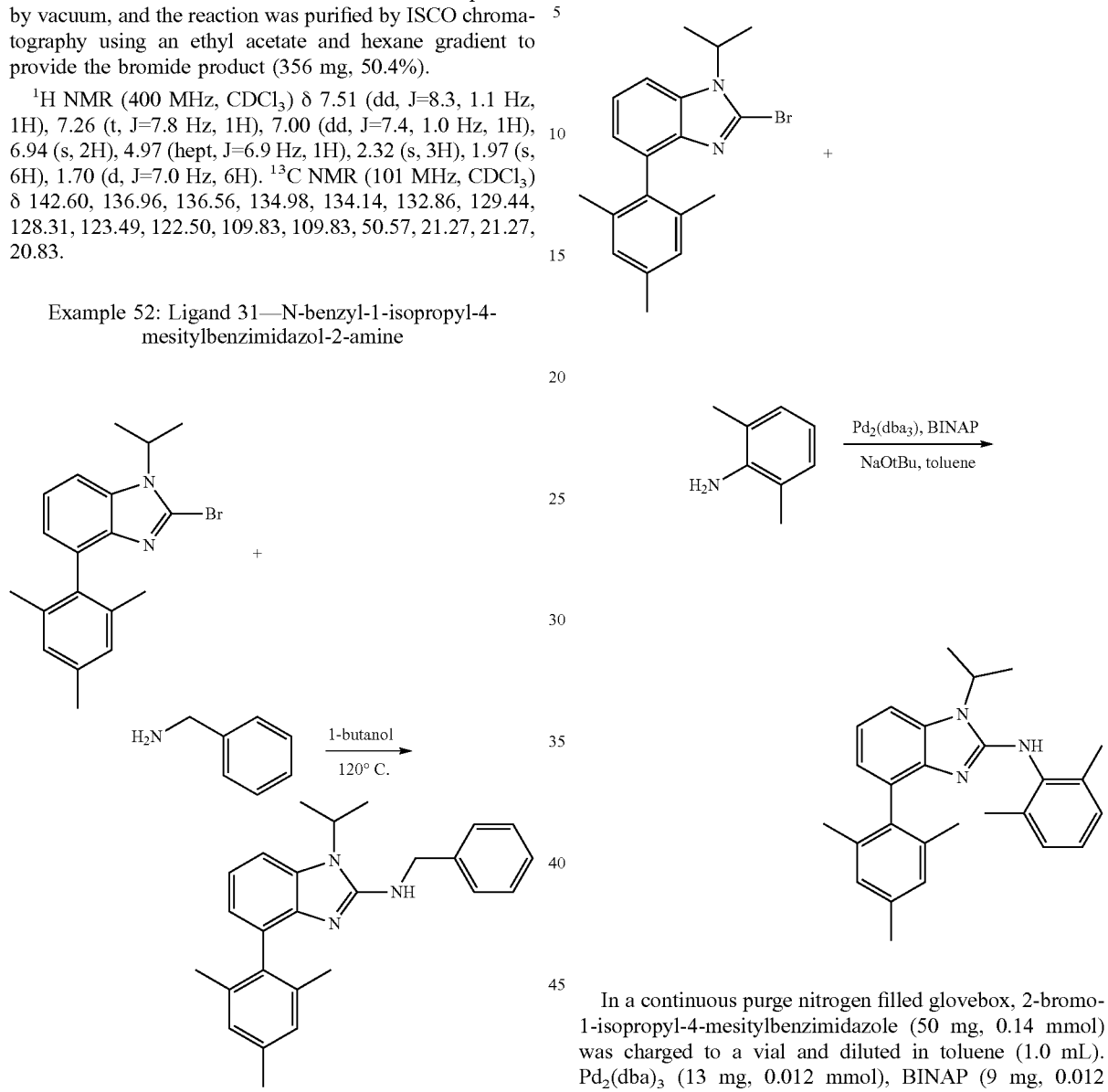

2-bromo-1-isopropyl-4-mesityl benzimidazole (30 mg, 0.084 mmol, 1 equiv) was diluted in 1-butanol (0.80 mL). Benzylamine (0.092 mL, 0.84 mmol, 10 equiv) was then added all at once and the reaction was sealed, heated to 120° C. and stirred overnight. Reaction was then cooled to room temperature and purified by ISCO chromatography using a gradient of ethyl acetate and hexanes to afford the product as a yellow oil (24.5 mg, 76%).

$^1$H NMR (400 MHz, CDCl$_3$) δ 7.38-7.27 (m, 5H), 7.23 (dd, J=7.9, 1.1 Hz, 1H), 7.06 (t, J=7.7 Hz, 1H), 6.97 (s, 2H), 6.88 (dd, J=7.5, 1.0 Hz, 1H), 4.60 (s, 2H), 4.41 (hept, J=7.0 Hz, 1H), 4.19 (s, 1H), 2.35 (s, 3H), 2.06 (s, 6H), 1.62 (d, J=6.9 Hz, 6H). $^{13}$C NMR (101 MHz, CDCl$_3$) δ 153.35, 141.07, 139.53, 137.03, 136.42, 136.22, 133.61, 129.63, 128.67, 128.19, 128.04, 127.51, 122.48, 118.97, 107.93, 48.32, 46.47, 21.28, 20.98.

Example 53: Ligand 32—N-(2,6-dimethylphenyl)-1-isopropyl-4-mesitylbenzimidazol-2-amine In a continuous purge nitrogen filled glovebox, 2-bromo-1-isopropyl-4-mesitylbenzimidazole (50 mg, 0.14 mmol) was charged to a vial and diluted in toluene (1.0 mL). Pd$_2$(dba)$_3$ (13 mg, 0.012 mmol), BINAP (9 mg, 0.012 mmol), and sodium tert-butoxide (30 mg, 0.31 mmol) were then added followed by 2,6-dimethylaniline (0.029 mL, 0.24 mmol). The reaction was then sealed and heated to 100° C. for two hours at which time UPLC indicated complete conversion of the starting bromide. The reaction was then filtered through silica with ethyl acetate (30 mL) and purified by ISCO chromatography on an ethyl acetate and hexanes gradient to afford the product as a yellow-brown oil (46 mg, 83% yield).

$^1$H NMR (500 MHz, DMSO-d$_6$) δ 7.80 (s, 1H), 7.42-7.36 (m, 1H), 7.06-6.92 (m, 4H), 6.79 (s, 2H), 6.62 (dd, J=7.4, 1.2 Hz, 1H), 4.91 (hept, J=6.8 Hz, 1H), 2.19 (s, 3H), 2.11 (s, 6H), 1.84 (s, 6H), 1.62 (d, J=6.8 Hz, 6H). $^{13}$C NMR (126 MHz, DMSO-d$_6$) δ 151.60, 141.01, 137.53, 136.59, 135.72, 135.17, 135.01, 132.90, 128.88, 128.18, 127.96, 127.91, 127.57, 125.40, 121.30, 118.48, 108.54, 45.77, 20.59, 20.53, 20.39, 18.08.

Example 54: Ligand 28—N-cyclohexyl-1-isopropyl-4-mesitylbenzoimidazol-2-amine

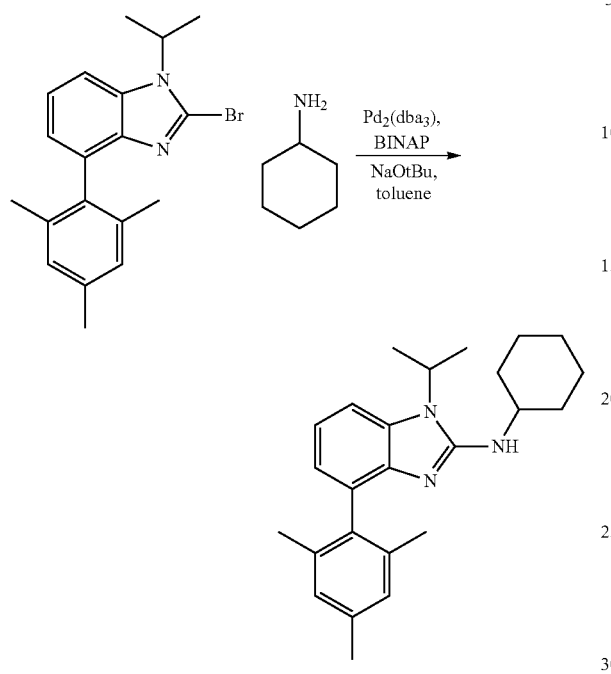

In a continuous purge nitrogen filled glovebox, sodium tert-butoxide (45 mg, 0.47 mmol) and a solution of 2-bromo-1-isopropyl-4-mesitylbenzimidazole in toluene (0.3 M, 0.69 mL, 0.21 mmol, 1 equiv.) was added to a vial equipped with a stir bar. To the same vial was added a cyclohexylamine (0.041 mL, 0.36 mmol, 1.7 equiv.), a solution of 2,2'-Bis(diphenylphosphino)-1,1'-binaphthalene in toluene (0.31 M, 0.068 mL, 0.02 mmol, 10 mol %), a solution of tris(dibenzylideneacetone) dipalladium (0) in toluene (0.31 M, 0.067 mL, 0.02 mmol, 10 mol %), and toluene (2 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel, and then washed with $H_2O$ (25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system to afford the product (54 mg, 69%).

$^1$H NMR (400 MHz, $CDCl_3$) δ 7.22 (d, J=8.0 Hz, 1H), 7.04 (t, J=7.7 Hz, 1H), 6.97 (s, 2H), 6.86 (d, J=7.4 Hz, 1H), 4.53-4.33 (m, 1H), 3.78 (m, 2H), 2.36 (s, 3H), 2.06 (s, 6H), 1.77-1.67 (m, 4H), 1.64 (d, J=6.9 Hz, 6H), 1.40 (q, J=14.5, 13.3 Hz, 2H), 1.24-1.14 (m, 2H). $^{13}$C NMR (101 MHz, $CDCl_3$) δ 152.73, 141.13, 136.98, 136.41, 136.04, 133.24, 129.11, 128.22, 127.93, 122.28, 118.50, 107.67, 60.40, 51.91, 46.25, 33.66, 25.83, 24.72, 21.13, 21.10, 20.82, 14.21.

Example 55: Ligand 25—1-isopropyl-4-mesityl-N-pentylbenzoimidazol-2-amine

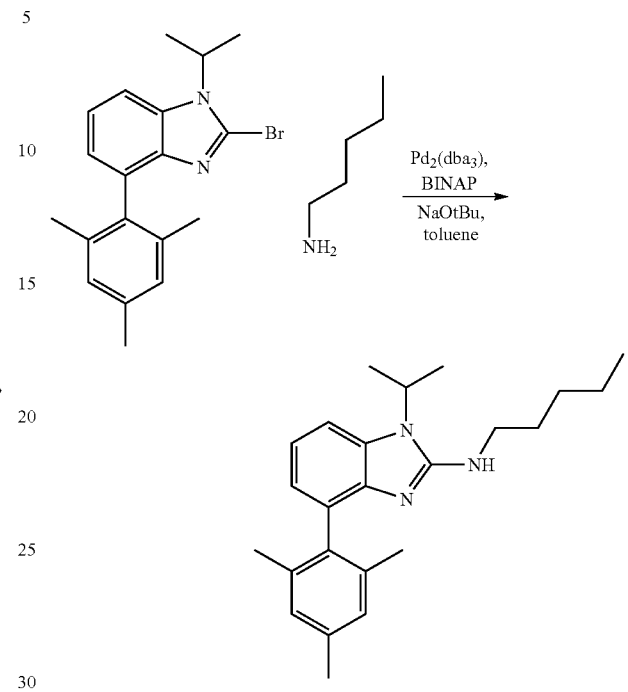

In a continuous purge nitrogen filled glovebox, sodium tert-butoxide (45 mg, 0.47 mmol) and a solution of 2-bromo-1-isopropyl-4-mesitylbenzimidazole in toluene (0.3 M, 0.69 mL, 0.21 mmol, 1 equiv.) was added to a vial equipped with a stir bar. To the same vial was added amylamine (0.041 mL, 0.36 mmol, 1.7 equiv.), a solution of 2,2'-Bis(diphenylphosphino)-1,1'-binaphthalene in toluene (0.31 M, 0.068 mL, 0.02 mmol, 10 mol %), a solution of tris(dibenzylideneacetone) dipalladium (0) in toluene (0.31 M, 0.067 mL, 0.02 mmol, 10 mol %), and toluene (2 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel, and then washed with $H_2O$ (25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system To afford the product (48 mg, 63%).

$^1$H NMR (400 MHz, $CDCl_3$) δ 7.22 (dd, J=7.9, 1.1 Hz, 1H), 7.05 (t, J=7.7 Hz, 1H), 6.97 (s, 2H), 6.86 (dd, J=7.5, 1.1 Hz, 1H), 4.42 (p, J=7.0 Hz, 1H), 3.86 (t, J=5.7 Hz, 1H), 3.41 (q, J=6.6 Hz, 2H), 2.36 (s, 3H), 2.07 (d, J=1.4 Hz, 6H), 1.64 (m, 8H), 1.35 (q, J=3.7 Hz, 4H), 0.95-0.86 (m, 3H). $^{13}$C NMR (101 MHz, $CDCl_3$) δ 153.51, 141.10, 136.96, 136.41, 136.05, 133.39, 129.22, 127.89, 122.22, 118.56, 107.62, 60.40, 46.23, 44.08, 29.66, 29.10, 22.48, 21.14, 21.10, 21.06, 20.82, 14.21, 14.00.

Example 56: Ligand 30—N-(adamantan-1-yl)-1-isopropyl-4-mesitylbenzimidazol-2-amine

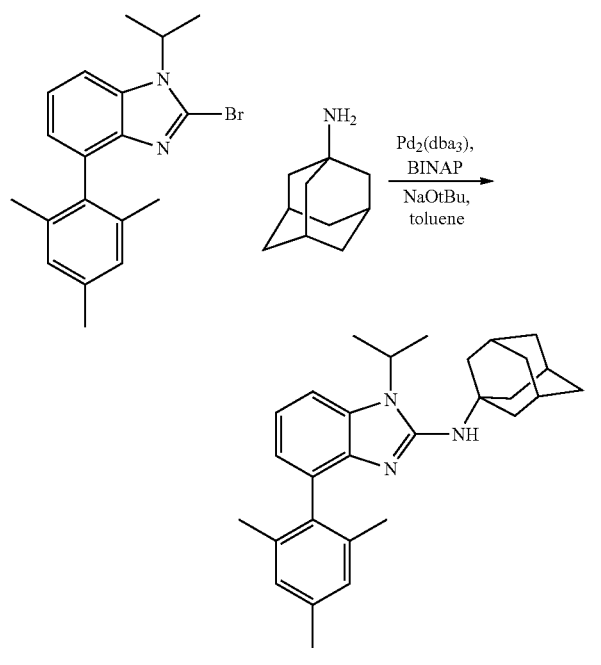

In a continuous purge nitrogen filled glovebox, sodium tert-butoxide (45 mg, 0.47 mmol) and a solution of 2-bromo-1-isopropyl-4-mesitylbenzimidazole in toluene (0.3 M, 0.69 mL, 0.21 mmol, 1 equiv.) was added to a vial equipped with a stir bar. To the same vial was added a solution of 1-adamantylamine in toluene (1.55 M, 0.231 mL, 0.36 mmol, 1.7 equiv.), a solution of 2,2'-Bis(diphenylphosphino)-1,1'-binaphthalene in toluene (0.31 M, 0.068 mL, 0.02 mmol, 10 mol %), a solution of tris(dibenzylideneacetone) dipalladium (0) in toluene (0.31 M, 0.067 mL, 0.02 mmol, 10 mol %), and toluene (2 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel, and then washed with $H_2O$ (25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system, and then purified by supercritical fluid chromatography to provide the desired product (13.3 mg, 15%).

$^1$H NMR (400 MHz, $CDCl_3$) δ 7.26 (dd, J=7.9, 1.1 Hz, 1H), 7.05 (t, J=7.7 Hz, 1H), 6.95 (s, 2H), 6.88 (dd, J=7.5, 1.1 Hz, 1H), 4.55 (hept, J=7.0 Hz, 1H), 3.60 (s, 1H), 2.35 (s, 3H), 2.07 (s, 9H), 2.00 (d, J=2.9 Hz, 6H), 1.68-1.59 (m, 12H). $^{13}$C NMR (101 MHz, $CDCl_3$) δ 151.36, 141.23, 136.48, 135.97, 132.79, 129.92, 127.96, 122.49, 118.96, 108.17, 53.46, 46.56, 42.91, 36.59, 29.90, 21.30, 21.25, 21.01.

Example 57: Ligand 29—1-isopropyl-4-mesityl-N-(2,4,4-trimethylpentan-2-yl)-benzimidazol-2-amine

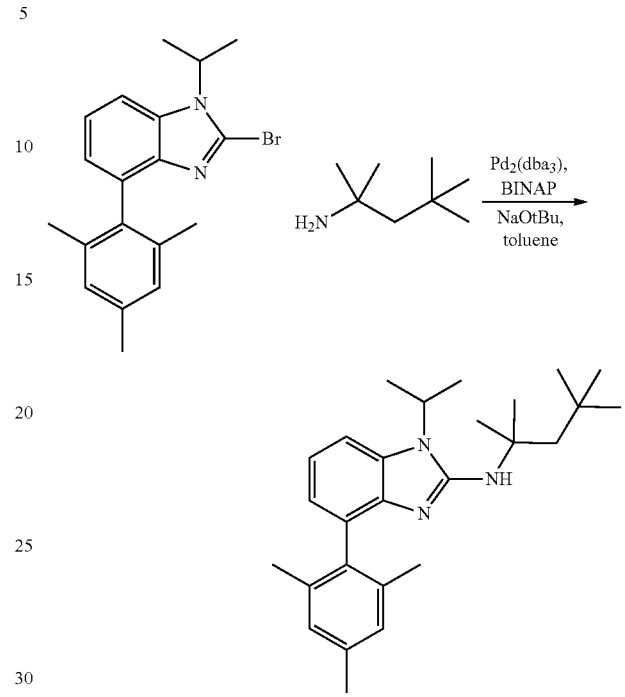

In a continuous purge nitrogen filled glovebox, sodium tert-butoxide (45 mg, 0.47 mmol) and a solution of 2-bromo-1-isopropyl-4-mesitylbenzimidazole in toluene (0.3 M, 0.69 mL, 0.21 mmol, 1 equiv.) was added to a vial equipped with a stir bar. To the same vial was added tert-octylamine (57 µL, 0.36 mmol, 1.7 equiv.), a solution of 2,2'-Bis(diphenylphosphino)-1,1'-binaphthalene in toluene (0.31 M, 0.068 mL, 0.02 mmol, 10 mol %), a solution of tris(dibenzylideneacetone) dipalladium (0) in toluene (0.31 M, 0.067 mL, 0.02 mmol, 10 mol %), and toluene (2 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel, and then washed with $H_2O$ (25 mL), followed by saturated aqueous NaCl (25 mL). The organic layer was dried over $MgSO_4$, and concentrated in vacuo. The crude reaction mixture was purified using ISCO flash column chromatography with a silica gel column and an ethyl acetate in hexanes solvent system to afford the desired product (45.7 mg, 54%).

$^1$H NMR (400 MHz, $CDCl_3$) δ 7.21 (dd, J=7.9, 1.1 Hz, 1H), 7.02 (t, J=7.7 Hz, 1H), 6.96 (s, 2H), 6.85 (dd, J=7.4, 1.1 Hz, 1H), 4.37 (hept, J=7.0 Hz, 1H), 3.80 (s, 1H), 2.37 (s, 3H), 2.08 (s, 6H), 1.89 (s, 2H), 1.63 (d, J=6.9 Hz, 6H), 1.48 (s, 6H), 0.98 (s, 9H). $^{13}$C NMR (101 MHz, $CDCl_3$) δ 151.43, 141.65, 136.98, 136.88, 135.73, 132.70, 129.51, 127.74, 122.07, 118.29, 107.58, 56.29, 51.29, 46.23, 31.85, 31.66, 30.06, 21.29, 21.27, 20.97.

Example 58: Ligand 26—1-isopropyl-4-mesityl-N-neopentylbenzimidazol-2-amine

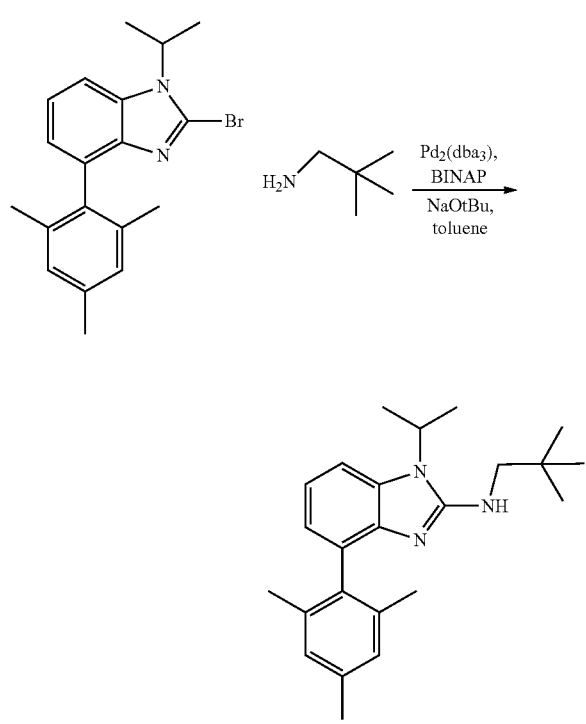

In a continuous purge nitrogen filled glovebox, sodium tert-butoxide (45 mg, 0.47 mmol) and a solution of 2-bromo-1-isopropyl-4-mesitylbenzimidazole in toluene (0.3 M, 0.69 mL, 0.21 mmol, 1 equiv.) was added to a vial equipped with a stir bar. To the same vial was added neo-pentylamine (42 µL, 0.36 mmol, 1.7 equiv.), a solution of 2,2'-Bis(diphenylphosphino)-1,1'-binaphthalene in toluene (0.31 M, 0.068 mL, 0.02 mmol, 10 mol %), a solution of tris(dibenzylideneacetone) dipalladium (0) in toluene (0.31 M, 0.067 mL, 0.02 mmol, 10 mol %), and toluene (2 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel and then washed with H₂O (25 mL), followed by saturated aqueous NaCl (25 mL). The organic layer was dried over MgSO₄, and concentrated in vacuo. The crude reaction mixture was purified using ISCO flash column chromatography with a silica gel column and an ethyl acetate in hexanes solvent system to afford the desired product (30.9 mg, 40%).

$^1$H NMR (400 MHz, CDCl$_3$) δ 7.18 (d, J=7.8 Hz, 1H), 7.07-6.99 (m, 1H), 6.96 (s, 2H), 6.84 (d, J=7.5 Hz, 1H), 4.45 (p, J=7.0 Hz, 1H), 3.98 (s, 1H), 3.27 (s, 2H), 2.35 (s, 3H), 2.09-1.99 (m, 6H), 1.73-1.59 (m, 6H), 1.00-0.89 (m, 9H). $^{13}$C NMR (101 MHz, CDCl$_3$) δ 154.17, 141.08, 137.11, 136.57, 136.16, 133.71, 129.21, 128.03, 122.41, 118.63, 107.43, 55.17, 46.28, 32.21, 27.45, 21.27, 20.92.

Example 59: 9-(3-fluoro-2-nitrophenyl)-carbazole

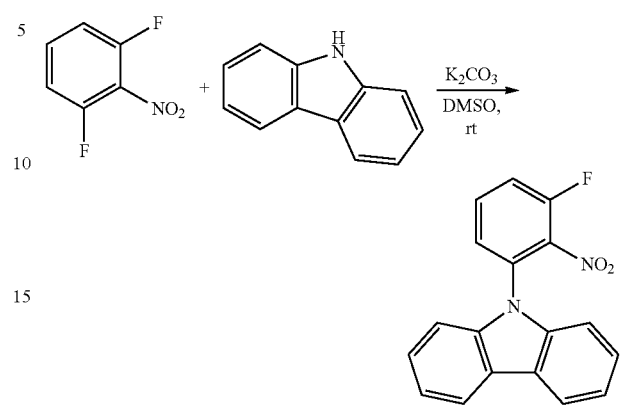

Carbazole (1.05 g, 6.29 mmol) and 1,3-difluoro-2-nitrobenzene (1.0 g, 6.29 mmol) were dissolved in DMSO (14 mL). Potassium carbonate (1.04 g, 7.54 mmol) was added to the solution with stirring. The suspension was stirred for 18 h at room temperature before being cooled and diluted with water (20 mL). The mixture was extracted with dichloromethane (3×40 mL). The combined organic layers were washed with water (3×40 mL), dried over MgSO₄, and concentrated under reduced pressure. The residue was purified by ISCO flash column chromatography with a silica gel column and an ethyl acetate in hexanes solvent system (1.3 g, 75%).

$^1$H NMR (400 MHz, CDCl$_3$) δ 8.16-8.06 (m, 2H), 7.80-7.68 (m, 1H), 7.48 (td, J=8.7, 1.2 Hz, 1H), 7.44-7.37 (m, 3H), 7.32 (ddd, J=8.2, 7.3, 1.0 Hz, 2H), 7.17 (dt, J=8.2, 0.9 Hz, 2H). $^{13}$C NMR (101 MHz, CDCl$_3$) δ 141.08, 133.01, 132.92, 132.43, 126.60, 126.55, 124.07, 121.19, 120.70, 117.64, 117.45, 109.52.

Example 60: 3-(carbazol-9-yl)-N-isopropyl-2-nitroaniline

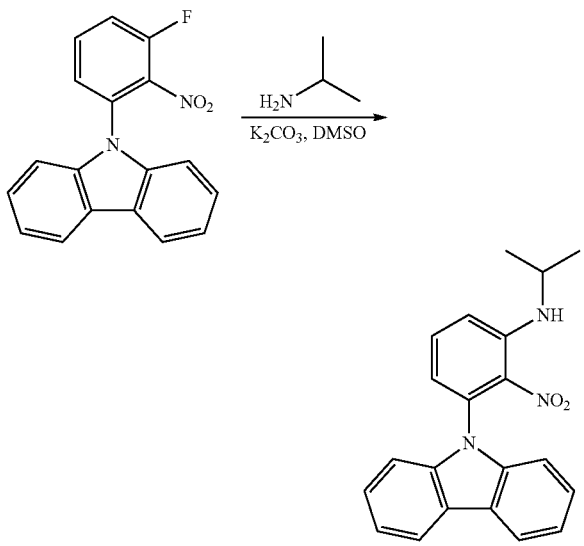

9-(3-fluoro-2-nitrophenyl)-carbazole (1.3 g, 4.25 mmol) was diluted in DMSO (30 mL). Potassium carbonate (1.759 g, 12.75 mmol) and isopropylamine (2.507 mL, 29.74 mmol) were then added and the reaction was heated to 70° C. and stirred overnight. The reaction was then poured into water and extracted with ethyl acetate (3×50 mL) and washed with brine. Combined organic layers were then dried with sodium sulfate and concentrated under vacuum. The bright orange-red solid was carried on to the next step without further purification (1.21 g, 82.5%).

$^1$H NMR (400 MHz, CDCl$_3$) δ 8.11 (dt, J=7.7, 1.1 Hz, 2H), 7.52 (ddd, J=8.4, 7.6, 0.6 Hz, 1H), 7.38 (ddd, J=8.3, 7.2, 1.3 Hz, 2H), 7.30-7.22 (m, 4H), 7.04-6.95 (m, 1H), 6.81 (dd, J=7.6, 1.2 Hz, 1H), 6.39 (d, J=7.1 Hz, 1H), 3.89-3.78 (m, 1H), 1.35 (d, J=6.3 Hz, 6H).

Example 61:
9-(1-isopropylbenzimidazol-4-yl)-carbazole

Example 62:
9-(2-bromo-1-isopropylbenzimidazol-4-yl)-carbazole

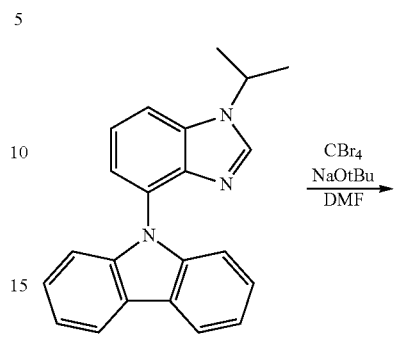

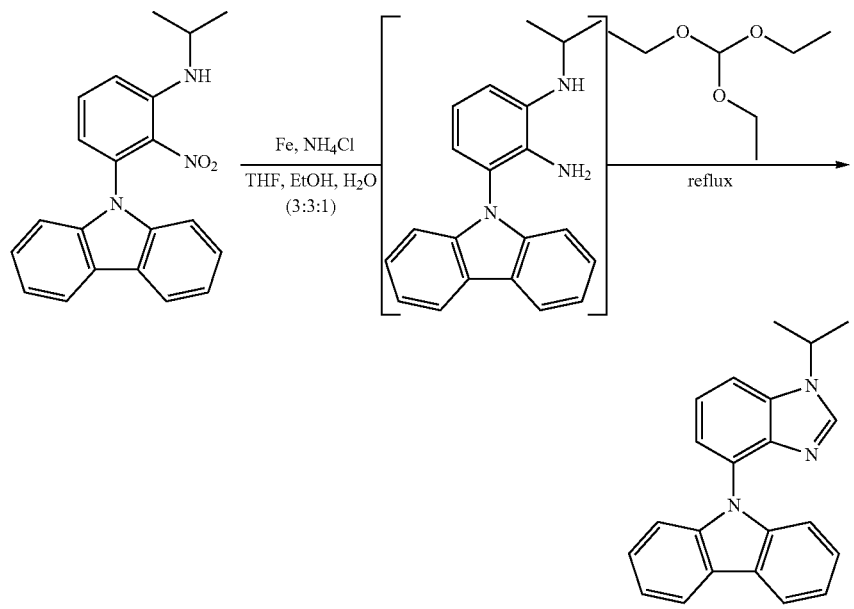

3-(carbazol-9-yl)-N-isopropyl-2-nitroaniline (962 mg, 2.79 mmol) was diluted in THF (15 mL). Iron powder (780 mg, 13.93 mmol) and NH$_4$Cl (447 mg, 8.36 mmol) were then added followed by water (5 mL) and ethanol (15 mL). The reaction was then equipped with a reflux condenser and heated to 95° C. and monitored by TLC for the reduction of the nitro-group. After stirring for 4 hrs, TLC indicated near complete reduction. The reaction was then filtered through Celite with ethyl acetate (50 mL) and poured into sat. aqueous NH$_4$Cl solution, extracted with ethyl acetate (3×50 mL). Combined organic layers were washed with brine, dried with sodium sulfate, and concentrated under vacuum. The desired cyclization was then completed by refluxing the mixture in neat triethyl orthoformate (30 mL) for 2 hours. The reaction was then concentrated under vacuum and purified by ISCO chromatography using an ethyl acetate and hexane gradient to afford the benzimidazole (803 mg yield, 78%).

$^1$H NMR (400 MHz, CDCl$_3$) δ 8.15 (dd, J=7.9, 1.3 Hz, 2H), 7.99 (s, 1H), 7.56 (q, J=4.2 Hz, 1H), 7.50-7.45 (m, 2H), 7.36 (ddd, J=8.2, 6.9, 1.3 Hz, 2H), 7.31-7.22 (m, 4H), 4.74 (hept, J=6.8 Hz, 1H), 1.71 (d, J=6.8 Hz, 6H).

-continued

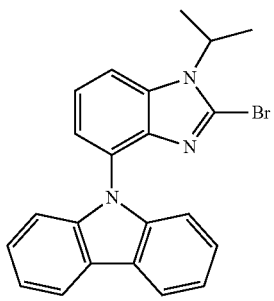

To a solution of 9-(1-isopropylbenzimidazol-4-yl)-carbazole (415 mg, 1.28 mmol) in DMF (6.4 mL) was added carbon tetrabromide (845.8 mg, 2.55 mmol) and sodium t-butoxide (980.4 mg, 10.2 mmol). The mixture was stirred at room temperature for 25 min. The solution was poured into water and then extracted with Et$_2$O (3×30 mL). The combined organic phase was dried over anhydrous MgSO$_4$, filtered and concentrated under reduced pressure. The reaction was purified using ISCO flash column chromatography with a silica gel column and an ethyl acetate in hexanes solvent system to afford the bromide (44.5 mg, 9%).

$^1$H NMR (400 MHz, CDCl$_3$) δ 8.15 (dd, J=8.1, 1.4 Hz, 2H), 7.66 (p, J=4.0 Hz, 1H), 7.45-7.33 (m, 4H), 7.32-7.24 (m, 4H), 5.03 (hept, J=7.1 Hz, 1H), 1.75 (d, J=7.0 Hz, 6H). $^{13}$C NMR (101 MHz, CDCl$_3$) δ 141.49, 140.57, 135.96, 130.26, 128.84, 125.75, 123.94, 123.19, 121.38, 120.22, 119.90, 110.85, 110.80, 50.93, 21.24.

Example 63: Ligand 34—N-(adamantan-1-yl)-4-(carbazol-9-yl)-1-isopropylbenzimidazol-2-amine

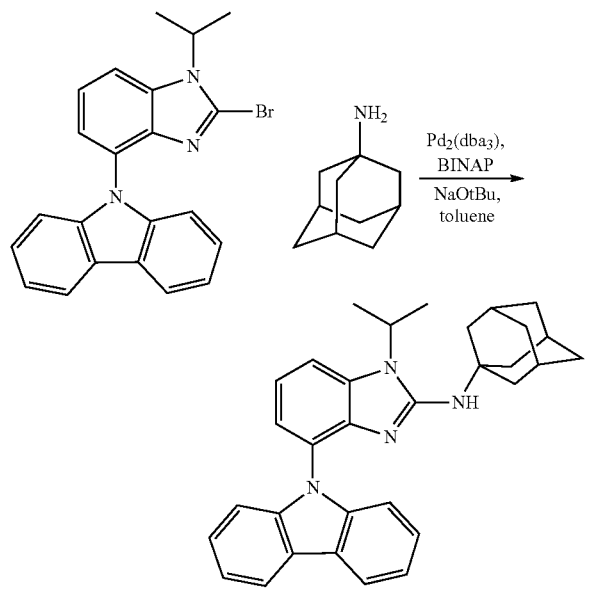

In a continuous purge nitrogen filled glovebox, sodium tert-butoxide (42 mg, 0.44 mmol) and a solution of 9-(2-bromo-1-isopropylbenzimidazol-4-yl)-9H-carbazole in toluene (0.3 M, 0.651 mL, 0.20 mmol, 1 equiv.) was added to a vial equipped with a stir bar. To the same vial was added a solution of 1-adamantylamine in toluene (1.55 M, 0.218 mL, 0.34 mmol, 1.7 equiv.), a solution of 2,2'-Bis(diphenylphosphino)-1,1'-binaphthalene in toluene (0.31 M, 0.065 mL, 0.02 mmol, 10 mol %), a solution of tris(dibenzylideneacetone) dipalladium (0) in toluene (0.31 M, 0.064 mL, 0.02 mmol, 10 mol %), and toluene (1.5 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel, and then washed with H$_2$O (25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system to afford the product (54.8 mg, 58%).

$^1$H NMR (400 MHz, CDCl$_3$) δ 8.17 (d, J=7.7 Hz, 2H), 7.51 (d, J=8.2 Hz, 2H), 7.36 (ddd, J=8.4, 7.1, 1.5 Hz, 3H), 7.34-7.22 (m, 3H), 7.15 (t, J=7.9 Hz, 1H), 4.42 (hept, J=7.0 Hz, 1H), 3.80 (s, 1H), 2.04-1.96 (m, 9H), 1.65 (d, J=6.9 Hz, 6H), 1.62-1.43 (m, 6H). $^{13}$C NMR (101 MHz, CDCl$_3$) δ 151.28, 141.23, 138.79, 134.73, 126.07, 125.06, 123.61, 119.76, 119.28, 118.91, 118.77, 112.20, 108.07, 53.12, 46.52, 42.21, 36.43, 29.77, 21.22.

Example 64: Ligand 33—4-(carbazol-9-yl)-1-isopropyl-N-(2,4,4-trimethylpentan-2-yl)-benzimidazol-2-amine

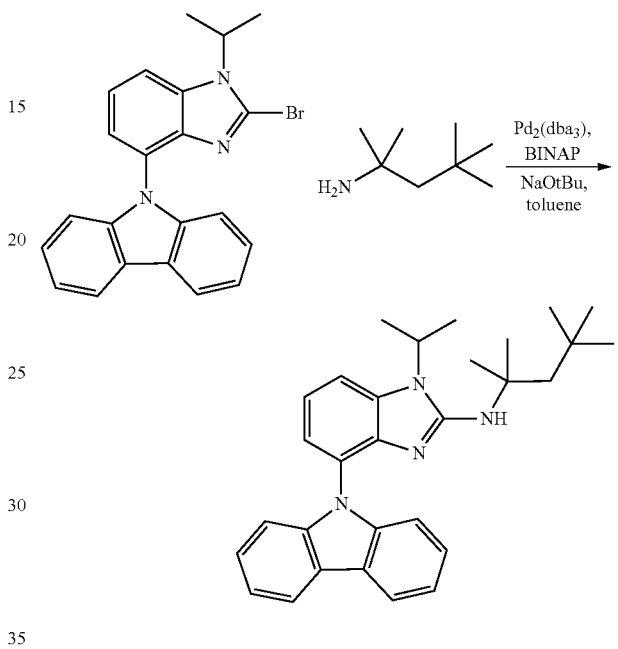

In a continuous purge nitrogen filled glovebox, sodium tert-butoxide (42 mg, 0.44 mmol) and a solution of 9-(2-bromo-1-isopropylbenzimidazol-4-yl)-9H-carbazole in toluene (0.3 M, 0.651 mL, 0.20 mmol, 1 equiv.) was added to a vial equipped with a stir bar. To the same vial was added tert-octylamine (54 μL, 0.34 mmol, 1.7 equiv.), a solution of 2,2'-Bis(diphenylphosphino)-1,1'-binaphthalene in toluene (0.31 M, 0.065 mL, 0.02 mmol, 10 mol %), a solution of tris(dibenzylideneacetone) dipalladium (0) in toluene (0.31 M, 0.064 mL, 0.02 mmol, 10 mol %), and toluene (1.5 mL). Once all additions were complete, the vial was heated to 100° C. and allowed to stir for 3 hr. The reaction was then cooled to room temperature and removed from the glovebox. The reaction was diluted with ethyl acetate (25 mL), poured into a separatory funnel, and then washed with H$_2$O (25 mL), followed by saturated aqueous NaCl (25 mL). The organic layer was dried over MgSO$_4$, and concentrated in vacuo. The crude reaction mixture was purified using ISCO flash column chromatography with a silica gel column and an ethyl acetate in hexanes solvent system. The desired product was collected to yield 40.1 mg, a 45% yield.

$^1$H NMR (400 MHz, CDCl$_3$) δ 8.17 (dd, J=7.8, 1.3 Hz, 2H), 7.46 (dd, J=8.3, 1.1 Hz, 2H), 7.37 (ddd, J=8.3, 7.1, 1.3 Hz, 2H), 7.31 (dd, J=8.0, 1.0 Hz, 1H), 7.27 (ddd, J=8.3, 6.9, 1.2 Hz, 3H), 7.13 (t, J=7.8 Hz, 1H), 4.36 (hept, J=7.0 Hz, 1H), 3.95 (s, 1H), 1.78 (s, 2H), 1.66 (d, J=6.9 Hz, 6H), 1.38 (s, 6H), 0.96 (s, 9H). $^{13}$C NMR (101 MHz, CDCl$_3$) δ 151.60, 141.50, 139.40, 134.74, 125.92, 125.32, 123.53, 119.81, 119.21, 119.08, 118.76, 111.89, 108.14, 56.40, 51.09, 46.45, 31.83, 31.70, 29.83, 21.25.

Example 65: Procatalyst 2

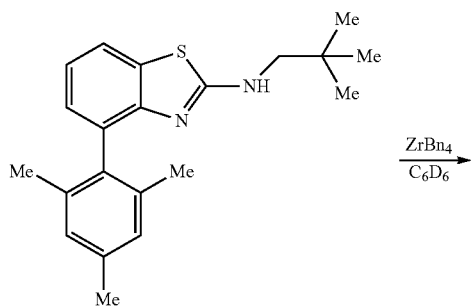

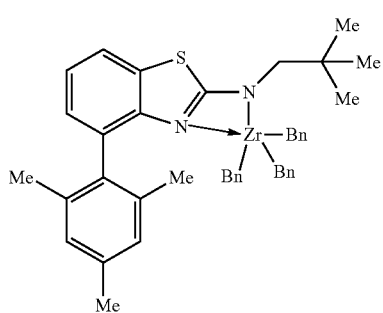

4-mesityl-N-neopentylbenzothiazol-2-amine (10 mg, 0.03 mmol) was dissolved in deuterated benzene (2 mL) and then added to tetrabenzylzirconium (13.5 mg, 0.03 mmol). The reaction mixture was allowed to stir for 10 minutes upon which $^1$H NMR indicated consumption of the starting ligand to the desired complex. The solution was concentrated to afford the zirconium complex as a yellow film (20 mg, 96%).

$^1$H NMR (500 MHz, C$_6$D$_6$) δ 7.15 (dd, J=6.1, 3.0 Hz, 1H), 7.03 (t, J=7.7 Hz, 6H), 6.87-6.81 (m, 5H), 6.77 (s, 2H), 6.46 (d, J=7.6 Hz, 6H), 2.92 (s, 2H), 2.08 (s, 6H), 2.05 (s, 3H), 2.04 (s, 6H), 0.77 (s, 9H). $^{13}$C NMR (126 MHz, C$_6$D$_6$) δ 179.24, 148.38, 143.15, 138.11, 137.10, 136.74, 129.88, 129.60, 129.51, 129.31, 128.74, 127.67, 123.12, 122.17, 120.44, 79.68, 65.96, 34.70, 28.09, 21.19, 21.09.

Example 66: Procatalyst 3

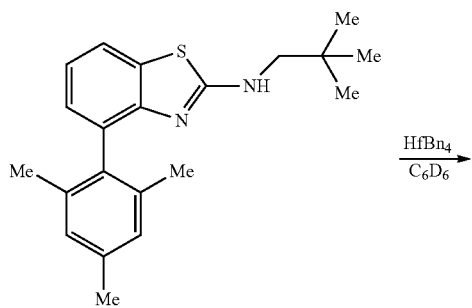

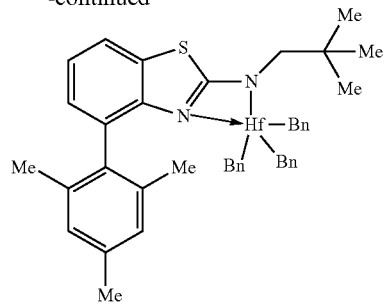

4-mesityl-N-neopentylbenzothiazol-2-amine (10 mg, 0.03 mmol) was dissolved in deuterated benzene (2 mL) and then added to tetrabenzylhafnium (15.8 mg, 0.03 mmol). The reaction mixture was allowed to stir for 10 minutes upon which $^1$H NMR indicated consumption of the starting ligand to the desired complex. The solution was concentrated to afford the hafnium complex as a yellow film (22 mg, 94%).

$^1$H NMR (500 MHz, C$_6$D$_6$) δ 7.19-7.17 (m, 1H), 7.13 (t, J=7.8 Hz, 6H), 6.90-6.85 (m, 5H), 6.82 (s, 2H), 6.81-6.75 (m, 6H), 2.88 (s, 2H), 2.13 (s, 3H), 2.10 (s, 6H), 1.99 (s, 6H), 0.66 (s, 9H). $^{13}$C NMR (126 MHz, C$_6$D$_6$) δ 179.00, 148.25, 143.18, 138.24, 136.96, 136.37, 129.60, 129.42, 129.34, 129.26, 129.04, 128.57, 123.05, 122.47, 120.36, 89.87, 65.59, 34.35, 27.87, 21.35, 21.12.

Example 67: Procatalyst 4

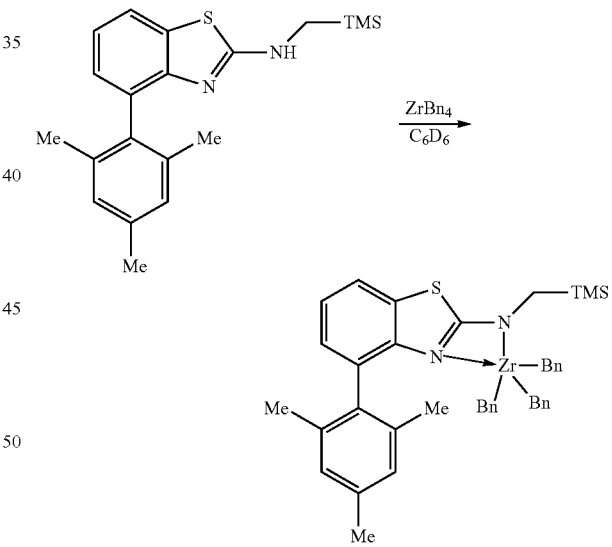

To a solution of tetrabenzylzirconium (12.9 mg, 0.03 mmol) in deuterated benzene (0.5 mL) was added a deuterated benzene solution of 4-mesityl-N-((trimethylsilyl)methyl)benzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the zirconium complex as a yellow film (19 mg, 94%).

$^1$H NMR (400 MHz, C$_6$D$_6$) δ 7.21 (ddd, J=5.6, 3.6, 0.5 Hz, 1H), 7.11-7.06 (m, 6H), 6.91-6.86 (m, 3H), 6.84 (dd, J=2.0, 0.4 Hz, 1H), 6.83 (d, J=0.4 Hz, 1H), 6.79 (dt, J=1.2, 0.6 Hz, 2H), 6.47-6.40 (m, 6H), 2.82 (s, 2H), 2.07 (s, 6H), 2.07 (s, 6H), 2.07 (s, 3H), 0.04 (d, J=0.4 Hz, 9H). $^{13}$C NMR (101 MHz, C$_6$D$_6$) δ 177.68, 148.88, 142.87, 137.05, 136.99, 130.97, 129.95, 129.70, 129.29, 128.93, 128.74, 128.54, 123.14, 121.55, 120.50, 78.24, 45.59, 21.43, 21.06, -1.5.

Example 68: Procatalyst 5

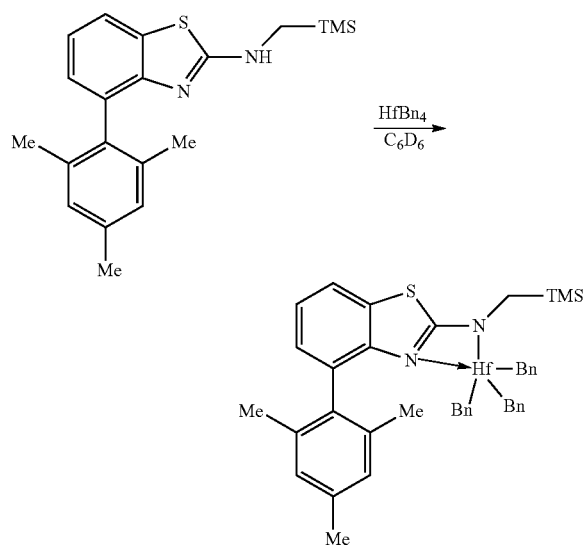

To a solution of tetrabenzylhafnium (15.1 mg, 0.03 mmol) in deuterated benzene (0.5 mL) was added a deuterated benzene solution of 4-mesityl-N-((trimethylsilyl)methyl)benzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the hafnium complex as a yellow film (21 mg, 92%).

$^1$H NMR (400 MHz, C$_6$D$_6$) δ 7.19 (ddd, J=4.8, 4.3, 0.5 Hz, 1H), 7.16-7.10 (m, 6H), 6.90-6.84 (m, 5H), 6.82 (dt, J=1.2, 0.6 Hz, 2H), 6.76-6.71 (m, 6H), 2.69 (s, 2H), 2.11 (s, 3H), 2.09 (d, J=0.6 Hz, 6H), 1.96 (s, 6H), -0.10 (d, J=0.5 Hz, 9H). $^{13}$C NMR (101 MHz, C$_6$D$_6$) δ 177.51, 148.68, 143.13, 138.27, 136.99, 136.55, 129.49, 129.23, 129.10, 129.08, 128.37, 127.91, 123.05, 121.96, 120.46, 88.92, 44.99, 21.44, 21.26, -1.89.

Example 69: Procatalyst 6

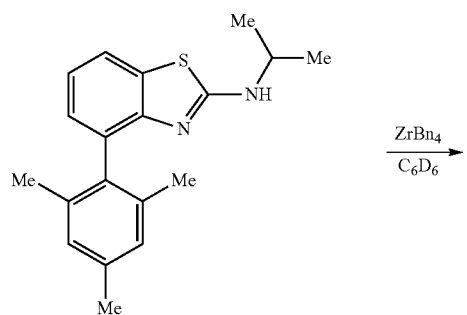

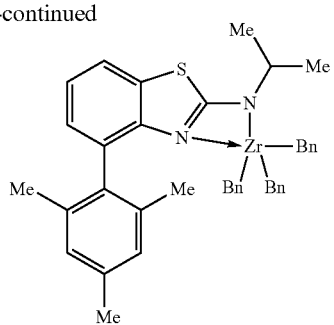

To a solution of tetrabenzylzirconium (14.7 mg, 0.03 mmol) in deuterated benzene (0.5 mL) was added a deuterated benzene solution of N-isopropyl-4-mesitylbenzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the zirconium complex as a yellow film (21 mg, 97%).

$^1$H NMR (500 MHz, C$_6$D$_6$) δ 7.21 (dd, J=7.6, 1.5 Hz, 1H), 7.11-7.04 (m, 6H), 6.92-6.85 (m, 3H), 6.86 (t, J=7.5 Hz, 1H), 6.82 (dd, J=7.5, 1.5 Hz, 1H), 6.79 (s, 2H), 6.58-6.52 (m, 6H), 3.46 (hept, J=6.8 Hz, 1H), 2.20 (s, 6H), 2.12 (s, 3H), 2.07 (s, 7H), 0.91 (d, J=6.7 Hz, 6H). $^{13}$C NMR (126 MHz, C$_6$D$_6$) δ 177.12, 148.21, 142.75, 138.13, 137.12, 137.09, 129.72, 129.53, 129.19, 129.14, 128.60, 128.01, 123.11, 121.88, 120.24, 79.67, 55.17, 21.53, 21.44, 21.23.

Example 70: Procatalyst 7

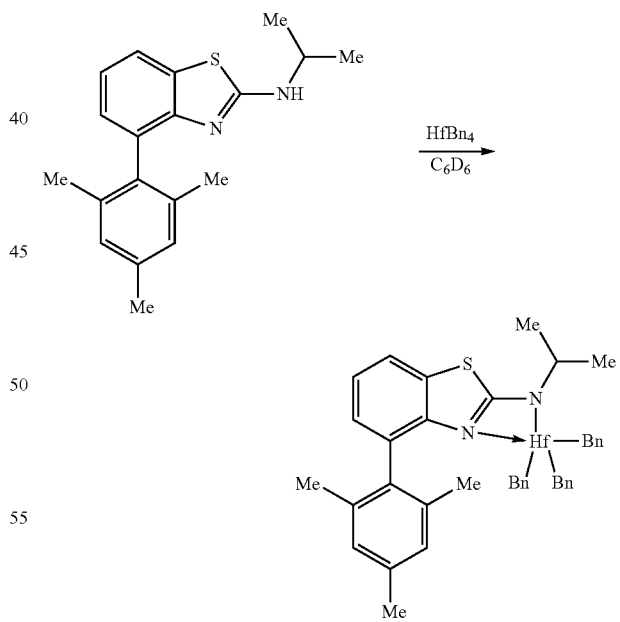

N-isopropyl-4-mesitylbenzothiazol-2-amine (10 mg, 0.03 mmol) was dissolved in deuterated benzene (2 mL) and then added to tetrabenzylhafnium (17.2 mg, 0.03 mmol). The reaction mixture was allowed to stir for 10 minutes upon which $^1$H NMR indicated consumption of the starting ligand to the desired complex. The solution was concentrated to afford the hafnium complex as a yellow film (23 mg, 94%).

$^1$H NMR (500 MHz, C$_6$D$_6$) δ 7.19 (dd, J=7.2, 1.9 Hz, 1H), 7.11 (dd, J=8.2, 7.3 Hz, 6H), 6.90-6.80 (m, 7H), 6.79-6.73 (m, 6H), 3.39 (p, J=6.7 Hz, 1H), 2.15 (s, 3H), 2.08 (s, 6H), 2.04 (s, 6H), 0.77 (d, J=6.7 Hz, 6H). $^{13}$C NMR (126 MHz, C$_6$D$_6$) δ 176.67, 148.18, 142.74, 138.23, 136.99, 136.60, 129.46, 129.34, 129.18, 128.97, 128.57, 128.13, 123.00, 122.22, 120.22, 89.49, 55.23, 21.57, 21.31, 21.19.

Example 71: Procatalyst 8

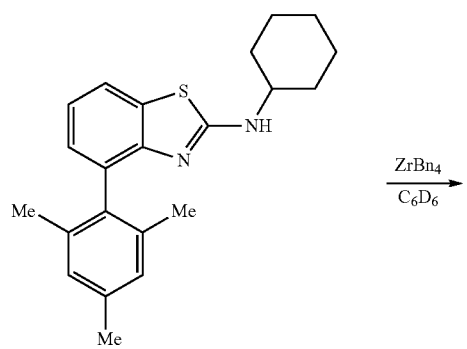

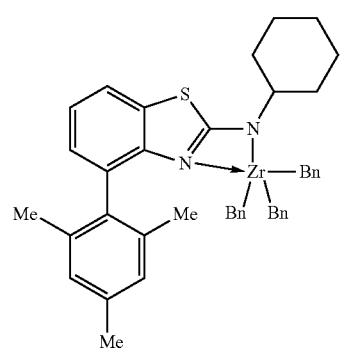

To a solution of tetrabenzylzirconium (13.0 mg, 0.03 mmol) in deuterated benzene (0.5 mL) was added a deuterated benzene solution of N-cyclohexyl-4-mesitylbenzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the zirconium complex as a yellow film (19 mg, 93%).

$^1$H NMR (400 MHz, C$_6$D$_6$) δ 7.23 (dd, J=7.6, 1.7 Hz, 1H), 7.11-7.06 (m, 6H), 6.88 (tdd, J=7.5, 3.6, 2.3 Hz, 4H), 6.83 (dd, J=7.5, 1.7 Hz, 1H), 6.81-6.79 (m, 2H), 6.61-6.53 (m, 6H), 3.16-3.00 (m, 1H), 2.23 (s, 6H), 2.13 (s, 3H), 2.07 (s, 6H), 1.67-1.30 (m, 7H), 1.11-0.82 (m, 3H). $^{13}$C NMR (101 MHz, C$_6$D$_6$) δ 177.28, 148.13, 142.98, 138.15, 137.14, 137.13, 129.71, 129.53, 129.21, 129.14, 128.57, 128.00, 123.10, 121.93, 120.20, 79.99, 63.50, 31.63, 26.08, 25.70, 21.45, 21.24.

Example 72: Procatalyst 9

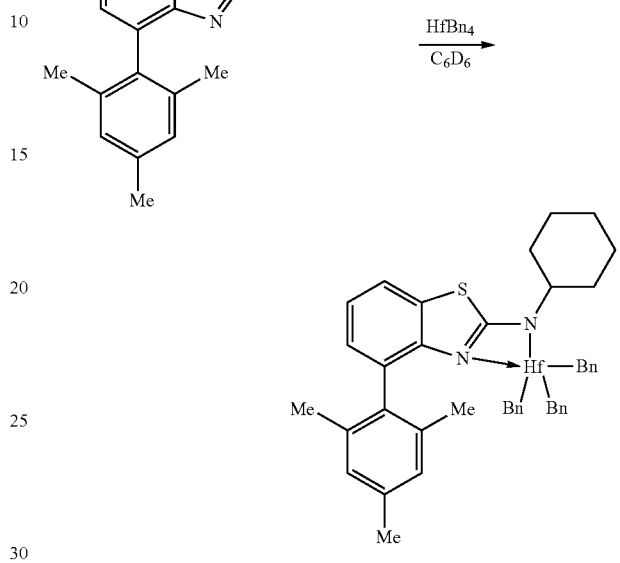

To a solution of tetrabenzylhafnium (15.2 mg, 0.03 mmol) in deuterated benzene (0.5 mL) was added a deuterated benzene solution of N-cyclohexyl-4-mesitylbenzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the hafnium complex as a yellow film (22 mg, 96%).

$^1$H NMR (400 MHz, C$_6$D$_6$) δ 7.21 (dd, J=7.1, 2.0 Hz, 1H), 7.12 (t, J=6.8 Hz, 6H), 6.90-6.81 (m, 7H), 6.80-6.75 (m, 6H), 3.03 (tt, J=10.6, 5.3 Hz, 1H), 2.16 (s, 3H), 2.09 (s, 6H), 2.07 (s, 6H), 1.57-1.46 (m, 2H), 1.42-1.19 (m, 5H), 1.04-0.80 (m, 3H). $^{13}$C NMR (101 MHz, C$_6$D$_6$) δ 176.87, 148.12, 143.06, 138.24, 137.02, 136.65, 129.48, 129.34, 129.21, 128.97, 128.57, 128.10, 122.97, 122.27, 120.18, 89.81, 63.36, 31.72, 25.91, 25.53, 21.45, 21.31.

Example 73:—Procatalyst 10

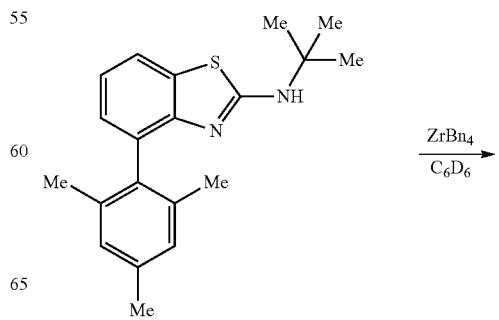

-continued

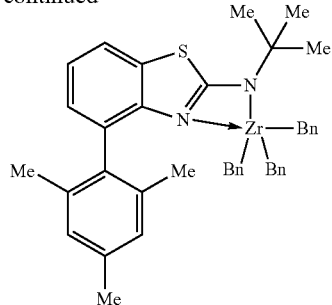

To a solution of tetrabenzylzirconium (14.0 mg, 0.03 mmol) in deuterated benzene (0.5 mL) was added a deuterated benzene solution of N-(tert-butyl)-4-mesitylbenzothiazol-2-amine (10 mg in 0.5 mL C$_6$D$_6$, 0.03 mmol), rinsing with deuterated benzene (2×0.5 mL). The reaction mixture was allowed to stir for 5 10 minutes upon which $^1$H NMR indicated consumption of the starting ligand to the desired complex. The solution was concentrated to afford the zirconium complex as a yellow film (20 mg, 94%).

$^1$H NMR (400 MHz, C$_6$D$_6$) δ 7.21 (dd, J=7.2, 1.9 Hz, 1H), 7.09 (dd, J=8.2, 7.3 Hz, 6H), 6.94-6.86 (m, 5H), 6.85-6.82 (m, 2H), 6.71-6.67 (m, 6H), 2.33 (s, 6H), 2.21 (s, 3H), 2.10 (s, 6H), 0.99 (s, 9H). $^{13}$C NMR (101 MHz, C$_6$D$_6$) δ 172.98, 147.24, 143.33, 137.67, 137.22, 137.09, 130.39, 129.83, 129.80, 129.51, 129.40, 127.97, 123.15, 122.01, 120.02, 82.17, 56.06, 28.73, 21.45, 21.35.

Example 74: Procatalyst 11

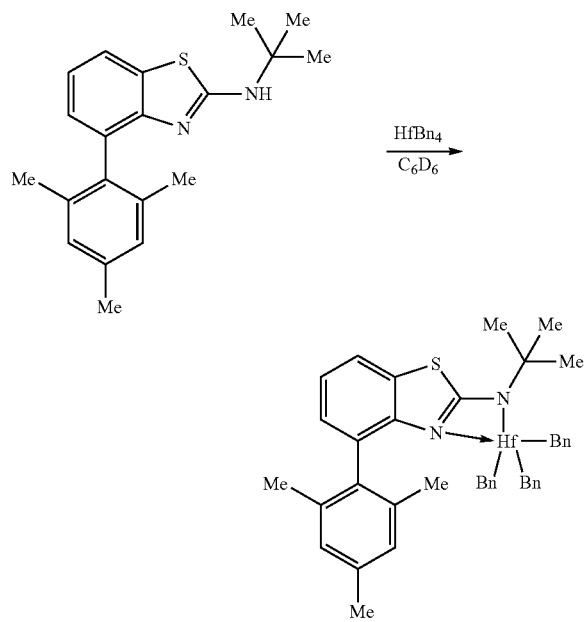

To a solution of tetrabenzylhafnium (16.5 mg, 0.03 mmol) in deuterated benzene (0.5 mL) was added a deuterated benzene solution of N-(tert-butyl)-4-mesitylbenzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the hafnium complex as a yellow film (21 mg, 88%).

$^1$H NMR (400 MHz, C$_6$D$_6$) δ 7.18 (ddd, J=6.3, 2.9, 0.6 Hz, 1H), 7.15-7.09 (m, 6H), 6.92-6.87 (m, 3H), 6.87-6.81 (m, 10H), 2.19 (s, 3H), 2.13 (s, 6H), 2.10 (d, J=0.6 Hz, 6H), 0.92 (d, J=0.5 Hz, 9H). $^{13}$C NMR (101 MHz, C$_6$D$_6$) δ 173.50, 147.13, 143.38, 136.89, 136.76, 130.30, 130.13, 129.78, 129.67, 129.37, 128.98, 128.90, 128.16, 122.97, 122.26, 119.79, 91.22, 55.88, 28.83, 21.45, 21.41.

Example 75: Procatalyst 13

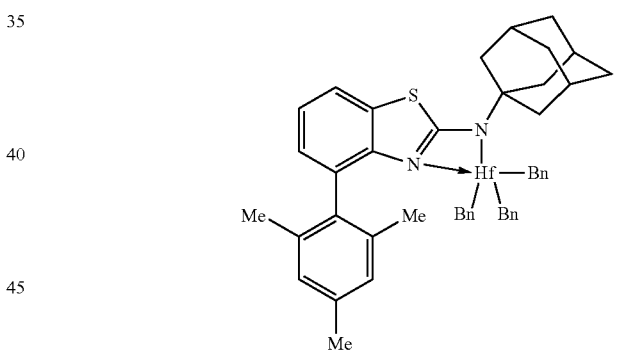

To a solution of tetrabenzylhafnium in deuterated benzene (0.10 M, 273 µL) was added a deuterated benzene solution of N-(adamantan-1-yl)-4-mesitylbenzothiazol-2-amine (11.0 mg in 0.5 mL C$_6$D$_6$, 0.03 mmol), rinsing with deuterated benzene (2×0.25 mL). The reaction mixture was allowed to stir for 5 minutes upon which $^1$H NMR indicated consumption of the starting ligand to the desired complex. The solution was concentrated to afford the hafnium complex as a yellow film (23 mg, 98%).

$^1$H NMR (400 MHz, C$_6$D$_6$) δ 7.22 (dd, J=6.7, 2.4 Hz, 1H), 7.13 (t, J=7.7 Hz, 7H), 6.95-6.89 (m, 2H), 6.89-6.80 (m, 10H), 2.23 (s, 3H), 2.17 (s, 6H), 2.12 (s, 6H), 1.91-1.83 (m, 3H), 1.55 (d, J=2.9 Hz, 6H), 1.45 (d, J=3.1 Hz, 6H). $^{13}$C NMR (101 MHz, C$_6$D$_6$) δ 172.77, 146.83, 143.98, 137.87, 136.92, 130.51, 129.86, 129.74, 129.43, 128.86, 128.18, 122.92, 122.32, 119.73, 91.75, 56.50, 40.70, 36.25, 29.98, 21.43, 21.38.

Example 76: Procatalyst 14

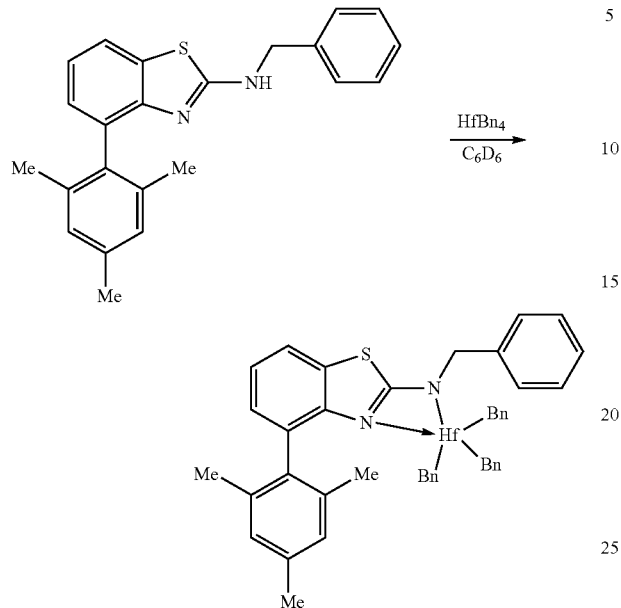

To a solution of tetrabenzylhafnium (14.9 mg, 0.03 mmol) in deuterated benzene (0.5 mL) was added a solution of N-benzyl-4-mesitylbenzothiazol-2-amine (10.0 mg, 0.03 mmol) in deuterated benzene (0.5 mL) rinsing with deuterated benzene (2×0.25 mL). The reaction mixture was allowed to stir for 5 minutes upon which $^1$H NMR indicated consumption of the starting ligand to the desired complex. The solution was concentrated to afford the hafnium complex as a yellow film (20 mg, 89%).

$^1$H NMR (400 MHz, C$_6$D$_6$) δ 7.10 (t, J=7.2 Hz, 8H), 7.08-7.05 (m, 1H), 6.87 (dt, J=7.5, 1.3 Hz, 4H), 6.85-6.79 (m, 5H), 6.69-6.64 (m, 6H), 4.11 (s, 2H), 2.16 (s, 3H), 2.05 (s, 6H), 2.00 (s, 6H). $^{13}$C NMR (101 MHz, C$_6$D$_6$) δ 179.91, 147.99, 142.97, 138.32, 138.04, 137.02, 136.59, 129.46, 129.43, 129.23, 129.08, 128.95, 128.73, 127.76, 127.42, 123.10, 122.35, 120.39, 89.06, 55.31, 21.44, 21.24.

Example 77: Procatalyst 15

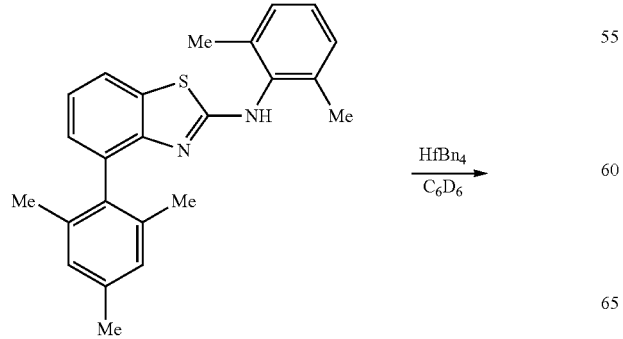

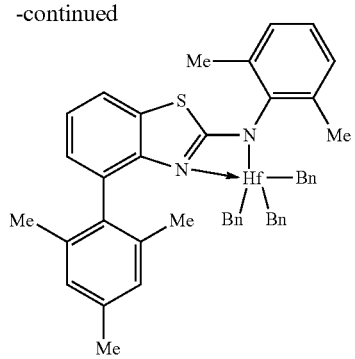

To a solution of tetrabenzylhafnium (14.3 mg, 0.03 mmol) in deuterated benzene (0.5 mL) was added dropwise a deuterated benzene solution of N-(2,6-dimethylphenyl)-4-mesitylbenzothiazol-2-amine (10 mg in 0.5 mL C$_6$D$_6$, 0.03 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the hafnium complex as a yellow film (21 mg, 95%).

$^1$H NMR (400 MHz, C$_6$D$_6$) δ δ 7.07-7.01 (m, 6H), 6.99 (dd, J=6.9, 2.3 Hz, 1H), 6.89 (s, 3H), 6.87 (s, 2H), 6.85-6.78 (m, 5H), 6.57-6.51 (m, 6H), 2.22 (s, 3H), 2.10 (s, 6H), 2.06 (s, 6H), 1.84 (s, 6H). $^{13}$C NMR (101 MHz, C$_6$D$_6$) δ 179.93, 148.46, 145.20, 143.05, 138.42, 137.21, 136.53, 133.98, 130.29, 129.74, 129.46, 129.31, 128.96, 128.86, 128.69, 127.06, 122.94, 122.79, 120.60, 91.64, 21.44, 21.30, 18.15.

Example 78: Procatalyst 17

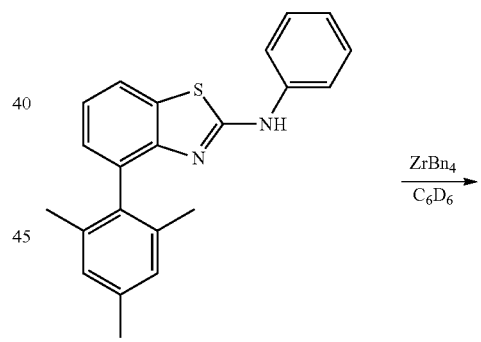

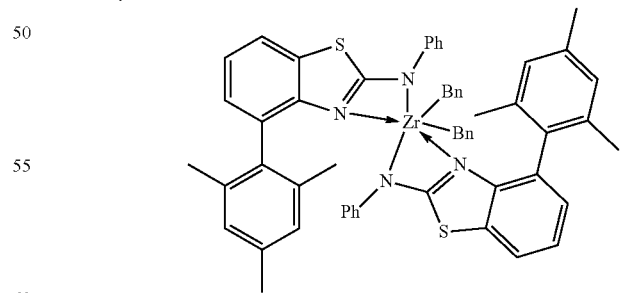

To a solution of tetrabenzylzirconium (13.2 mg, 0.03 mmol) in deuterated benzene (0.5 mL) was added a deuterated benzene solution of 4-mesityl-N-((trimethylsilyl)methyl)benzothiazol-2-amine (20 mg in 0.5 mL C$_6$D$_6$, 0.06 mmol), rinsing with deuterated benzene (2×0.5 mL). The reaction mixture was allowed to stir for 5 10 minutes upon which ¹H NMR indicated consumption of the starting ligand to the desired complex. The solution was concentrated to afford the zirconium complex (26 mg, 93%).

¹H NMR (500 MHz, C₆D₆) δ 7.21 (s, 2H), 7.12 (t, J=7.3 Hz, 3H), 7.09-6.99 (m, 8H), 6.95-6.84 (m, 7H), 6.79 (s, 3H), 6.70 (s, 4H), 6.42 (s, 3H), 2.13 (s, 6H), 2.08-1.96 (m, 16H).

Example 79: Procatalyst 18

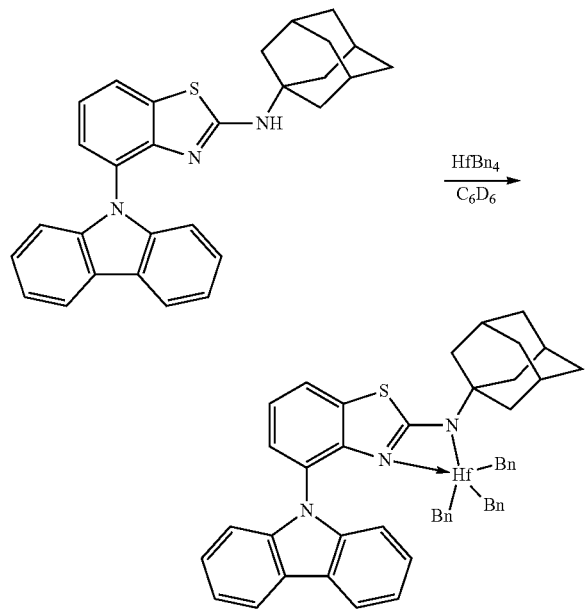

To a solution of tetrabenzylhafnium (11.9 mg, 0.02 mmol) in deuterated benzene (0.5 mL) was added a solution of N-(adamantan-1-yl)-4-(carbazol-9-yl)benzothiazol-2-amine (10.0 mg, 0.02 mmol) in deuterated benzene (0.5 mL) rinsing with deuterated benzene (2×0.25 mL). The reaction mixture was allowed to stir for 5 minutes upon which ¹H NMR indicated consumption of the starting ligand to the desired complex. The solution was concentrated to afford the zirconium complex as a yellow film (19 mg, 95%).

¹H NMR (400 MHz, C₆D₆) δ 8.04 (dt, J=7.6, 1.0 Hz, 2H), 7.20 (ddd, J=7.9, 6.1, 1.3 Hz, 3H), 7.16-7.10 (m, 5H), 7.07-6.99 (m, 5H), 6.97 (dd, J=7.8, 1.3 Hz, 1H), 6.84-6.74 (m, 4H), 6.64 (d, J=7.3 Hz, 6H), 1.90-1.81 (m, 3H), 1.73 (s, 6H), 1.49-1.39 (m, 12H). ¹³C NMR (101 MHz, C₆D₆) δ 171.86, 145.96, 143.38, 141.59, 132.32, 128.69, 128.15, 126.70, 125.99, 124.28, 122.88, 122.63, 121.03, 120.89, 120.58, 111.01, 91.75, 56.32, 40.29, 36.20, 29.95.

Example 80: Procatalyst 19

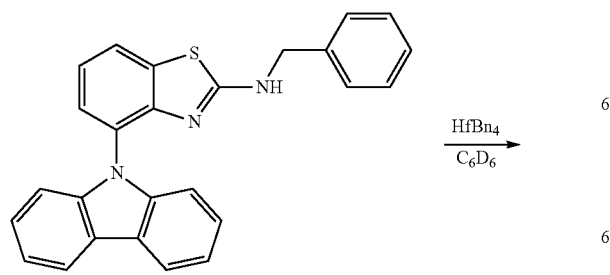

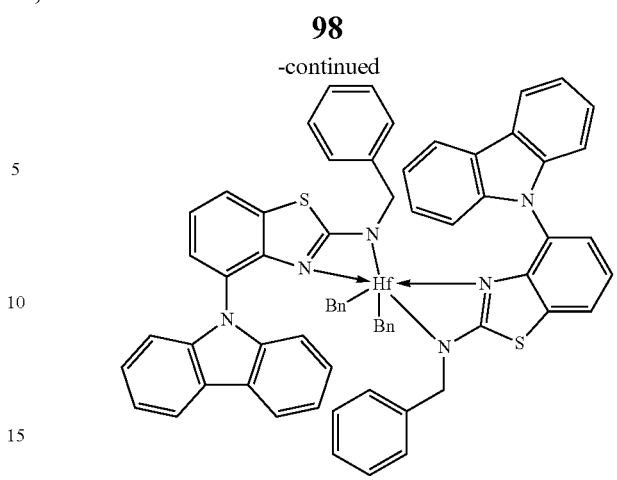

To a solution of tetrabenzylhafnium (13.2 mg, 0.02 mmol) in deuterated benzene (0.5 mL) was added a solution of N-benzyl-4-(carbazol-9-yl)benzothiazol-2-amine (20.0 mg, 0.05 mmol) in deuterated benzene (0.5 mL) rinsing with deuterated benzene (2×0.25 mL). The reaction mixture was allowed to stir for 5 minutes upon which ¹H NMR indicated consumption of the starting ligand to the desired complex. The solution was concentrated to afford the zirconium complex as a yellow film (27 mg, 89%).

¹H NMR (400 MHz, C₆D₆) δ 8.05 (d, J=7.6 Hz, 4H), 7.23-7.15 (m, 4H), 7.15-7.10 (m, 6H), 7.13-7.04 (m, 4H), 6.96 (t, J=7.7 Hz, 4H), 6.86 (dd, J=7.8, 1.3 Hz, 4H), 6.86-6.74 (m, 2H), 6.77-6.69 (m, 6H), 6.58-6.47 (m, 6H), 6.41 (dd, J=7.8, 1.3 Hz, 2H), 3.80 (d, J=15.5 Hz, 2H), 3.15 (d, J=15.6 Hz, 2H), 1.88 (d, J=12.4 Hz, 2H), 1.54 (d, J=11.0 Hz, 2H). ¹³C NMR (101 MHz, C₆D₆) δ 181.57, 147.99, 147.07, 143.68, 137.41, 130.60, 128.93, 128.85, 128.39, 127.47, 127.45, 126.78, 125.54, 121.84, 121.49, 121.32, 110.77, 84.64, 54.18.

Example 81: Procatalyst 20

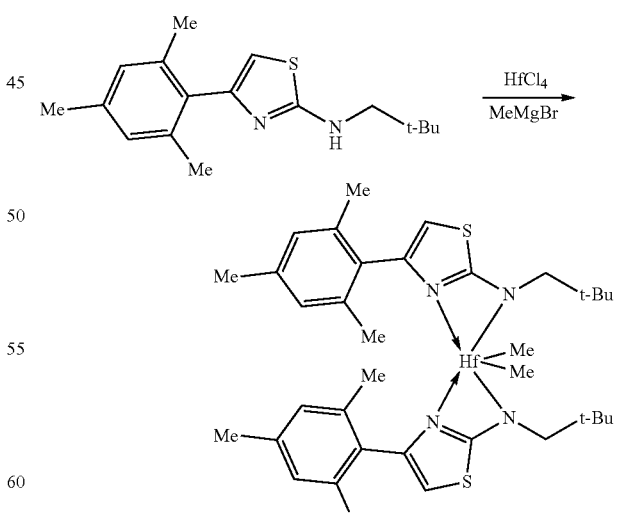

In a continuous purge nitrogen-filled glovebox, a 3 M solution of MeMgBr in diethyl ether (0.19 mL, 0.580 mmol, 4.4 equiv.) was added dropwise to a rapidly stirring, cold (−30° C.) suspension of HfCl₄ (42.2 mg, 0.132 mmol, 1 equiv.) in dichloromethane (5 mL). The reaction was allowed to stir for 2 minutes, then a cold (−30° C.) solution of 4-mesityl-N-neopentylthiazol-2-amine (76.0 mg, 0.264 mmol, 2 equiv.) in anhydrous deoxygenated dichloromethane (2.5 mL) was added dropwise. The 4-mesityl-N-neopentylthiazol-2-amine vial was rinsed with dichloromethane (2.5 mL), and this was added to the reaction. The clear solution with white precipitate was allowed to stir for 3 h, warming to room temperature. Over time, the solution slightly darkened in color. The suspension was filtered through a 0.45 µm syringe filter, and rinsed with dichloromethane (2×1 mL). The resultant pale yellow filtrate solution was concentrated in vacuo to yield a light brown solid (approximately 160 mg). The solid was suspended and triturated with hexane (10 mL), and filtered through a 0.45 µm syringe filter in line with a 0.2 µm syringe filter, and the filtrate solution was concentrated to afford the hafnium complex as a light yellow/brown solid (97.6 mg, 95% yield).

$^1$H NMR (400 MHz, C$_6$D$_6$) δ 6.71 (s, 4H), 5.23 (s, 2H), 2.87 (s, 4H), 2.09 (s, 12H), 2.08 (s, 6H), 0.86 (s, 18H), 0.42 (s, 6H). $^{13}$C NMR (101 MHz, Benzene-d$_6$) δ 182.79, 147.35, 137.34, 137.19, 131.06, 127.94, 98.43, 65.70, 54.24, 33.95, 27.70, 20.71, 20.05.

Example 82: Procatalyst 22

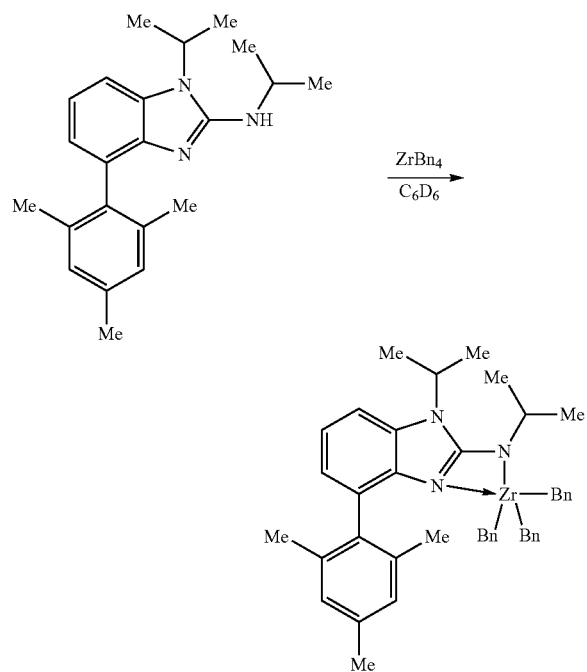

To a solution of tetrabenzylzirconium (9.2 mg, 0.02 mmol) in deuterated benzene (0.5 mL) was added a deuterated benzene solution of N,1-diisopropyl-4-mesitylbenzimidazol-2-amine (6.8 mg in 0.5 mL C$_6$D$_6$, 0.02 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the zirconium complex as a yellow film (14 mg, 99%).

$^1$H NMR (400 MHz, C$_6$D$_6$) δ 7.09 (t, J=7.7 Hz, 6H), 7.00 (d, J=1.5 Hz, 1H), 6.97 (t, J=7.6 Hz, 1H), 6.93-6.87 (m, 4H), 6.85 (s, 2H), 6.66-6.60 (m, 6H), 4.44 (hept, J=7.0 Hz, 1H), 3.80 (hept, J=6.5 Hz, 1H), 2.24 (s, 6H), 2.19 (s, 3H), 2.15 (s, 6H), 1.20 (d, J=6.9 Hz, 6H), 1.02 (d, J=6.4 Hz, 6H). $^{13}$C NMR (101 MHz, C$_6$D$_6$) δ 160.41, 144.28, 139.72, 137.60, 137.22, 136.48, 133.05, 129.61, 129.15, 128.01, 125.20, 122.59, 120.34, 110.27, 77.28, 49.64, 48.10, 25.01, 21.44, 21.20, 20.43.

Example 83: Procatalyst 21

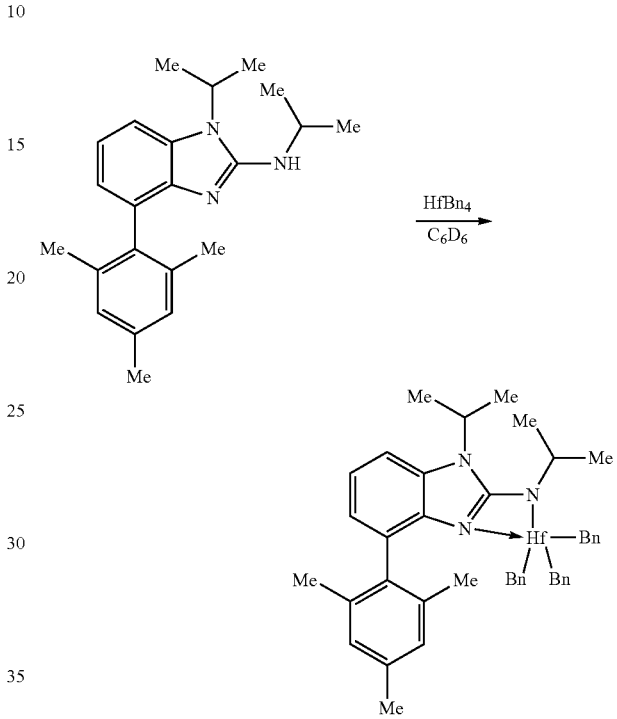

To a solution of tetrabenzylhafnium (11.2 mg, 0.02 mmol) in deuterated benzene (0.5 mL) was added a deuterated benzene solution of N,1-diisopropyl-4-mesitylbenzimidazol-2-amine in deuterated benzene (0.1 M, 0.209 mL, 0.02 mmol), rinsing with deuterated benzene (2×0.5 mL). The reaction mixture was allowed to stir for 5 minutes upon which $^1$H NMR indicated consumption of the starting ligand to the desired complex. The solution was concentrated to afford the zirconium complex as a yellow film (16 mg, 97%).

$^1$H NMR (400 MHz, C$_6$D$_6$) δ 7.13 (dd, J=8.0, 7.2 Hz, 6H), 6.99-6.96 (m, 2H), 6.90 (dd, J=5.8, 3.2 Hz, 1H), 6.89-6.84 (m, 5H), 6.82-6.78 (m, 6H), 4.33 (hept, J=7.0 Hz, 1H), 3.87 (hept, J=6.5 Hz, 1H), 2.20 (s, 3H), 2.18 (s, 6H), 2.11 (s, 6H), 1.13 (d, J=7.0 Hz, 6H), 0.89 (d, J=6.5 Hz, 6H). $^{13}$C NMR (101 MHz, C$_6$D$_6$) δ 159.26, 144.48, 139.42, 137.80, 137.07, 136.03, 132.81, 129.11, 128.83, 128.12, 125.11, 122.47, 120.52, 110.27, 87.84, 48.91, 48.11, 24.76, 21.44, 21.27, 20.31.

Example 84—Polymerization Reactions

Catalyst activity (in terms of quench time and polymer yield) and resulting polymer characteristics were assessed for Procatalysts 1-22. The polymerization reactions were carried out in a semi-batch reactor and parallel pressure reactor (PPR).

The reaction conditions for the results tabulated in Tables 1 and 2 are as follows: The polymerization reactions were carried out in a 2-L semi-batch reactor initially without diethyl zinc (DEZ), and then with three different loading of DEZ added (0, 50, and 200 μmol). The activator was [HNMe(C$_{18}$H$_{37}$)$_2$][B(C$_6$F$_5$)$_4$] in amounts of 1.2 molar equivalents, and each run was conducted for 10 minutes. The standard semi-batch reactor conditions of the results in Table 1 for polymerization reaction at 120° C. include 46 g ethylene and 303 g 1-octene in 611 g of IsoparE. The standard semi-batch reactor conditions of the results in Table 1 for polymerization reaction at 150° C. include 43 g ethylene and 303 g 1-octene in 547 g of IsoparE. Mol % Octene or C8/olefin is defined as: (moles 1-octene/(total moles 1-octene and ethylene))×100.

TABLE 1

Polymerization Results in Batch Reactor with Chain Transfer Reagent and one of Procatalysts 1 to 7.

| Catalyst | Cat. Amt (μmol) | DEZ Amount (μmol) | Reactor Temp (° C.) | Efficiency (g poly/g M) | M$_w$ (g/mol) | PDI | GPC 1-Octene (mol %) | T$_m$ (° C.) |
|---|---|---|---|---|---|---|---|---|
| Procat. 1 | 0.5 |  | 120 | 63869 | 433016 | 3.18 | 3.08 | 114.1 |
|  | 0.5 |  | 150 | 31374 | 275538 | 3.48 | 4.24 | 113.7 |
|  | 1 | 0 | 120 | 53224 | 352968 | 3.30 | 2.20 | 117.7 |
|  | 2 | 50 | 120 | 8964 | 65932 | 2.88 | 1.98 |  |
|  | 3 | 200 | 120 | 8030 | 24351 | 2.56 | 1.72 | 123.2 |
| Procat. 2 | 0.1 |  | 120 | 2049899 | 155553 | 10.44 | 3.52 | 113.3 |
|  | 0.1 |  | 150 | 153468 | 143179 | 9.63 | 4.12 | 91.1 |
|  | 0.4 | 0 | 150 | 95918 | 133896 | 7.95 | 3.51 | 113.5 |
|  | 0.4 | 50 | 150 | 87696 | 62827 | 5.20 | 4.01 | 112.6 |
|  | 0.4 | 200 | 150 | 84956 | 35515 | 4.61 | 4.30 | 114.9 |
| Procat. 3 | 0.1 |  | 120 | 33615 | 237255 | 6.57 | 21.18 | 45.6 |
|  | 0.3 |  | 150 | 9338 | 272175 | 15.55 | 8.91 | 112.2 |
|  | 1 | 0 | 120 | 30254 | 626351 | 10.29 | 4.52 | 92.4 |
|  | 1 | 50 | 120 | 6723 | 84409 | 4.07 | 5.73 | 98 |
|  | 3 | 200 | 120 | 7097 | 34031 | 3.57 | 4.56 | 98.2 |
|  | 0.6 | 0 | 150 | 19609 | 380015 | 11.41 | 4.19 | 93.7 |
|  | 1 | 50 | 150 | 11205 | 82756 | 4.98 | 4.15 | 101.9 |
|  | 1.5 | 200 | 150 | 7470 | 24491 | 3.64 | 3.15 | 103.8 |
| Procat. 4 | 0.1 |  | 120 | 460405 | 230576 | 3.17 | 4.74 | 102.2 |
|  | 0.15 |  | 150 | 515177 | 174019 | 3.90 | 3.49 | 120 |
|  | 0.3 | 0 | 120 | 73080 | 184025 | 2.93 | 3.18 | 99.7 |
|  | 0.5 | 50 | 120 | 43848 | 73385 | 3.20 | 2.76 | 122.5 |
|  | 0.8 | 200 | 120 | 49329 | 18677 | 4.37 | 2.09 | 123.2 |
| Procat. 5 | 0.3 |  | 120 | 44820 | 557133 | 3.28 | 5.50 | 99.2 |
|  | 0.6 |  | 150 | 80303 | 398810 | 2.86 | 4.20 | 91.8 |
|  | 1 | 0 | 120 | 22410 | 423483 | 3.29 | 3.20 | 118.8 |
|  | 1.75 | 50 | 120 | 14727 | 106737 | 3.28 | 1.70 | 125.5 |
|  | 2.5 | 200 | 120 | 13446 | 71574 | 4.66 | 1.60 | 126.9 |
| Procat. 6 | 0.3 |  | 120 | 855038 | 486757 | 2.65 | 4.66 | 122.1 |
|  | 0.15 |  | 150 | 668338 | 261151 | 4.97 | 4.36 | 120 |
|  | 0.15 | 0 | 120 | 124236 | 314580 | 2.60 | 4.85 | 86.1 |
|  | 0.25 | 50 | 120 | 48233 | 84282 | 4.85 | 3.87 | 124.3 |
|  | 0.6 | 200 | 120 | 67599 | 84361 | 8.26 | 3.98 | 122.8 |
| Procat. 7 | 0.5 |  | 120 | 76195 | 886457 | 2.69 | 3.39 | 84.6 |
|  | 0.5 |  | 150 | 71713 | 462872 | 3.67 | 5.41 | −58.9 |
|  | 0.6 | 0 | 120 | 28013 | 538129 | 3.17 | 4.07 | 84.5 |
|  | 0.8 | 50 | 120 | 9104 | 56393 | 4.41 | 4.85 | 122.5 |
|  | 1.5 | 200 | 120 | 7844 | 25990 | 4.73 | 3.82 | 121.8 |

TABLE 2

Polymerization Results in Batch Reactor with Chain Transfer Reagent and one of Procatalysts 8 to 14.

| Catalyst | Catalyst Amount (μmol) | DEZ Amount (μmol) | Reactor Temp (° C.) | Efficiency (g poly/g M) | M$_w$ (g/mol) | PDI | GPC 1-Octene (mol %) | T$_m$ (° C.) |
|---|---|---|---|---|---|---|---|---|
| Procat. 8 | 0.1 | 0 | 120 | 844076 | 485551 | 3.48 | 5.85 | 79.8 |
|  | 0.15 | 0 | 150 | 467713 | 319407 | 3.51 | 5.59 | 123.5 |
|  | 0.2 | 0 | 120 | 120582 | 419314 | 3.54 | 4.82 | 124.2 |
|  | 0.5 | 50 | 120 | 89889 | 192594 | 5.64 | 3.70 | 122.8 |
|  | 1 | 200 | 120 | 198413 | 229503 | 7.08 | 4.20 | 120.5 |
| Procat. 9 | 0.5 | 0 | 120 | 878481 | 906482 | 3.80 | 5.41 | 80.4 |
|  | 1 | 50 | 120 | 20729 | 123538 | 4.29 | 3.89 | 121.9 |
|  | 2 | 200 | 120 | 23531 | 112334 | 6.45 | 2.76 | 123.3 |
|  | 0.8 | 0 | 150 | 164575 | 672732 | 3.31 | 5.89 | 123.8 |
|  | 0.5 | 0 | 120 | 40338 | 684258 | 3.14 | 4.92 | 80.9 |

TABLE 2-continued

Polymerization Results in Batch Reactor with Chain Transfer Reagent and one of Procatalysts 8 to 14.

| Catalyst | Catalyst Amount (μmol) | DEZ Amount (μmol) | Reactor Temp (° C.) | Efficiency (g poly/g M) | $M_w$ (g/mol) | PDI | GPC 1-Octene (mol %) | $T_m$ (° C.) |
|---|---|---|---|---|---|---|---|---|
| Procat. 10 | 0.1 |  | 120 | 295975 | 478816 | 8.01 | 9.26 | 67.9 |
|  | 0.2 |  | 150 | 301456 | 326825 | 4.96 | 8.78 |  |
|  | 0.2 | 0 | 120 | 109620 | 335873 | 2.92 | 12.35 | 68.5 |
|  | 0.4 | 50 | 120 | 98658 | 127443 | 3.59 | 10.67 | 77.3 |
|  | 1 | 200 | 120 | 124967 | 134759 | 6.34 | 9.24 | 82 |
| Procat. 11 | 0.1 |  | 120 | 131544 | 441376 | 4.15 | 14.28 |  |
|  | 0.5 |  | 150 | 87400 | 650079 | 2.36 | 12.32 |  |
|  | 1 | 0 | 120 | 83478 | 1146247 | 2.75 | 13.51 |  |
|  | 1 | 50 | 120 | 27453 | 139543 | 3.70 | 10.00 |  |
|  | 1.25 | 200 | 120 | 14343 | 44357 | 5.31 | 9.74 |  |
| Procat. 12 | 0.5 |  | 120 | 473560 | 824038 | 4.27 | 10.60 | 69.8 |
|  | 0.5 |  | 150 | 306937 | 408578 | 4.01 | 8.37 | 76.1 |
|  | 0.5 | 0 | 120 | 122775 | 430856 | 3.35 | 11.07 | 73.1 |
|  | 1 | 50 | 120 | 107428 | 235250 | 4.57 | 10.04 | 76.1 |
|  | 1.5 | 200 | 120 | 92081 | 149390 | 6.56 | 9.35 | 79.7 |
| Procat. 13 | 0.1 |  | 120 | 179282 | 438543 | 6.86 | 16.72 |  |
|  | 0.5 |  | 150 | 100846 | 522347 | 3.37 | 11.22 |  |
|  | 0.4 | 0 | 120 | 63029 | 672833 | 2.90 | 11.81 |  |
|  | 0.8 | 50 | 120 | 39918 | 173718 | 3.74 | 11.88 |  |
|  | 1.1 | 200 | 120 | 31069 | 51564 | 3.62 | 11.41 |  |
| Procat. 14 | 0.5 |  | 120 | 71713 | 459075 | 3.25 | 3.79 | 123.3 |
|  | 0.8 |  | 150 | 46921 | 299504 | 3.58 | 3.68 | 120.1 |
|  | 1 | 0 | 120 | 22410 | 404548 | 3.23 | 2.78 | 117.5 |
|  | 1.5 | 50 | 120 | 11579 | 91705 | 3.74 | 1.88 | 124.9 |
|  | 2 | 200 | 120 | 8404 | 30524 | 3.84 | 1.66 | 125.3 |

TABLE 3

Polymerization Results in Batch Reactor with Chain Transfer Reagent and one of Procatalysts 15 to 22.

| Catalyst | Catalyst Amount (μmol) | DEZ Amount (μmol) | Reactor Temp (° C.) | Efficiency (g poly/g M) | $M_w$ (g/mol) | PDI | GPC 1-Octene (mol %) | $T_m$ (° C.) |
|---|---|---|---|---|---|---|---|---|
| Procat. 15 | 0.5 |  | 120 | 98605 | 183251 | 2.94 | 5.70 | 120.1 |
|  | 0.5 |  | 150 | 119895 | 115575 | 3.43 | 4.90 | 122 |
|  | 0.5 | 0 | 150 | 40338 | 105473 | 3.63 | 4.40 | 123.3 |
|  | 2 | 50 | 150 | 12886 | 47838 | 3.76 | 4.00 | 123.8 |
|  | 3 | 200 | 150 | 1868 | 24549 | 5.88 |  | 123.7 |
| Procat. 16 | 0.5 |  | 120 | 164715 | 341775 | 3.87 | 2.00 | 123.6 |
|  | 0.5 |  | 150 | 49302 | 180533 | 3.74 | 2.40 | 121.6 |
|  | 1 | 0 | 120 | 127738 | 227170 | 2.95 | 0.70 | 127.1 |
|  | 1 | 50 | 120 | 21850 | 56615 | 2.34 | 0.60 | 126.4 |
|  | 2 | 200 | 120 | 20729 | 29712 | 2.04 | 0.90 | 126.3 |
| Procat. 17 | 0.2 |  | 120 | 416557 | 114221 | 4.94 | 10.70 | 118.6 |
|  | 0.4 |  | 150 | 276791 | 98487 | 4.15 | 5.60 |  |
|  | 0.3 | 0 | 120 | 58464 | 103661 | 4.64 | 5.60 | 116.5 |
|  | 0.6 | 50 | 120 | 32886 | 33183 | 4.97 | 3.90 | 120.4 |
|  | 1.5 | 200 | 120 | 51156 | 27937 | 4.81 | 4.50 | 120.6 |
| Procat. 18 | 5 |  | 120 | 2017 | 167623 | 3.04 | 10.30 | 51.4 |
| Procat. 19 | 4 |  | 120 | 14427 | 178941 | 2.49 | 0.50 | 127 |
|  | 5 |  | 150 | 13110 | 138986 | 3.08 | 0.70 | 123.9 |
|  | 4 | 0 | 150 | 6163 | 121707 | 3.36 | 0.60 | 125.2 |
|  | 4 | 50 | 150 | 8824 | 67485 | 2.94 |  | 124.8 |
|  | 5 | 200 | 150 | 7844 | 32375 | 2.52 | 0.90 | 125.2 |
| Procat. 20 | 0.5 |  | 150 | 29133 | 89,161 | 2.47 | 1 | 119.6 |
|  | 0.6 | 0 | 150 | 13073 | 75,840 | 2.43 | 1.3 | 121.3 |
|  | 0.7 | 50 | 150 | 12005 | 17,728 | 1.97 | 1.2 | 123.2 |
|  | 0.8 | 200 | 150 | 8404 | 5,520 | 2.37 | 2.2 | 122.2 |
| Procat. 21 | 0.25 | 0 | 120 | 156872 | 915038 | 11.77 | 5.42 | 110.7 |
|  | 0.5 | 0 | 150 | 157992 | 550441 | 24.17 | 5.15 | 114.7 |
|  | 0.5 | 0 | 120 | 69472 | 920559 | 16.88 | 5.30 | 111.4 |
|  | 1 | 50 | 120 | 69472 | 139343 | 3.37 | 4.94 | 115.3 |
|  | 1.5 | 200 | 120 | 33615 | 30739 | 2.46 | 4.57 | 117.8 |

TABLE 3-continued

Polymerization Results in Batch Reactor with Chain Transfer Reagent and one of Procatalysts 15 to 22.

| Catalyst | Catalyst Amount (µmol) | DEZ Amount (µmol) | Reactor Temp (° C.) | Efficiency (g poly/g M) | $M_w$ (g/mol) | PDI | GPC 1-Octene (mol %) | $T_m$ (° C.) |
|---|---|---|---|---|---|---|---|---|
| Procat. 22 | 0.25 |  | 120 | 898886 | 860464 | 8.01 | 7.31 | 102.6 |
|  | 0.2 |  | 150 | 98658 | 301006 | 25.86 | 5.19 | 111.5 |
|  | 0.25 | 0 | 120 | 127160 | 477680 | 15.22 | 5.59 | 109 |
|  | 0.5 | 50 | 120 | 61387 | 49866 | 8.06 | 3.65 | 114.6 |
|  | 1 | 200 | 120 | 139218 | 53520 | 2.82 | 5.61 | 112.5 |

The PPR polymerization experiments were conducted at both 120° C. and 150° C. using [HNMe($C_{18}H_{37}$)$_2$][B($C_6F_5$)$_4$] as the activator in amounts of 1.5 molar equivalents in relation to the procatalyst, and MMAO-3 (500 nmoles at 120° C. or 750 nmoles at 150° C.) was employed as the scavenger.

TABLE 4

Polymerization Data from PPR Experiments

| Ligand Name | Ligands:Metal Molar Ratio | Metal | Catalyst (µmol) | Yield (mg) | Quench Time (s) | Mw | PDI | Mol % Octene |
|---|---|---|---|---|---|---|---|---|
| Ligand 1 | 1 | Hf(Bn)$_4$ | 0.1 | 142 | 66 | 227,955 | 5.0 | 3.63 |
|  | 2 | Hf(Bn)$_4$ | 0.1 | 211 | 48 | 143,243 | 5.5 | 2.64 |
|  | 1 | Zr(Bn)$_4$ | 0.1 | 180 | 42 | 182,535 | 9.1 | 4.60 |
|  | 2 | Zr(Bn)$_4$ | 0.1 | 211 | 37 | 133,125 | 6.6 | 3.48 |
| Ligand 19 | 1 | Hf(Bn)$_4$ | 0.1 | 84 | 560 | 157,219 | 4.1 | 0.95 |
|  | 2 | Hf(Bn)$_4$ | 0.1 | 158 | 115 | 130,449 | 3.3 | 0.48 |
|  | 1 | Zr(Bn)$_4$ | 0.1 | 81 | 524 | 223,887 | 29.3 | 1.53 |
|  | 2 | Zr(Bn)$_4$ | 0.1 | 107 | 90 | 54,846 | 3.2 | 0.31 |
| Ligand 13 | 1 | Hf(Bn)$_4$ | 0.1 | 56 | 1802 | 120,122 | 4.6 | 1.47 |
|  | 2 | Hf(Bn)$_4$ | 0.1 | 110 | 305 | 105,286 | 3.6 | 0.83 |
|  | 1 | Zr(Bn)$_4$ | 0.1 | 65 | 777 | 256,460 | 17.3 | 1.18 |
|  | 2 | Zr(Bn)$_4$ | 0.1 | 78 | 256 | 54,648 | 6.6 | 0.94 |
| Ligand 16 | 1 | Hf(Bn)$_4$ | 0.1 | 78 | 1802 | 174,855 | 5.1 | 1.13 |
|  | 2 | Hf(Bn)$_4$ | 0.1 | 151 | 517 | 194,201 | 8.0 | 0.24 |
|  | 1 | Zr(Bn)$_4$ | 0.1 | 84 | 562 | 214,306 | 35.5 | 1.61 |
|  | 2 | Zr(Bn)$_4$ | 0.1 | 90 | 520 | 159,647 | 34.8 | 4.25 |
| Ligand 15 | 1 | Hf(Bn)$_4$ | 0.1 | 100 | 1198 | 330,410 | 7.0 | 1.93 |
|  | 2 | Hf(Bn)$_4$ | 0.1 | 122 | 554 | 324,256 | 6.9 | 2.04 |
|  | 1 | Zr(Bn)$_4$ | 0.1 | 63 | 588 | 274,155 | 24.9 | 1.98 |
|  | 2 | Zr(Bn)$_4$ | 0.1 | 87 | 387 | 149,366 | 18.9 | 2.77 |
| Ligand 22 | 1 | Hf(Bn)$_4$ | 0.1 | 313 | 96 | 259,536 | 7.4 | 18.56 |
|  | 2 | Hf(Bn)$_4$ | 0.1 | 262 | 85 | 485,249 | 26.9 | 15.74 |
|  | 1 | Zr(Bn)$_4$ | 0.1 | 237 | 103 | 231,341 | 28.4 | 13.16 |
|  | 2 | Zr(Bn)$_4$ | 0.1 | 192 | 92 | 317,578 | 39.5 | 10.38 |
| Ligand 20 | 1 | Hf(Bn)$_4$ | 0.1 | 33 | 1801 | 135,657 | 13.5 | 3.59 |
|  | 2 | Hf(Bn)$_4$ | 0.1 | 38 | 1801 | 111,774 | 25.7 | 2.92 |
|  | 1 | Zr(Bn)$_4$ | 0.1 | 73 | 774 | 202,661 | 28.6 | 1.69 |
|  | 2 | Zr(Bn)$_4$ | 0.1 | 59 | 1801 | 154,800 | 16.9 | 1.24 |
| Ligand 11 | 1 | Hf(Bn)$_4$ | 0.1 | 222 | 54 | 89,465 | 8.0 | 7.65 |
|  | 2 | Hf(Bn)$_4$ | 0.1 | 247 | 69 | 92,891 | 9.8 | 9.86 |
|  | 1 | Zr(Bn)$_4$ | 0.1 | 139 | 41 | 40,817 | 5.0 | 4.17 |
|  | 2 | Zr(Bn)$_4$ | 0.1 | 122 | 54 | 45,387 | 5.4 | 3.38 |
| Ligand 17 | 1 | Hf(Bn)$_4$ | 0.1 | 128 | 932 | 157,499 | 4.1 | 9.68 |
|  | 2 | Hf(Bn)$_4$ | 0.1 | 132 | 778 | 413,453 | 9.5 | 4.48 |
|  | 1 | Zr(Bn)$_4$ | 0.1 | 105 | 771 | 72,072 | 22.1 | 10.26 |
|  | 2 | Zr(Bn)$_4$ | 0.1 | 86 | 990 | 358,908 | 49.9 | 4.23 |
| Ligand 18 | 1 | Hf(Bn)$_4$ | 0.1 | 136 | 761 | 164,282 | 3.9 | 9.81 |
|  | 2 | Hf(Bn)$_4$ | 0.1 | 118 | 753 | 232,644 | 3.7 | 9.72 |
|  | 1 | Zr(Bn)$_4$ | 0.1 | 115 | 960 | 47,310 | 11.9 | 11.39 |
|  | 2 | Zr(Bn)$_4$ | 0.1 | 92 | 1544 | 377,585 | 54.4 | 5.68 |
| Ligand 7 | 1 | Hf(Bn)$_4$ | 0.1 | 399 | 63 | 271,532 | 4.7 | 20.65 |
|  | 2 | Hf(Bn)$_4$ | 0.1 | 356 | 70 | 202,483 | 9.9 | 16.19 |
|  | 1 | Zr(Bn)$_4$ | 0.1 | 279 | 50 | 196,025 | 9.2 | 19.47 |
|  | 2 | Zr(Bn)$_4$ | 0.1 | 264 | 55 | 196,341 | 9.6 | 12.81 |
| Ligand 5 | 1 | Hf(Bn)$_4$ | 0.1 | 284 | 42 | 303,411 | 5.8 | 16.52 |
|  | 2 | Hf(Bn)$_4$ | 0.1 | 327 | 38 | 263,151 | 14.2 | 16.13 |
|  | 1 | Zr(Bn)$_4$ | 0.1 | 242 | 34 | 202,065 | 5.9 | 12.31 |
|  | 2 | Zr(Bn)$_4$ | 0.1 | 266 | 33 | 151,039 | 8.0 | 10.71 |
| Ligand 9 | 1 | Hf(Bn)$_4$ | 0.1 | 163 | 60 | 146,616 | 6.5 | 2.97 |
|  | 2 | Hf(Bn)$_4$ | 0.1 | 222 | 36 | 58,986 | 3.9 | 4.22 |
|  | 1 | Zr(Bn)$_4$ | 0.1 | 175 | 34 | 104,198 | 6.2 | 4.25 |
|  | 2 | Zr(Bn)$_4$ | 0.1 | 221 | 22 | 44,630 | 5.5 | 4.11 |

TABLE 4-continued

Polymerization Data from PPR Experiments

| Ligand Name | Ligands:Metal Molar Ratio | Metal | Catalyst (μmol) | Yield (mg) | Quench Time (s) | Mw | PDI | Mol % Octene |
|---|---|---|---|---|---|---|---|---|
| Ligand 6 | 1 | Hf(Bn)$_4$ | 0.1 | 388 | 49 | 234,919 | 7.8 | 17.35 |
| | 2 | Hf(Bn)$_4$ | 0.1 | 496 | 59 | 250,367 | 10.6 | 15.96 |
| | 1 | Zr(Bn)$_4$ | 0.1 | 277 | 48 | 161,621 | 9.3 | 14.84 |
| | 2 | Zr(Bn)$_4$ | 0.1 | 268 | 43 | 174,028 | 12.9 | 13.80 |
| Ligand 8 | 1 | Hf(Bn)$_4$ | 0.1 | 122 | 67 | 196,247 | 4.3 | 3.38 |
| | 2 | Hf(Bn)$_4$ | 0.1 | 218 | 41 | 114,142 | 5.6 | 5.31 |
| | 1 | Zr(Bn)$_4$ | 0.1 | 142 | 68 | 163,839 | 8.0 | 4.54 |
| | 2 | Zr(Bn)$_4$ | 0.1 | 215 | 22 | 70,454 | 4.3 | 3.64 |
| Ligand 21 | 1 | Hf(Bn)$_4$ | 0.1 | 101 | 428 | 45,390 | 5.2 | 2.49 |
| | 2 | Hf(Bn)$_4$ | 0.1 | 117 | 384 | 45,620 | 6.9 | 2.55 |
| | 1 | Zr(Bn)$_4$ | 0.1 | 85 | 180 | 110,583 | 18.1 | 0.95 |
| | 2 | Zr(Bn)$_4$ | 0.1 | 84 | 215 | 97,460 | 13.1 | 0.68 |
| Ligand 12 | 1 | Hf(Bn)$_4$ | 0.1 | 294 | 45 | 82,744 | 17.3 | 8.25 |
| | 2 | Hf(Bn)$_4$ | 0.1 | 345 | 58 | 73,784 | 33.4 | 8.75 |
| | 1 | Zr(Bn)$_4$ | 0.1 | 228 | 22 | 51,109 | 12.6 | 4.83 |
| | 2 | Zr(Bn)$_4$ | 0.1 | 258 | 28 | 47,954 | 14.8 | 5.21 |
| Ligand 3 | 1 | Hf(Bn)$_4$ | 0.1 | 186 | 50 | 231,414 | 9.8 | 4.51 |
| | 2 | Hf(Bn)$_4$ | 0.1 | 211 | 41 | 105,564 | 6.8 | 1.79 |
| | 1 | Zr(Bn)$_4$ | 0.1 | 200 | 40 | 127,566 | 6.1 | 5.35 |
| | 2 | Zr(Bn)$_4$ | 0.1 | 179 | 23 | 48,076 | 5.3 | 2.02 |
| Ligand 4 | 1 | Hf(Bn)$_4$ | 0.1 | 299 | 44 | 238,076 | 9.4 | 12.27 |
| | 2 | Hf(Bn)$_4$ | 0.1 | 278 | 53 | 226,108 | 14.5 | 8.71 |
| | 1 | Zr(Bn)$_4$ | 0.1 | 254 | 36 | 165,538 | 6.3 | 10.58 |
| | 2 | Zr(Bn)$_4$ | 0.1 | 234 | 31 | 122,656 | 6.4 | 6.50 |
| Ligand 10 | 1 | Hf(Bn)$_4$ | 0.1 | 223 | 50 | 205,510 | 8.3 | 5.36 |
| | 2 | Hf(Bn)$_4$ | 0.1 | 217 | 53 | 111,779 | 4.0 | 1.86 |
| | 1 | Zr(Bn)$_4$ | 0.1 | 218 | 44 | 98,714 | 7.0 | 6.52 |
| | 2 | Zr(Bn)$_4$ | 0.1 | 209 | 29 | 61,510 | 4.3 | 2.99 |
| Ligand 14 | 1 | Hf(Bn)$_4$ | 0.1 | 119 | 738 | 223,553 | 9.0 | 4.54 |
| | 2 | Hf(Bn)$_4$ | 0.1 | 115 | 522 | 227,751 | 7.3 | 1.23 |
| | 1 | Zr(Bn)$_4$ | 0.1 | 86 | 501 | 126,605 | 50.3 | 3.49 |
| | 2 | Zr(Bn)$_4$ | 0.1 | 74 | 645 | 99,934 | 23.8 | 2.23 |
| Ligand 32 | 1 | Hf(Bn)$_4$ | 0.1 | 254 | 36 | 78,910 | 8.9 | 6.67 |
| | 2 | Hf(Bn)$_4$ | 0.1 | 223 | 69 | 80,709 | 8.9 | 5.03 |
| | 1 | Zr(Bn)$_4$ | 0.1 | 227 | 26 | 54,673 | 9.9 | 5.44 |
| | 2 | Zr(Bn)$_4$ | 0.1 | 201 | 44 | 75,301 | 9.4 | 3.86 |
| Ligand 31 | 1 | Hf(Bn)$_4$ | 0.1 | 226 | 67 | 362,234 | 22.6 | 6.26 |
| | 2 | Hf(Bn)$_4$ | 0.1 | 113 | 502 | 201,219 | 20.8 | 0.40 |
| | 1 | Zr(Bn)$_4$ | 0.1 | 219 | 58 | 225,525 | 18.0 | 5.10 |
| | 2 | Zr(Bn)$_4$ | 0.1 | 176 | 83 | 276,120 | 20.9 | 1.93 |
| Ligand 29 | 1 | Hf(Bn)$_4$ | 0.1 | 212 | 59 | 344,251 | 14.7 | 10.51 |
| | 2 | Hf(Bn)$_4$ | 0.1 | 106 | 176 | 290,773 | 27.2 | 4.85 |
| | 1 | Zr(Bn)$_4$ | 0.1 | 127 | 172 | 279,261 | 21.9 | 7.03 |
| | 2 | Zr(Bn)$_4$ | 0.1 | 97 | 280 | 173,716 | 19.2 | 2.83 |
| Ligand 28 | 1 | Hf(Bn)$_4$ | 0.1 | 112 | 147 | 271,835 | 7.9 | 6.93 |
| | 2 | Hf(Bn)$_4$ | 0.1 | 150 | 82 | 149,386 | 12.7 | 3.79 |
| | 1 | Zr(Bn)$_4$ | 0.1 | 139 | 133 | 316,766 | 18.6 | 6.23 |
| | 2 | Zr(Bn)$_4$ | 0.1 | 167 | 72 | 251,447 | 16.5 | 6.43 |
| Ligand 25 | 1 | Hf(Bn)$_4$ | 0.1 | 107 | 183 | 204,041 | 8.4 | 3.63 |
| | 2 | Hf(Bn)$_4$ | 0.1 | 96 | 243 | 69,657 | 4.8 | 1.55 |
| | 1 | Zr(Bn)$_4$ | 0.1 | 138 | 103 | 220,331 | 14.7 | 3.54 |
| | 2 | Zr(Bn)$_4$ | 0.1 | 136 | 96 | 184,375 | 15.2 | 2.76 |
| Ligand 26 | 1 | Hf(Bn)$_4$ | 0.1 | 117 | 134 | 244,162 | 8.1 | 4.58 |
| | 2 | Hf(Bn)$_4$ | 0.1 | 94 | 528 | 200,158 | 12.9 | 3.38 |
| | 1 | Zr(Bn)$_4$ | 0.1 | 157 | 74 | 122,263 | 12.2 | 6.61 |
| | 2 | Zr(Bn)$_4$ | 0.1 | 118 | 124 | 120,438 | 10.8 | 3.82 |
| Ligand 34 | 1 | Hf(Bn)$_4$ | 0.1 | 146 | 124 | 167,145 | 8.0 | 5.45 |
| | 2 | Hf(Bn)$_4$ | 0.1 | 130 | 145 | 127,273 | 6.8 | 1.44 |
| | 1 | Zr(Bn)$_4$ | 0.1 | 130 | 156 | 148,704 | 11.4 | 3.80 |
| | 2 | Zr(Bn)$_4$ | 0.1 | 122 | 131 | 95,399 | 6.5 | 0.57 |
| Ligand 33 | 1 | Hf(Bn)$_4$ | 0.1 | 146 | 122 | 217,369 | 6.2 | 6.54 |
| | 2 | Hf(Bn)$_4$ | 0.1 | 172 | 87 | 102,180 | 5.7 | 2.03 |
| | 1 | Zr(Bn)$_4$ | 0.1 | 121 | 259 | 217,474 | 13.5 | 8.17 |
| | 2 | Zr(Bn)$_4$ | 0.1 | 93 | 318 | 211,303 | 14.8 | 4.04 |
| Ligand 27 | 1 | Hf(Bn)$_4$ | 0.1 | 263 | 41 | 309,859 | 15.7 | 18.27 |
| | 2 | Hf(Bn)$_4$ | 0.1 | 211 | 58 | 288,733 | 49.8 | 7.28 |
| | 1 | Zr(Bn)$_4$ | 0.1 | 233 | 49 | 254,718 | 11.7 | 15.47 |
| | 2 | Zr(Bn)$_4$ | 0.1 | 207 | 51 | 208,322 | 21.1 | 7.92 |
| Ligand 30 | 1 | Hf(Bn)$_4$ | 0.1 | 330 | 42 | 274,376 | 15.0 | 17.57 |
| | 2 | Hf(Bn)$_4$ | 0.1 | 166 | 97 | 396,500 | 25.1 | 10.91 |
| | 1 | Zr(Bn)$_4$ | 0.1 | 166 | 131 | 263,844 | 22.0 | 11.67 |
| | 2 | Zr(Bn)$_4$ | 0.1 | 149 | 125 | 206,866 | 24.6 | 6.37 |

TABLE 4-continued

Polymerization Data from PPR Experiments

| Ligand Name | Ligands:Metal Molar Ratio | Metal | Catalyst (μmol) | Yield (mg) | Quench Time (s) | Mw | PDI | Mol % Octene |
|---|---|---|---|---|---|---|---|---|
| Ligand 2 | 1 | Hf(Bn)$_4$ | 0.1 | 290 | 34 | 266,171 | 6.3 | 13.00 |
|  | 2 | Hf(Bn)$_4$ | 0.1 | 282 | 54 | 326,040 | 16 | 9.60 |
|  | 1 | Zr(Bn)$_4$ | 0.1 | 246 | 30 | 135,710 | 6.7 | 9.80 |
|  | 2 | Zr(Bn)$_4$ | 0.1 | 231 | 29 | 122,890 | 10.5 | 7.90 |
| Ligand 23 | 1 | Hf(Bn)$_4$ | 0.1 | 122 | 279 | 124,583 | 3.3 | 2.00 |
|  | 2 | Hf(Bn)$_4$ | 0.1 | 150 | 140 | 97,511 | 2.3 | 0.90 |
|  | 1 | Zr(Bn)$_4$ | 0.1 | 159 | 91 | 139,404 | 10.4 | 4.10 |
|  | 2 | Zr(Bn)$_4$ | 0.1 | 168 | 39 | 39,107 | 2.7 |  |
| Ligand 24 | 1 | Hf(Bn)$_4$ | 0.1 | 38 | 1800 | 241,035 | 11.8 | 3.10 |
|  | 2 | Hf(Bn)$_4$ | 0.1 | 77 | 288 | 104,912 | 3.0 | 2.40 |
|  | 1 | Zr(Bn)$_4$ | 0.1 | 119 | 193 | 300,890 | 24.7 | 3.40 |
|  | 2 | Zr(Bn)$_4$ | 0.1 | 101 | 257 | 285,806 | 14.2 | 2.60 |

TABLE 5

Chain Transfer Constants from Semi-Batch Reactor Experiments with Et$_2$Zn

| Procatalyst No. | Temp. (° C.) | Chain Transfer Constant (Ca) | PDI with no DEZ | PDI with 50 μmoles DEZ | PDI with 200 μmoles DEZ |
|---|---|---|---|---|---|
| Procat. 2 | 150 | 2.27 | 7.95 | 5.2 | 4.61 |
| Procat. 4 | 120 | 3.55 | 2.93 | 3.2 | 4.37 |
| Procat. 13 | 120 | 2.26 | 2.9 | 3.74 | 3.62 |
| Procat. 19 | 150 | 1.58 | 3.36 | 2.94 | 2.52 |
| Procat. 14 | 120 | 3.74 | 3.23 | 3.74 | 3.84 |
| Procat. 3 | 120 | 3.56 | 10.29 | 4.07 | 3.57 |
| Procat. 3 | 150 | 3.55 | 11.41 | 4.98 | 3.64 |
| Procat. 7 | 120 | 5.22 | 3.17 | 4.41 | 4.73 |
| Procat. 17 | 120 | 9.12 | 4.64 | 4.97 | 4.81 |
| Procat. 1 | 120 | 3.78 | 3.3 | 2.88 | 2.56 |
| Procat. 5 | 120 | 2.46 | 3.29 | 3.28 | 4.66 |
| Procat. 16 | 120 | 2.7 | 2.95 | 2.34 | 2.04 |
| Procat. 21 | 120 | 1.16 | 16.88 | 3.37 | 2.46 |

The high chain transfer constants Ca, of greater than or equal 0.6 for the procatalysts recorded in Table 5 indicates that these procatalysts have a high sensitivity to chain transfer agents and rapidly undergo chain transfer with these chain transfers agents. Overall, either a decrease in or a relative sustained narrow PDI is observed for these procatalysts as the amount of Et$_2$Zn (DEZ) is increased; evidence that these specific procatalysts may undergo reversible chain transfer with a CSA as opposed to irreversible chain transfer.

To determine whether the nitrogen atom or the sulfur atom of ligand of Procatalyst 2, Procatalyst 3, and Procatalyst 11 complexed with the metal, a computational study was preformed. The geometries of Procatalyst-2, Procatalyst-3 and Procatalyst-11 in two different configurations (N-atom bound to metal (Configuration-1) or S-atom bound to metal (Configuration-2)) were optimized using restricted (closed shell) hybrid Density Functional Theory (DFT), Becke, 3-parameter, Lee-Yang-Parr (B3LYP) (see. Becke, A. D. *J. Chem. Phys.* 1993, 98, 5648; Lee, C. et al., *Phys. Rev B* 1988, 37, 785; and Miehlich, B. et al. *Chem. Phys. Lett.* 1989, 157, 200) and the 6-31G* basis set. Lanl2dz was used as an effective core potential for the metal atoms (Zr/Hf). The minimum of the ground-state potential energy surface (PES) was verified by the lack of imaginary frequency in the optimized ground-state conformation. The energy of the optimized configuration was further evaluated using a higher basis set (6-311+g**) on all the atoms, except the metal atom. All the above calculations were performed using G16 suite of programs, and the results recorded in Table 6.

TABLE 6

Computational Results

| Procatalyst | Metal | Configuration-1 (Binding with N-donor) | Configuration-2 (Binding with S-donor) |
|---|---|---|---|
| Procatalyst 3 | Hf | — | 13.0 |
| Procatalyst 2 | Zr | — | 12.2 |
| Procatalyst 11 | Hr | — | 11.3 |

Based of the above methodology, configuration-1 (N-bound to metal) was had a greater stability when compared to configuration-2 (S-bound to metal), irrespective of the choice of the procatalysts and the metal

The invention claimed is:

1. A catalyst system comprising a metal-ligand complex having a structure according to formula (I):

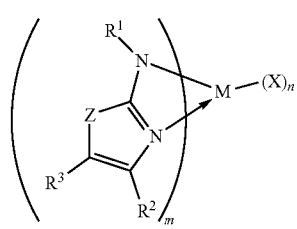

(I)

where:
M is a metal chosen from titanium, zirconium, or hafnium, the metal having a formal oxidation state of +2, +3, or +4;
each X is a monodentate or bidentate ligand independently chosen from unsaturated ($C_2$-$C_{50}$) hydrocarbon, unsaturated ($C_2$-$C_{50}$) heterohydrocarbon, ($C_1$-$C_{50}$) hydrocarbyl, ($C_6$-$C_{50}$) aryl, ($C_6$-$C_{50}$) heteroaryl, cyclopentadienyl, substituted cyclopentadienyl, ($C_4$-$C_{12}$) diene, halogen, —N($R^N$)2, or —NCOR$^C$;
m is 1 or 2;
n is 2 or 3, provided m+n=4;
each Z is NR$^N$ or S, wherein R$^N$ is ($C_1$-$C_{40}$) hydrocarbyl or ($C_1$-$C_{40}$) heterohydrocarbyl;
each R$^1$ is ($C_1$-$C_{40}$) hydrocarbyl, ($C_1$-$C_{40}$) heterohydrocarbyl, or trimethylsilyl methyl;
each R$^2$ and R$^3$ is independently selected from the group consisting of ($C_1$-$C_{50}$) hydrocarbyl, ($C_1$-$C_{50}$) heterohydrocarbyl, ($C_6$-$C_{50}$) aryl, ($C_4$-$C_{50}$) heteroaryl, —Si(R$^C$)$_3$, halogen, and —H, wherein R$^C$ is independently selected from the group consisting of (C$_1$-C$_{20}$) hydrocarbyl, (C$_1$-C$_{20}$) heterohydrocarbyl, and —H; and optionally, R$^2$ and R$^3$ are covalently linked to form a ring.

2. The catalyst system of claim 1, wherein R$^3$ is (2,4,6-triisopropyl) phenyl, 2,4,6-trimethylphenyl, 3,5-di-tert butylphenyl, naphthyl, carbazolyl, or cyclopropyl.

3. The catalyst system of claim 1, wherein R$^2$ and R$^3$ are covalently linked to form an aromatic ring, and the metal-ligand complex has a structure according to formula (II):

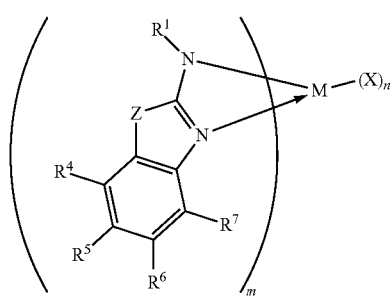

(II)

where each R$^1$, Z, X, n, m, and M are defined as in formula (I); and each R$^4$, R$^5$, R$^6$, and R$^7$ are independently (C$_1$-C$_{40}$) hydrocarbyl or (C$_1$-C$_{40}$) heterohydrocarbyl.

4. The catalyst system of claim 3, wherein each R$^7$ is (C$_6$-C$_{40}$) aryl or (C$_6$-C$_{40}$) heteroaryl.

5. The catalyst system of claim 3, wherein each R$^7$ is phenyl, (2,4,6-triisopropyl) phenyl, 2,4,6-trimethylphenyl, 3,5-di-tert-butylphenyl, naphthyl, carbazolyl, or cyclopropyl.

6. The catalyst system of claim 1, wherein each Z is NR$^N$, where R$^N$ is (C$_1$-C$_8$) alkyl.

7. The catalyst system of claim 1, wherein each Z is S.

8. The catalyst system of claim 1, wherein m is 2.

9. The catalyst system of claim 1, wherein m is 1.

10. The catalyst system of claim 1, wherein the metal-ligand complex has a structure according to formula (Ia), formula (Ib), formula (Ic), or formula (Id):

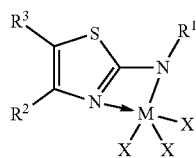

(Ia)

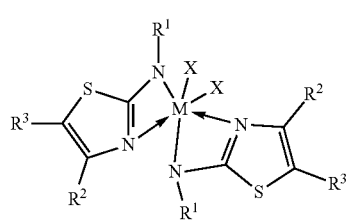

(Ib)

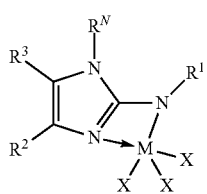

(Ic)

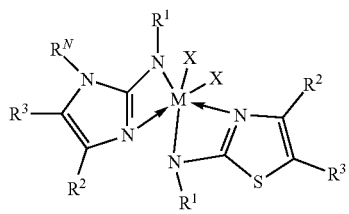

(Id)

where each R$^1$, R$^2$, R$^3$, R$^N$, X, and M are as defined in formula (I).

11. The catalyst system of claim 3, wherein the metal-ligand complex has a structure according to formula (IIa), formula (IIb), formula (IIc), or formula (IId):

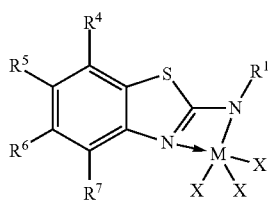

(IIa)

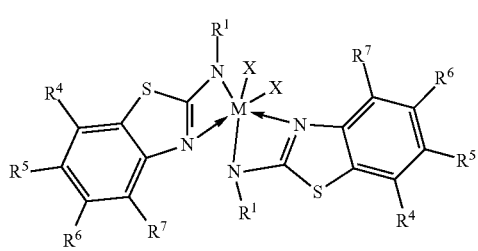

(IIb)

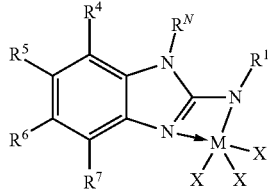

(IIc)

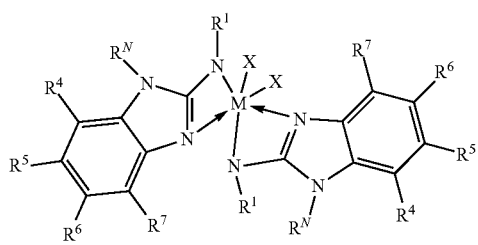

(IId)

where each R$^1$, R$^4$, R$^5$, R$^6$, R$^7$, R$^N$, X, and M are as defined in formula (II).

12. The catalyst system of claim 1, wherein each $R^1$ is chosen from a linear $(C_1-C_{12})$ alkyl, branched $(C_1-C_{12})$ alkyl, $(C_1-C_{12})$ cycloalkyl, trimethylsilyl methyl, benzyl, or 1-adamantyl.

13. The catalyst system of claim 1, wherein each X is independently benzyl, phenyl, or chloro.

14. The catalyst system of claim 1, further comprising a chain transfer agent and an activator mixed in solution with one or more metal-ligand complexes according to formula (I).

15. A polymerization process comprising:
polymerizing ethylene and one or more olefins in the presence of a catalyst system under olefin polymerization conditions to form an ethylene-based polymer, the catalyst system comprising a metal-ligand complex according to formula (I):

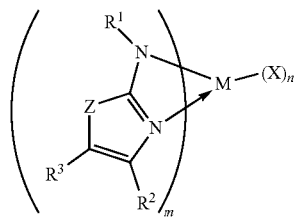

(I)

where:
M is a metal chosen from titanium, zirconium, or hafnium, the metal having a formal oxidation state of +2, +3, or +4;

each X is a monodentate or bidentate ligand independently chosen from unsaturated $(C_2-C_{50})$ hydrocarbon, unsaturated $(C_2-C_{50})$ heterohydrocarbon, $(C_1-C_{50})$ hydrocarbyl, $(C_6-C_{50})$ aryl, $(C_6-C_{50})$ heteroaryl, cyclopentadienyl, substituted cyclopentadienyl, $(C_4-C_{12})$ diene, halogen, —N$(R^N)_2$, or —NCOR$^C$;

m is 1 or 2;

n is 2 or 3, provided m+n=4;

each Z is NR$^N$ or S, wherein R$^N$ is $(C_1-C_{40})$ hydrocarbyl or $(C_1-C_{40})$ heterohydrocarbyl;

each $R^1$ is a $(C_1-C_{40})$ hydrocarbyl or $(C_1-C_{40})$ heterohydrocarbyl;

each $R^2$ and $R^3$ is independently selected from the group consisting of $(C_1-C_{50})$ hydrocarbyl, $(C_1-C_{50})$ heterohydrocarbyl, $(C_6-C_{50})$ aryl, $(C_4-C_{50})$ heteroaryl, —Si$(R^C)_3$, halogen, and —H, wherein $R^C$ is independently selected from the group consisting of $(C_1-C_{20})$ hydrocarbyl, $(C_1-C_{20})$ heterohydrocarbyl, and —H; and optionally, $R^2$ and $R^3$ are covalently linked to form a ring.

16. The polymerization process of claim 15, wherein Z is NR$^N$, where R$^N$ is $(C_1-C_8)$ alkyl.

17. The polymerization process of claim 15, wherein Z is S.

18. The polymerization process of claim 15, wherein the catalyst system further comprises a chain transfer agent and an activator, and wherein the process further comprises mixing the chain transfer agent and the activator in solution with the one or more metal-ligand complexes according to formula (I).

* * * * *